US012192819B2

(12) United States Patent
Kim et al.

(10) Patent No.: US 12,192,819 B2
(45) Date of Patent: Jan. 7, 2025

(54) WIRELESS COMMUNICATION METHOD USING MULTI-LINKS, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/619,944

(22) Filed: Mar. 28, 2024

(65) Prior Publication Data

US 2024/0251282 A1    Jul. 25, 2024

Related U.S. Application Data

(63) Continuation of application No. PCT/KR2022/014441, filed on Sep. 27, 2022.

(30) Foreign Application Priority Data

Sep. 30, 2021   (KR) ..................... 10-2021-0129567
Oct. 8, 2021    (KR) ..................... 10-2021-0133631
(Continued)

(51) Int. Cl.
*H04W 28/02*    (2009.01)
*H04L 47/2483*  (2022.01)

(52) U.S. Cl.
CPC ..... *H04W 28/0263* (2013.01); *H04L 47/2483* (2013.01)

(58) Field of Classification Search
CPC ................. H04W 28/0263; H04L 47/2483
See application file for complete search history.

(56) References Cited

U.S. PATENT DOCUMENTS 9,185,698 B2 * 11/2015 Sakoda ................. H04W 48/08
2021/0058868 A1 * 2/2021 Cariou .............. H04W 52/0206
(Continued)

FOREIGN PATENT DOCUMENTS

EP    4145947 A1 *  3/2023 ........... H04L 45/245
EP    4181451 A1 *  5/2023 ........... H04L 5/0053
(Continued)

OTHER PUBLICATIONS

International Search Report for PCT/KR2022/014441 mailed on Jan. 10, 2023 and its English translation from WIPO (now published as WO2023/055029).
(Continued)

*Primary Examiner* — Mehmood B. Khan
(74) *Attorney, Agent, or Firm* — WOMBLE BOND DICKINSON (US) LLP

(57) ABSTRACT

A non-access point (AP) multi-link device operating in a first link and a second link is disclosed. The non-AP multi-link device comprises a transmission/reception unit and a processor. The processor receives a beacon frame or a probe response frame from an AP multi-link device operating in the first link and the second link, determines a traffic identifier (TID) mapped to the first link and the second link according to TID-to-Link mapping indicated by the beacon frame or the probe response frame, and performs transmission in the first link or the second link according to the TID mapped to the first link and the second link.

20 Claims, 50 Drawing Sheets

| Priority | UP (Same as IEEE 802.1D user priority) | IEEE 802.1D designation | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| | 2 | — | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| Highest | 7 | NC | AC_VO | VO | A_VO | Voice (alternate) |

(30) Foreign Application Priority Data

| | | | |
|---|---|---|---|
| Jan. 10, 2022 | (KR) | ................. | 10-2022-0003155 |
| Jan. 26, 2022 | (KR) | ................. | 10-2022-0011825 |
| Feb. 11, 2022 | (KR) | ................. | 10-2022-0018311 |

(56) References Cited

U.S. PATENT DOCUMENTS

| | | | | |
|---|---|---|---|---|
| 2021/0144787 | A1* | 5/2021 | Kwon | ............... H04W 76/15 |
| 2021/0274500 | A1* | 9/2021 | Cariou | ............... H04W 48/08 |
| 2022/0116862 | A1  | 4/2022 | Cariou | |
| 2022/0312522 | A1* | 9/2022 | Jang  | ............... H04W 76/15 |
| 2023/0024407 | A1* | 1/2023 | Gan   | ............... H04W 48/08 |
| 2023/0123412 | A1* | 4/2023 | Wu    | ............... H04N 21/643 |
| | | | | 370/329 |
| 2023/0379986 | A1* | 11/2023 | Kishida | ............... H04W 28/09 |
| 2023/0397149 | A1* | 12/2023 | Guo    | ............... H04W 60/06 |
| 2023/0397253 | A1* | 12/2023 | Dong   | ............... H04W 74/0816 |

FOREIGN PATENT DOCUMENTS

| | | | |
|---|---|---|---|
| KR | 10-2020-0091886 | | 7/2020 |
| WO | WO-2018232138 A1 | * | 12/2018 |
| WO | WO-2019125086 A1 | * | 6/2019 ............ G06F 1/3209 |
| WO | 2021/167366 | | 8/2021 |
| WO | 2021/183045 | | 9/2021 |
| WO | WO-2021183045 A1 | * | 9/2021 ............ H04B 17/309 |
| WO | 2022/233395 | | 11/2022 |
| WO | 2023/055029 | | 4/2023 |

OTHER PUBLICATIONS

Written Opinion of the International Searching Authority for PCT/KR2022/014441 mailed on Jan. 10, 2023 and its English translation by Google Translate (now published as WO2023/055029).

Seok, Yongho et al.: "Proposed Draft Text for MLO TID-to-link Mapping", doc.: IEEE 802.11-21/0019r10, Apr. 14, 2021, pp. 1-1.

Arik Klein et al.: "CC36-Resolution-for-CID-5154", doc.: IEEE 802.11-21/1327r5, Feb. 3, 2022, pp. 1-9.

Arik Klein et al.: "CC36-Resolution-for-CID-5154", doc.: IEEE 802.11-21/1327r6, Feb. 3, 2022, pp. 1-10.

Pooya Monajemi et al.: "AP Link Disablement Advertisement", doc.: IEEE 802.11-22/1023r5, Jul. 2022, pp. 1-27.

Morteza Mehrnoush et al.: "LB 266 Resolution for NSTR Mobile AP Miscellaneous CIDs", doc.: IEEE 802.11-22/1793r3, Oct. 20, 2022, pp. 1-5.

\* cited by examiner

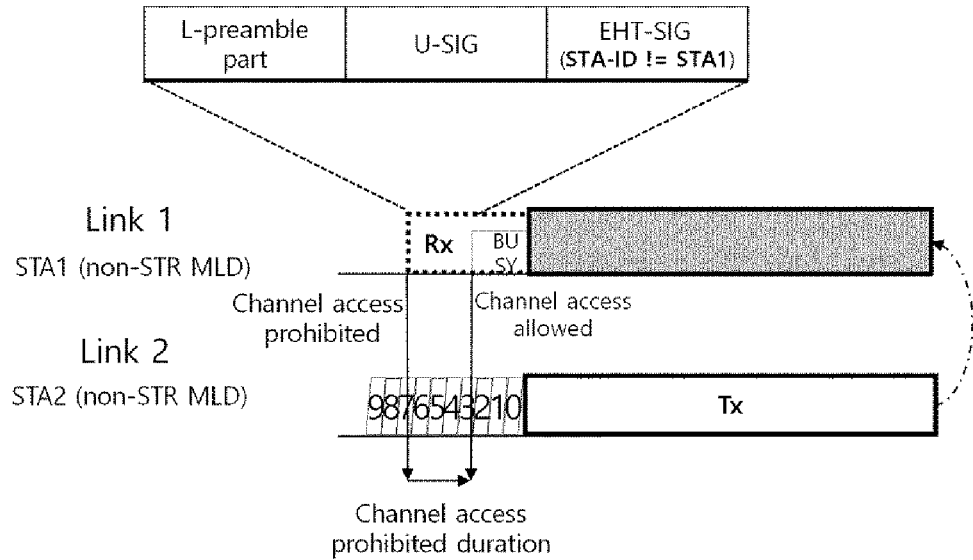
(a) Continuous backoff counting
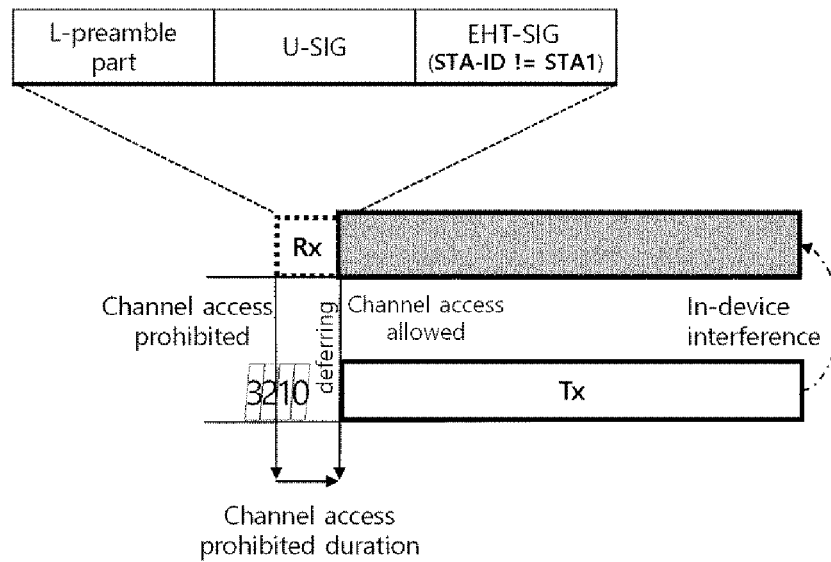
(b) Continuous backoff counting + Tx deferring
FIG. 14

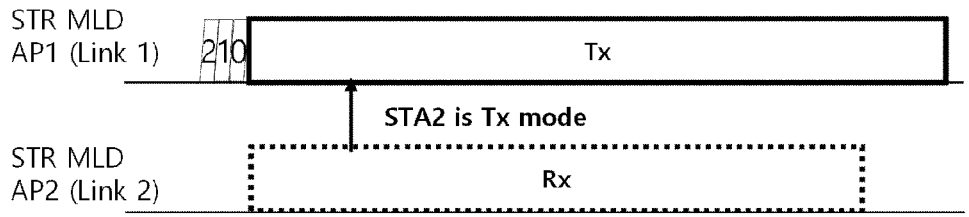
(a) Inter-link collision
(simultaneous Tx on AP1 &STA2 )
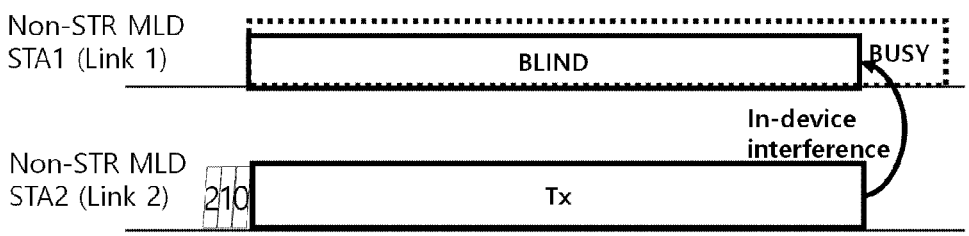
(b) Inter-link collision
(non-simultaneous Tx on AP1 &STA2 )
*FIG. 17*

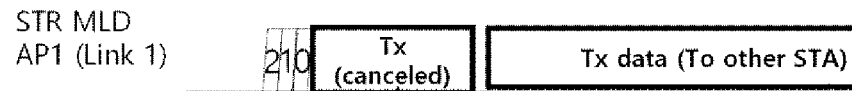
(a)

(b)
*FIG. 18*

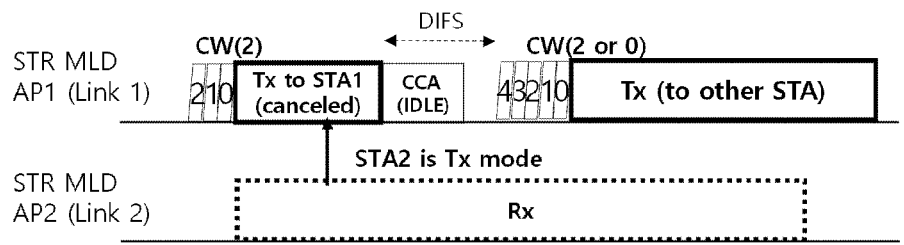
(a) Without TXOP
$CW(x) = $ Contention windows at backoff stage $x$
$CW(0) = CW\_min$ (e.g., 7, 15, 31)
$CW(x+1) = (2 \times (CW(x) + 1)) - 1$
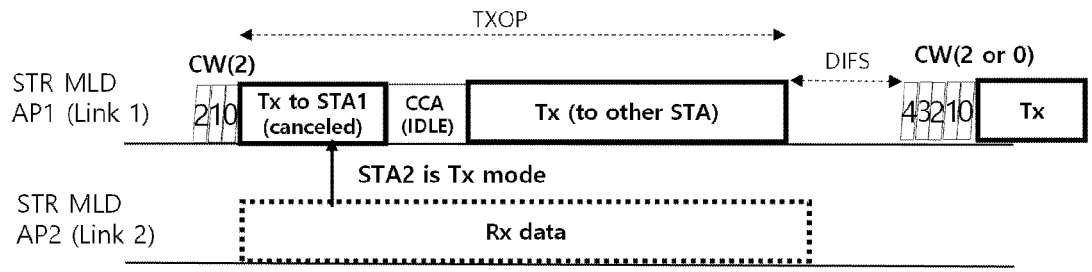
(b) With TXOP
FIG. 19

| ... | Supporting Sync PPDU Tx | ... |
|---|---|---|

(a) Capability / Multi-Link element

| ... | Sync PPDU Rx Disable | Remaining TXOP Threshold ($\alpha$) | ... |
|---|---|---|---|

(b) Operation element

*FIG. 31*

Operation element (a) Common Info field of the Basic Multi-Link element

| Medium Synchronization Duration | Medium Synchronization OFDM ED Threshold | Medium Synchronization Maximum Number Of TXOPs |
|---|---|---|

(b) Medium Synchronization Delay Information field

| Subfield value | Description |
|---|---|
| 0-10 | The dot11MSDOFDMEDthreshold value, in units of dBm, is $MSDOFDMED_{threshold} = -72 + F_{val}$, where $F_{val}$ is the subfield value. |
| 11-15 | Reserved |

(c) Medium Syncronization OFDM ED Threshold subfield

*FIG. 42*

(a) Presence Bitmap subfield of the Basic Multi-Link element format

| Link ID Info Present | BSS Parameters Change Count Present | Medium Synchronization Delay Information Present | EML Capabilities Present | MLD Capabilities Present | Link Unavailability Parameters Present | Reserved |
|---|---|---|---|---|---|---|
| 1 | 1 | 1 | 1 | 1 | 1 | 6 |

Bits:

(b) Common Info field of the Basic Multi-Link element format

| Common Info Length | MLD MAC Address | Link ID Info | BSS Parameters Change Count | Medium Synchronization on Delay Information | EML Capabilities | MLD Capabilities | Link Unavailability Parameters |
|---|---|---|---|---|---|---|---|
| 1 | 6 | 0 or 1 | 0 or 1 | 0 or 2 | 0 or 2 | 0 or 2 | 0 or 3 |

Octets:

(c) Link Unavailability Parameters subfield format

| Link Unavailability Count | Link Unavailability Duration |
|---|---|
| 1 | 2 |

Octets:

| Subfield | Definition | Encoding |
|---|---|---|
| Link Unavailability Count | This subfield indicates the number of TBTTs (in the range of [0, 255]) after which the link becomes unavailable | A non-zero value indicates that the link becomes unavailable after an amount of TBTTs indicated by this value.<br><br>The value 0 indicates that the link unavailability occurs at any time after the Beacon frame is transmitted. |
| Link Unavailability Duration | This subfield indicates the duration for which the link will be unavailable. | The value is expressed in TUs<br>A value of 65535 indicates unknown duration. |

(d) Subfields of Link Unavailability Parameters subfield

*FIG. 46*

(a) BSS Parameters subfield format

| OCT Recommended | Same SSID | Multiple BSSID | Transmitted BSSID | Member Of ESS With 2.4/5 GHz Co-Located AP | Unsolicited Probe Responses Active | Co-Located AP | Unavailable Link Indication |
|---|---|---|---|---|---|---|---|
| 1 | 1 | 1 | 1 | 1 | 1 | 1 | 1 |

Bits:

(b) TBTT Information field format (Neighbor AP Information field of the RNR element)

| Neighbor AP TBTT Offset | BSSID (optional) | Short SSID (optional) | BSS parameters | 20 MHz PSD | MLD Parameters |
|---|---|---|---|---|---|
| 1 | 0 or 6 | 0 or 4 | 0 or 1 | 0 or 1 | 0 or 3 |

Octets:

(c) STA Control field format (Per-STA Profile)

| Link ID | Complete Profile | MAC Address Present | Beacon Interval | DTIM Info Present | NSTR Link Pair Present | NSTR Bitmap Size | Link Unavailability Parameters Present | Reserved |
|---|---|---|---|---|---|---|---|---|
| 4 | 1 | 1 | 1 | 1 | 1 | 1 | 1 | 5 |

Bits:

(d) STA Info field format (Per-STA Profile)

| STA Info Length | STA MAC Address | Beacon Interval | DTIM Info | NSTR Indication Bitmap | Link Unavailability Parameters |
|---|---|---|---|---|---|
| 1 | 0 or 6 | 0 or 2 | 0 or 2 | 0 or 1 or 2 | 0 or 3 |

Octets:

*FIG. 47*

| Priority | UP (Same as IEEE 802.1D user priority) | IEEE 802.1D designation | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| | 2 | — | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| Highest | 7 | NC | AC_VO | VO | A_VO | Voice (alternate) |

*FIG. 48*

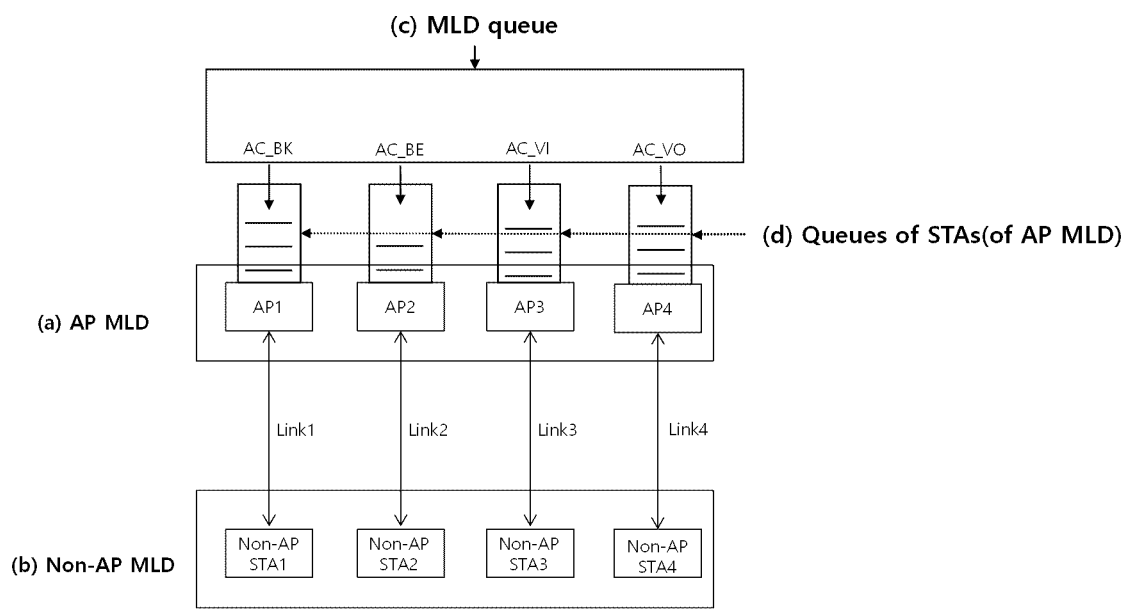

*FIG. 49*

Default TID-to-Link mapping

WIRELESS COMMUNICATION METHOD USING MULTI-LINKS, AND WIRELESS COMMUNICATION TERMINAL USING SAME

TECHNICAL FIELD

The present invention relates to a wireless communication method using a multi-link and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is to provide a wireless communication method using a multi-link and a wireless communication terminal using the same

Solution to Problem

In accordance with an embodiment of the present invention, a non-access point (AP) multi-link device operating on a first link and a second link includes a transceiver; and a processor. The processor may be configured to receive a beacon frame or a probe response frame from an AP multi-link device operating on the first link and the second link, determine a traffic identifier (TID) mapped to the first link and the second link according to TID-to-Link mapping indicated by the beacon frame or the probe response frame, and perform transmission on the first link or the second link according to the TID mapped to the first link and the second link.

The non-AP multi-link device may not be allowed to reject the TID-to-Link mapping indicated by the beacon frame or the probe response frame.

The TID-to-Link mapping indicated by the beacon frame or the probe response frame may include disabling the first link.

In case that the TID-to-Link mapping indicated by the beacon frame or the probe response frame does not indicate that the second link is disabled, information about the TID-to-Link mapping may indicate that all TIDs which are targets of the TID-to-Link mapping may be mapped to the second link.

In case that the first link is disabled and then re-enabled, all TIDs which are targets of the TID-to-Link mapping may be mapped to the first link.

In case that the first link is disabled, a station of the non-AP multi-link device operating on the first link enters a doze state, and in case that the station of the multi-link device is woken up from the doze state when the first link is re-enabled, a NAVSyncDelay-based channel access restriction may be applied to the station of the non-AP multi-link device.

In case that the first link is disabled, a Neighbor AP TBTT offset subfield of a target beacon transmission time (TBTT) Information field corresponding to the first link in a reduced neighbor report (RNR) element transmitted on the second link may have a value of 255.

In case that the AP multi-link device is a mobile AP and is not able to perform frame exchange simultaneously on the first link and the second link, the first link may not be a primary link on which the AP multi-link device transmits a beacon frame.

The processor may be configured to discard TID-to-Link mapping established through a TID-to-Link mapping negotiation on the first link and the second link before receiving the beacon frame or the probe response frame.

In accordance with an embodiment of the present invention, an access point (AP) multi-link device operating on a first link and a second link includes a transceiver; and a processor. The processor is configured to transmit, to a non-AP multi-link device operating on the first link and the second link, a beacon frame or a probe response frame indicating traffic identifier (TID)-to-link mapping of the first link and the second link, and perform transmission on the first link or the second link according to a TID mapped to the first link and the second link.

The non-AP multi-link device may not be allowed to reject the TID-to-Link mapping indicated by the beacon frame or the probe response frame.

The TID-to-Link mapping indicated by the beacon frame or the probe response frame may include disabling the first link.

In case that the TID-to-Link mapping indicated by the beacon frame or the probe response frame does not indicate that the second link is disabled, information about the TID-to-Link mapping may indicate that all TIDs which are targets of the TID-to-Link mapping may be mapped to the second link.

In case that the first link is disabled and then re-enabled, all TIDs which are targets of the TID-to-Link mapping may be mapped to the first link.

In case that the first link is disabled, an AP of the AP multi-link device operating on the first link may enter a doze state. In case that a station of the multi-link device is woken up from the doze state when the first link is re-enabled, a NAVSyncDelay-based channel access restriction may be applied to the station of the AP multi-link device.

The processor may be configured to, in case that the first link is disabled, transmit, on the second link, a reduced neighbor report (RNR) element in which a value of a Neighbor AP TBTT offset subfield corresponding to the first link in a target beacon transmission time (TBTT) Information field is set to 255.

In case that the AP multi-link device is a mobile AP and is not able to perform frame exchange simultaneously on the first link and the second link, the first link may not be a primary link on which the AP multi-link device transmits a beacon frame.

In accordance with an embodiment of the present invention, a method for operating a non-access point (AP) multi-link device operating on a first link and a second link includes: receiving a beacon frame or a probe response frame from an AP multi-link device operating on the first link and the second link; determining a traffic identifier (TID) mapped to the first link and the second link according to TID-to-Link mapping indicated by the beacon frame or the probe response frame; and performing transmission on the first link or the second link according to the TID mapped to the first link and the second link.

In accordance with an embodiment of the present invention, a method for operating an access point (AP) multi-link device operating on a first link and a second link includes: transmitting, to a non-AP multi-link device operating on the first link and the second link, a beacon frame or a probe response frame indicating traffic identifier (TID)-to-link mapping of the first link and the second link; and performing transmission on the first link or the second link according to a TID mapped to the first link and the second link.

Advantageous Effects of Invention

An embodiment of the present invention provides a wireless communication method efficiently using a multi-link and a wireless communication terminal using the same

BRIEF DESCRIPTION OF DRAWINGS

FIG. 14 illustrates the performance of channel access by the station after channel access prohibition is released according to an embodiment of the present invention.

FIG. 17 illustrates a situation in which interference or collision between links may be generated.

FIG. 18 illustrates an operation in which the STR multi-link device stops transmission to the non-STR multi-link device according to an embodiment of the present invention.

FIG. 19 illustrates processing of a value of a CW when the STR multi-link device recognize transmission collision between links according to an embodiment of the present invention.

FIG. 31 illustrates an element field indicating information on support of sync PPDU reception or transmission according to an embodiment of the present invention.

FIG. 42 illustrates the format of a Basic Multi-Link element which is used to signal a parameter that is applied to channel access restriction according to an embodiment of the present invention.

FIG. 46 illustrates disabling-related information transmitted by an AP multi-link device according to an embodiment of the present invention.

FIG. 47 illustrates the format of information about disabling of a second link that is signaled on a first link by an AP multi-link device according to an embodiment of the present invention.

FIG. 48 illustrates a mapping relationship between a UP and an AC according to an embodiment of the present invention.

FIG. 49 illustrates that a multi-link device transmits traffic mapped for each station of a multi-link device according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
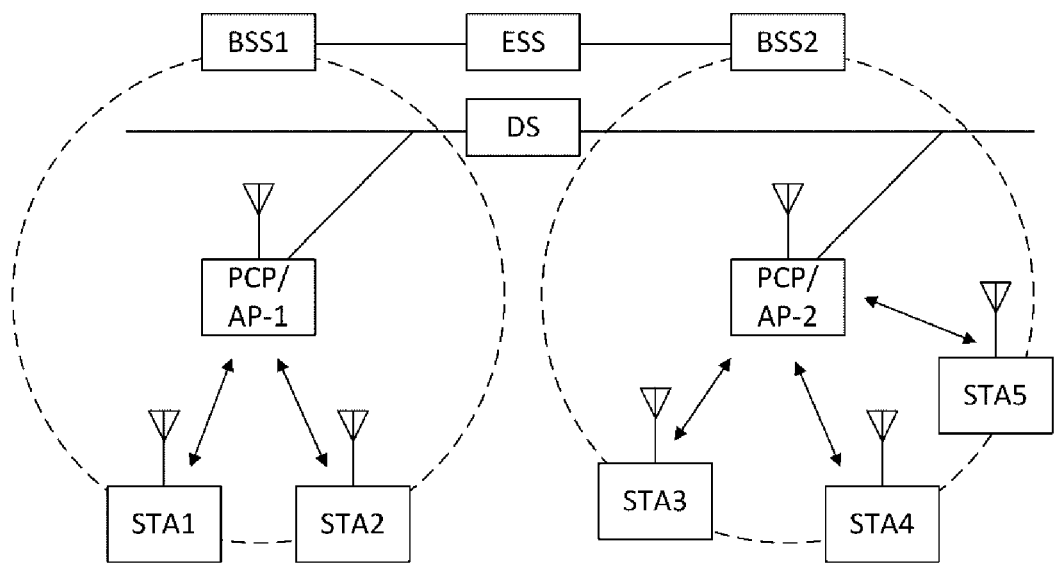
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
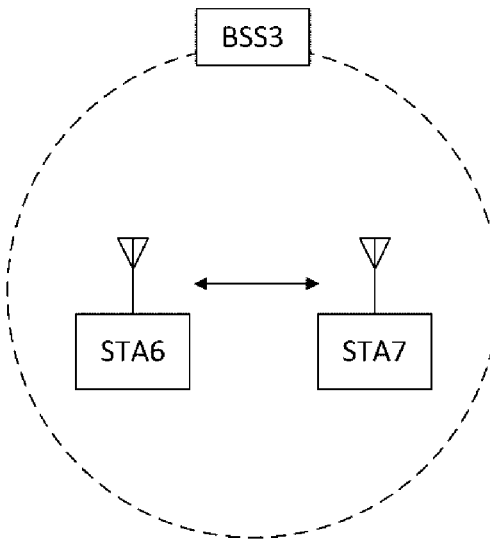
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
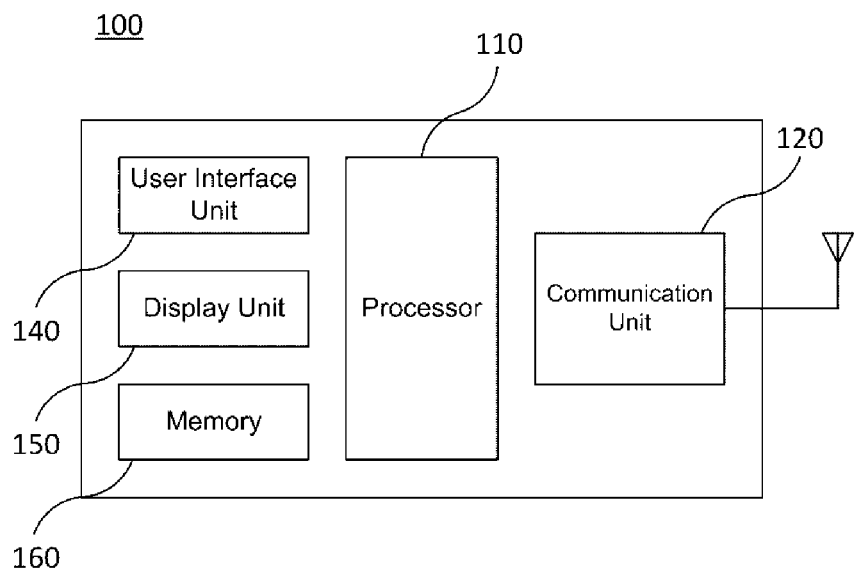
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
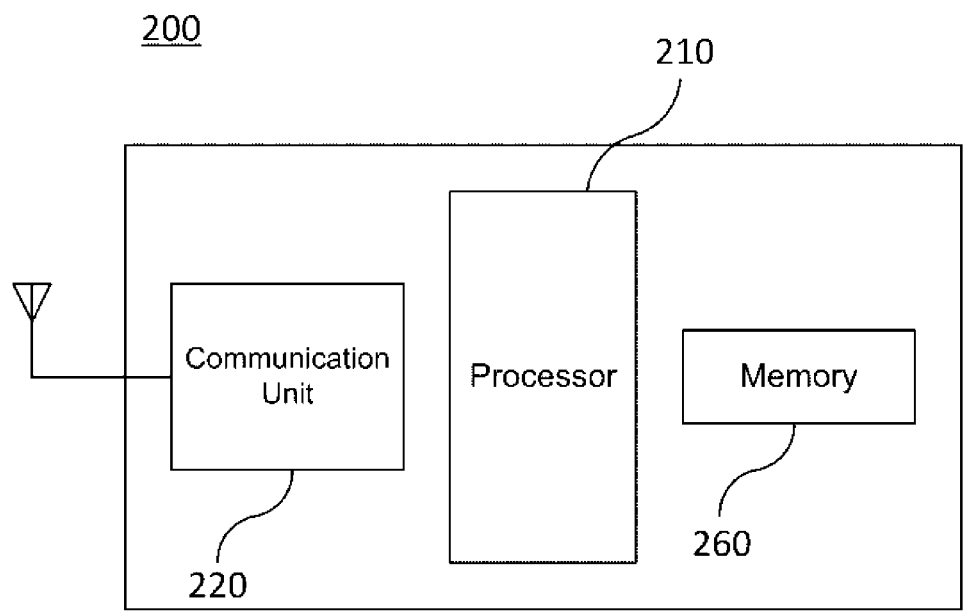
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
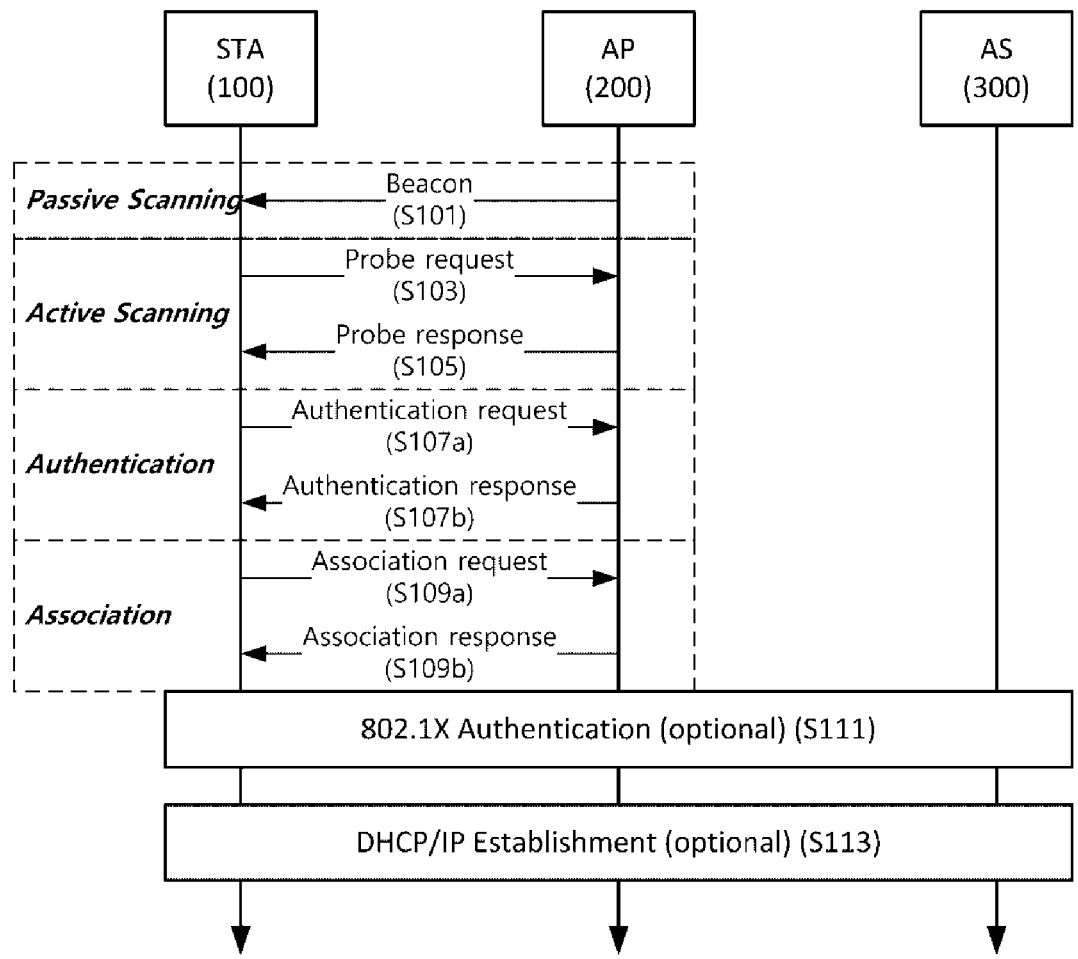
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
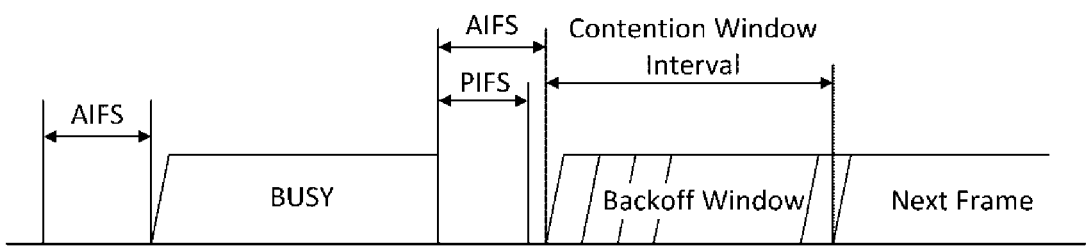
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
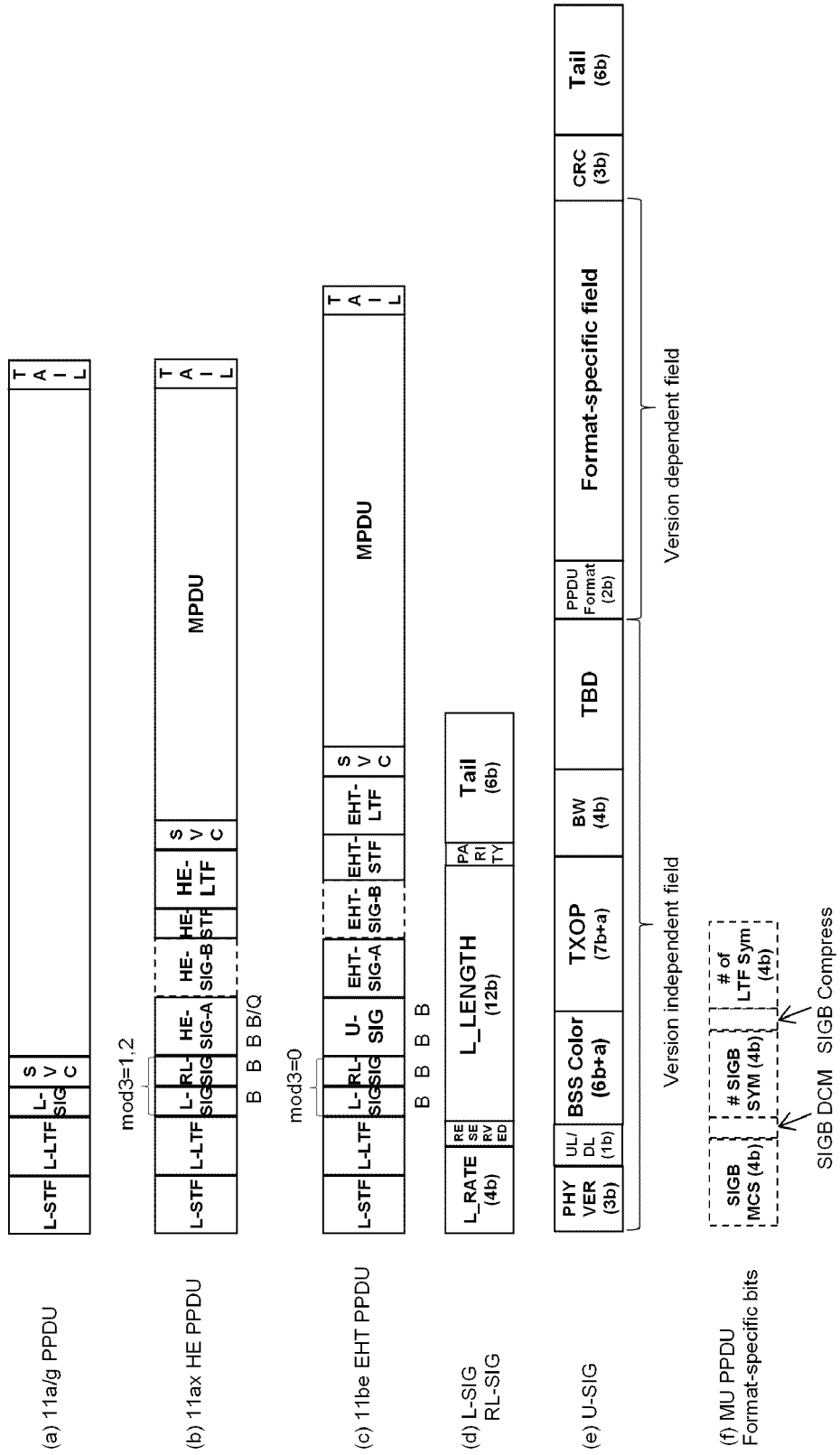
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = \quad \text{[Equation 3]}$$
$$T_{L-STF} + T_{L-LTF} + T_{L-SIG} + T_{RL-SIG} + Y_{U-SIG} + (T_{EHT-SIG-A}) +$$
$$(T_{EHT-SIG-B}) + T_{EHT-STF} + N_{EHT-LTF} \cdot T_{EHT-LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
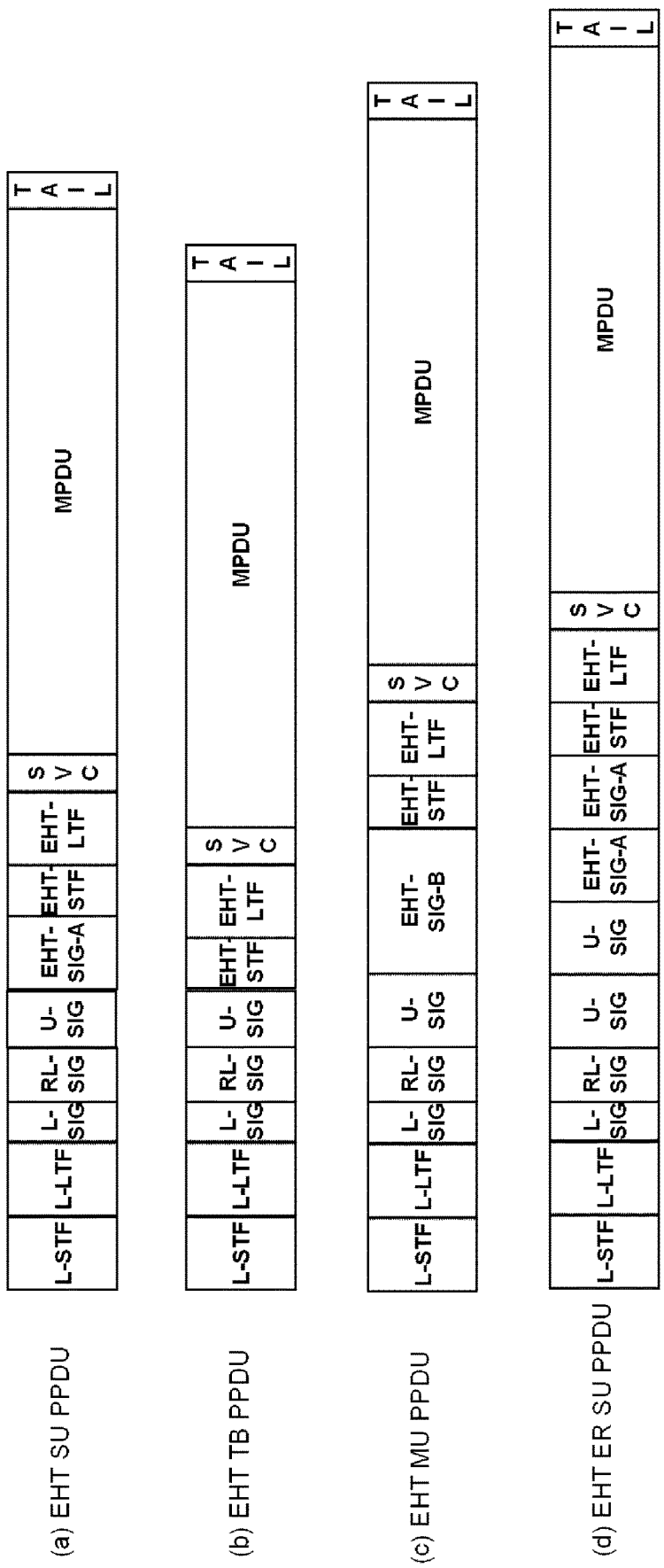
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG

FIELD

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
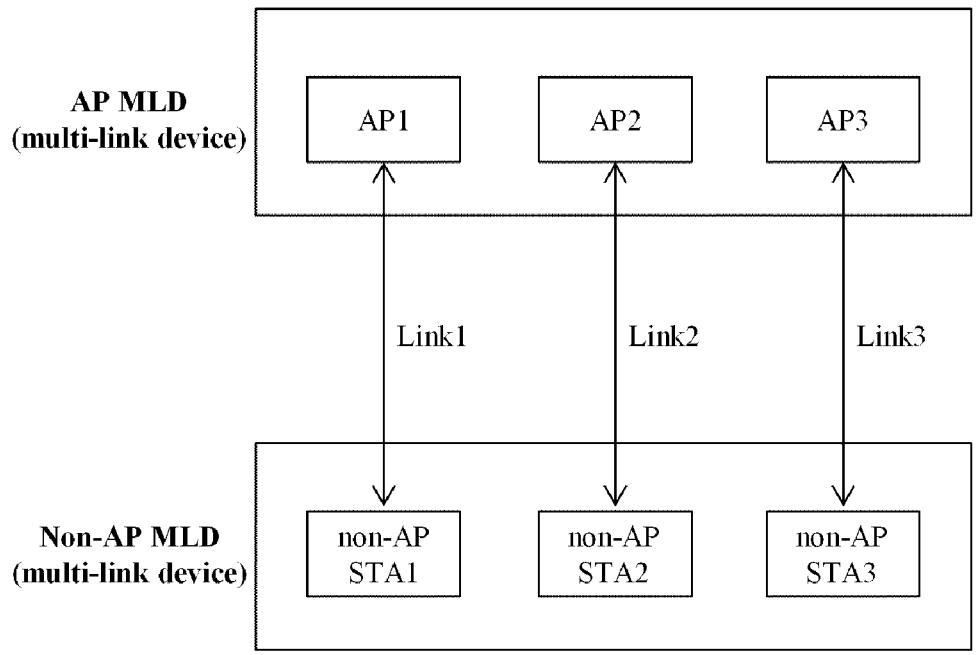
FIG. 9 illustrates a multi-link device according to an embodiment of the present invention.

FIG. 9 illustrates a multi-link device according to an embodiment of the present invention.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QoS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QoS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

Figure 10:
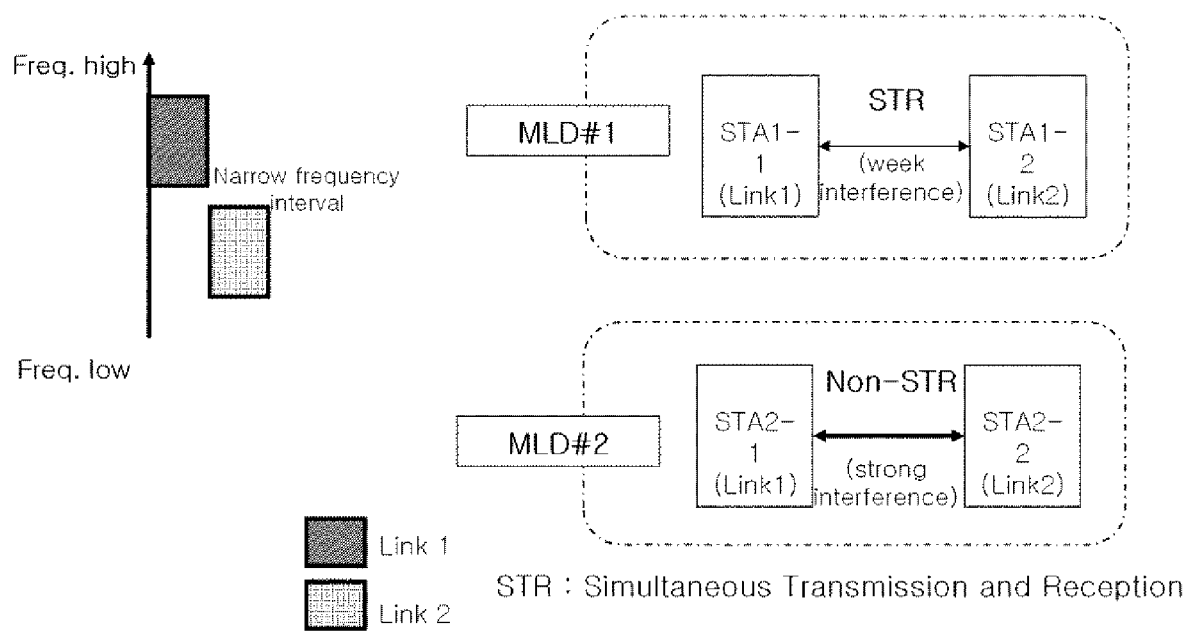
FIG. 10 illustrates simultaneous transmissions in different links in a multi-link operation according to an embodiment of the present invention.

FIG. 10 illustrates the simultaneous performance of transmission of different links in a multi-link operation according to an embodiment of the present invention.

According to implementation of a multi-link device, the simultaneous operation may not be supported in the multi-link. For example, simultaneous transmission in a plurality of links, simultaneous reception in a plurality of links, or transmission in one link and reception of another link by the multi-link device may be not supported. This is because reception or transmission performed in one link may influence reception or transmission performed in another link. Specifically, transmission in one link may act as interference to another link. Interference applied from one link to another link by one multi-link device may be referred to as internal leakage. As a frequency interval between links is smaller, internal leakage may become larger. When internal leakage is not very large, transmission may be performed in another link while transmission is performed in one link. When internal leakage is large, transmission cannot be performed in another link while transmission is performed in one link. As described above, simultaneously performing the operations in a plurality of links by the multi-link device may be referred to as simultaneous transmit and receive or simultaneous transmission and reception (STR). For example, simultaneous transmission in a plurality of links, transmission in one link and reception in another link at the same time, or simultaneous reception in a plurality of links by the multi-link device may be referred to as STR.

As mentioned above, the multi-link device may support STR or support the same only restrictively. Specifically, the multi-link device may support STR in a specific condition. For example, when the multi-link device operates as a single radio device, the multi-link device may not perform STR. Further, when the multi-link device operates as a single antenna, STR of the multi-link device may not be performed. When internal leakage having the size larger than or equal to a predetermined size is detected, the multi-link device may not perform STR.

A station may exchange information on an STR capability of the station with another station. Specifically, the station may exchange information on whether a capability of simultaneously performing transmission in a plurality of links or simultaneously performing reception in a plurality of links by the station is restricted with another station. Specifically, the information on whether the capability of performing transmission or reception in a plurality of links is restricted may indicate whether simultaneous transmission, simultaneous reception, or simultaneous transmission and reception can be performed in a plurality of links. The information on whether the capability of performing transmission or reception in a plurality of links is restricted may be information indicated for each step. Specifically, the information on whether the capability of performing transmission or reception in a plurality of links is restricted may be information indicating a step of representing the size of internal leakage. In a detailed embodiment, the information indicating the step of representing the size of internal leakage may be information indicating a step of representing the size of interference generated due to internal leakage. In another detailed embodiment, the information may be information indicating a step of representing a frequency interval between links that may influence internal leakage. The information indicating the step of representing the size of internal leakage may be information indicating the relation between the frequency interval between links and the size of internal leakage.

In FIG. 10, a first station (STA1) and a second station (STA2) is affiliated with one non-AP multi-link device. A first AP (AP1) and a second AP (AP2) may be affiliated with one non-AP multi-link device. A first link (link 1) is configured between the first AP (AP1) and the first station (STA1), and a second link (link 2) is configured between the second AP (AP2) and the second station (STA2). In FIG. 10, the non-AP multi-link device may restrictively perform STR. When the second station (STA2) performs transmission in the second link (link2), reception of the first station (STA1) in the first link (link1) may be disturbed by transmission performed in the second link (link2). For example, in the following case, reception of the first station (STA1) in the first link (link1) may be interrupted by transmission performed in the second link (link2). The second station (STA2) transmits first data (data 1) in the second link (link 2), and the first AP (AP1) transmits a response (ack for data1) to the first data (data1) to the first station (STA1). The second station (STA2) transmits second data (data2) in the second link (link2). At this time, a transmission time point of the second data (data2) may overlap a transmission time point of the response (ack for data1) to the first data (data1). The first link (link1) may be interfered by transmission to the second station (STA2) in the second link (link 2). Accordingly, the first station (STA1) may not receive the response (ack for data1) to the first data (data1).

An operation in which the multi-link device performs channel access is described. The operation of the multi-link without detailed description may follow the channel access described with reference to FIG. 6.

The multi-link device may independently perform channel access in a plurality of links. At this time, the channel access may be backoff-based channel access. When the multi-link device independently performs the channel access in a plurality of links and a backoff counter reaches 0 in the plurality of links, the multi-link device may simultaneously perform transmission in the plurality of links. In a detailed embodiment, when one of the backoff counters of the multi-link reach 0 and a predetermined condition is satisfied, the multi-link device may perform channel access not only in the link in which the backoff counter reaches 0 but also in another link in which the backoff counter does not reach 0. Specifically, when one of the backoff counters of the multi-link reaches 0, the multi-link device may detect energy in another link in which the backoff counter does not reach 0. At this time, when energy having a predetermined size or larger is not detected, the multi-link device may perform channel access not only in the link in which the backoff counter reaches 0 but also in the link in which energy is detected. Accordingly, the multi-link device may simultaneously perform transmission in the plurality of links. The size of a threshold value used for energy detection may be smaller than the size of a threshold value used for determining whether to reduce the backoff counter. Further, when it is determined whether to reduce the backoff counter, the multi-link device may detect any type of signal as well as a WLAN signal. In the energy detection, the multi-link device may detect any type of signal as well as the WLAN signal. Internal leakage may not be detected by the WLAN signal. In this case, the multi-link device may sense a signal detected due to internal leakage by energy detection. Further, as described above, the size of a threshold value used for energy detection may be smaller than the size of a threshold value used for determining whether to reduce the backoff counter. Accordingly, the multi-link device may reduce the backoff counter in another link even while transmission is performed in one link.

According to a degree of interference between links used by the multi-link device, the multi-link device may determine whether the station operating in each link may independently operate. At this time, the degree of interference between links may be the size of interference detected by, when one station performs transmission in one link, another station of the multi-link device. When transmission by the first station of the multi-link device in the first link gives interference having a predetermined size or larger to the second station of the multi-link device operating in the second link, the operation of the second station may be restricted. Specifically, reception or channel access of the second station may be restricted. This is because, when interference is generated, the second station may fail in decoding of the received signal due to interference. Further, this is because, when interference is generated, the second station may determine that the channel is being used when the second station performs channel access using the backoff.

When transmission by the first station of the multi-link device in the first link gives interference having a size smaller than a predetermined size to the second station of the multi-link device operating in the second link, the first station and the second station may independently operate. Specifically, when transmission by the first station of the multi-link device in the first link gives interference having a size smaller than a predetermined size to the second station of the multi-link device operating in the second link, the first station and the second station may independently perform channel access. Further, when transmission by the first station of the multi-link device gives interference having a size smaller than a predetermined size to the second station of the multi-link device operating in the second link, the first station and the second station may independently perform transmission or reception. This is because, when interference having the size smaller than the predetermined size is generated, the second station may succeed in decoding the received signal even when the interference exists. Further, this is because, when interference having the size smaller than the predetermined size is generated, the second station may determine that the channel is idle when the second station performs channel access using the backoff.

The degree of interference generated between stations of the multi-link device may vary depending on a hardware characteristic of the multi-link device as well as the interval between frequency bands of the links in which the stations operate. For example, internal interference generated in the multi-link device including an expensive radio frequency (RF) device may be smaller than internal interference generated in the multi-link device including a cheap RF device. Accordingly, the degree of interference generated between the stations of the multi-link device may be determined based on a characteristic of the multi-link device.

FIG. 10 illustrates that the size of generated interference varies depending on the interval between frequency bands of the links and the characteristic of the multi-link device. In the embodiment of FIG. 10, a first multi-link device (MLD #1) includes a first station (STA1-1) operating in a first link (link1) and a second station (STA1-2) operating in a second link (link2). A second multi-link device (MLD #2) includes a first station (STA2-1) operating in a first link (link1) and a second station (STA2-2) operating in a second link (link2). A frequency interval between the first link (link1) and the second link (link2) in which the first multi-link device (MLD #1) operates is the same as a frequency interval between the first link (link1) and the second link (link2) in which the second multi-link device (MLD #2) operates. However, the size of generated interference may be different due to difference between a characteristic of the first multi-link device (MLD #1) and a characteristic of the second multi-link device (MLD #2). Specifically, the size of interference generated in the first multi-link device (MLD #1) may be larger than the size of interference generated in the second multi-link device (MLD #2). As described above, the size of generated interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. At this time, a value of the bit may be 1 when the station supports STR, and the value of the bit may be 0 when the station does not support STR. When the multi-link device transmitting the STR support element includes a first station (STA1), a second station (STA2), and a third station (STA3), the first station (STA1) and the third station (STA3) support STR, and the second station (STA2) does not support STR, the STR support element may include a field having 1011b. It is assumed that stations operating in different frequency bands support STR, and the STR support element may omit signaling indicating whether STR is supported between the stations operating in different frequency bands. For example, the first station (STA1) operates in a first link of 2.4 GHz, and the second station (STA2) and the third station (STA3) operate in a second link and a third link of 5 GHz, respectively. The STR support element may indicate that STR is supported between the second station (STA2) and the third station (STA3) by using 1 bit. Further, the STR support element may include only 1 bit when the number of stations signaled by the STR support element is 2.

In a detailed embodiment, the relation between the link located in 2.4 GHz and the link located in 5 GHz or 6 GHz among the links of the multi-link device may be always determined to STR. Accordingly, signaling for STR of the link located in 2.4 GHz and the link located in 5 GHz or 6 GHz may be omitted.

Figure 11:
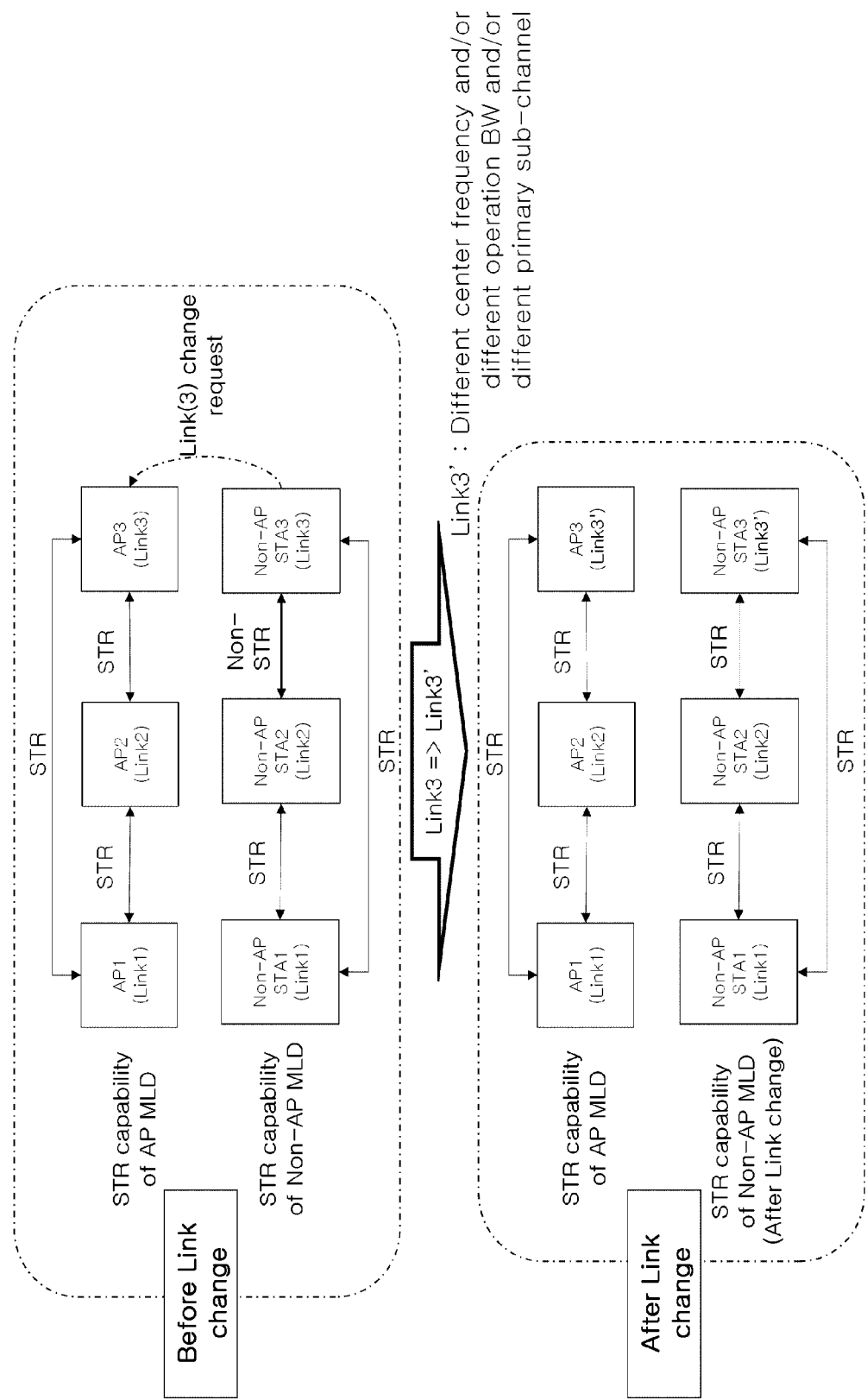
FIG. 11 illustrates an operation of a multi-link device when a link is changed according to an embodiment of the present invention.

FIG. 11 illustrates an operation of the multi-link device when a link is changed according to an embodiment of the present invention.

When a frequency band of a link is changed, the STR support element may be changed. As described above, this is because whether STR is supported by the station may vary depending on the distance between frequency bands of the links, and when the frequency band of the link is changed, whether STR is supported by the station may be changed. The change in the frequency band of the link may include at least one of a change in the central frequency, a change in a bandwidth of the frequency band, and a main channel of 200 MHz. The AP and the station may exchange the STR support element through a request and a response. In another detailed embodiment, when the frequency band of the link is changed, the STR support element may be exchanged without any separate request. Further, in the above-described embodiments, the change in the frequency band of the link may include a change in an operating channel of the station.

When the station of the non-AP multi-link device cannot perform STR, the station of the non-AP multi-link device may make a request for changing the link to the AP. Specifically, the station of the non-AP multi-link device may make a request for changing at least one of the central frequency, the bandwidth of the frequency band, and the main channel of 20 MHz. The link change request may be transmitted to the AP through the link requested to be changed. In another detailed embodiment, the link change request may be transmitted to the AP through a link which is not requested to be changed. At this time, the link change request may include information indicating the link requested to be changed. The information indicating the link may be a number for identifying the link. In such embodiments, the change in the link may be a change in an operating channel within one frequency band. Further, the change in the link may include information on a method of changing the link. Specifically, the link change request may indicate whether to move the central frequency of the link to a frequency higher than the current central frequency or move the central frequency of the link to a frequency lower than the current central frequency. In another detailed embodiment, the link change request may implicitly indicate a change to a frequency band farther from an adjacent link. Further, the link change request may indicate a decrease in the bandwidth. The link change request may be a request for changing the location of the main channel. Specifically, the link change request may indicate a change in the location of the main channel to a channel of a frequency band lower than the location of the main channel or a channel of a frequency band higher than the location of the main channel. The AP receiving the link change request may change the link according to the link change request. Further, in a detailed embodiment, the AP receiving the link change request may ignore the link change request.

In the embodiment of FIG. 11, the second station (STA2) and the third station (STA3) of the non-AP multi-link device cannot support STR. The non-AP multi-link device makes a request for changing a third link (link3) to the AP multi-link device. The AP multi-link device receiving the link change request changes the operating link of the third AP (AP3). At this time, the third station (STA3) operating in the third link (link3) to be changed may transmit a change request to the third AP (AP3). In another detailed embodiment, the station which does not operate in the third link (link3) may transmit a change request to the AP which does not operate in the third link (link3).

When the AP changes the link, the AP may broadcast information on the link change through a beacon frame. At this time, the information on the link change may include information on the frequency of the link. The information on the frequency of the link may include at least one of changes in the operating bandwidth and the main channel. Further, the information on the link change may include information on a link change time point. In addition, the link change may be completed when a beacon including the information on the link change is transmitted.

In FIG. 11, the link in which the third station (STA3) operates is changed and thus the third station (STA3) and the second station (STA2) may support STR. As described above, the non-AP multi-link device may transmit the STR support element to the AP multi-link device and signal information indicating a change in supporting of STR.

The link change may not be allowed, or STR may not be supported through the link change. As illustrated in the embodiment of FIG. 11, the AP multi-link device may support STR but the non-AP multi-link device may not support STR. This is because it is common to use a relatively expensive device for the AP multi-link device and use a relatively cheap device for the non-AP multi-link device. Accordingly, in communication between multi-link devices, a method of, even when one multi-link device does not support STR, performing efficient communication is needed. At this time, STR may indicate the simultaneously performance of transmission and reception. This will be described with reference to FIG. 12.

Figure 12:
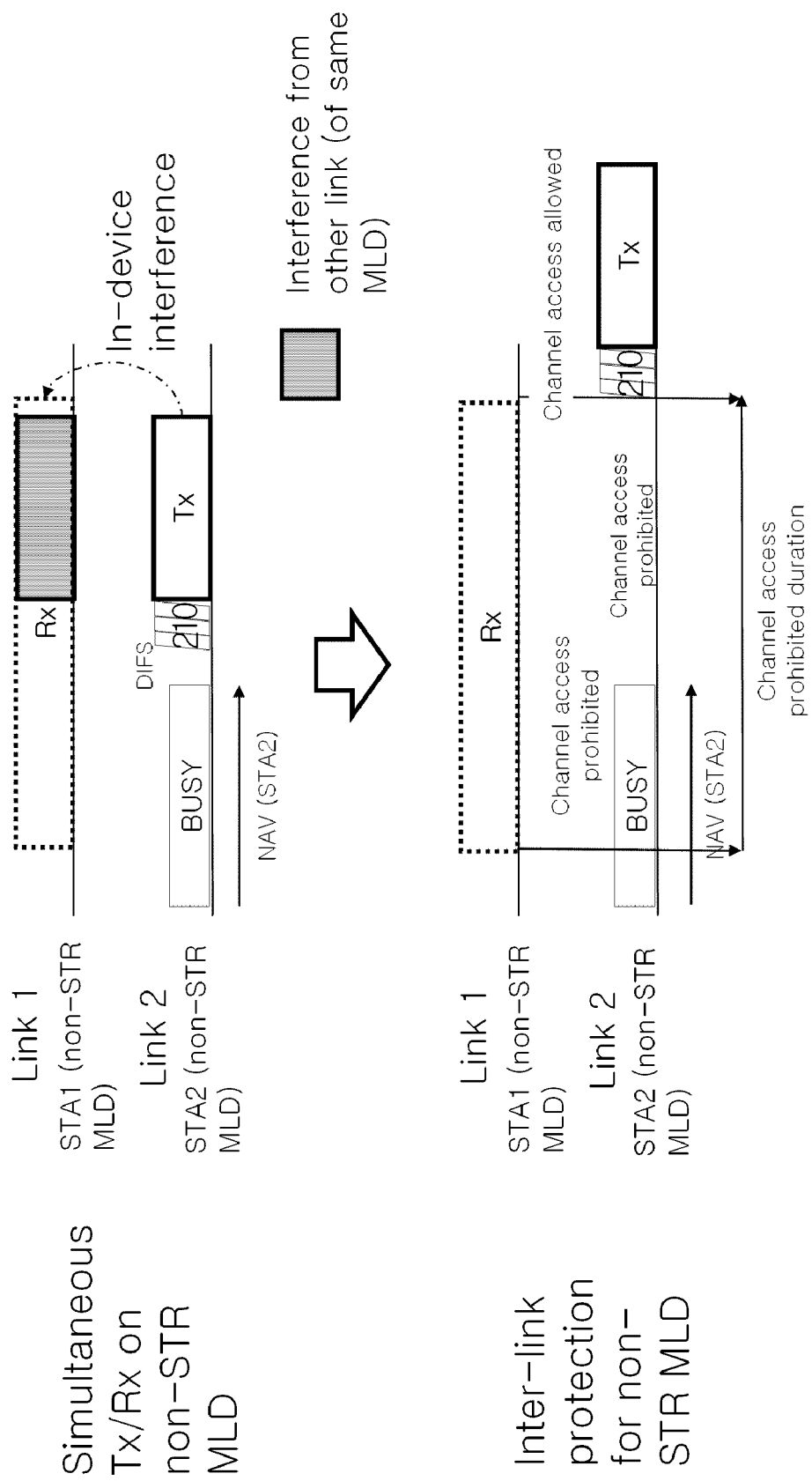
FIG. 12 illustrates prohibition of channel access of another station of a non-STR multi-link device when one station of the non-STR multi-link device performs reception according to an embodiment of the present invention.

FIG. 12 illustrates that, when reception of one station of the non-STR multi-link device is performed, channel access of another station of the non-STR multi-link device is restricted according to an embodiment of the present invention.

When transmission by the non-STR multi-link device is performed in one link and reception by the non-STR multi-link device is performed in another link, the reception and the transmission of the non-STR multi-link device may fail. In order to solve the problem, when reception by the non-STR multi-link device is performed in one link, channel access by the non-STR multi-link device in another link may be restricted. Specifically, when reception by the non-STR multi-link device is performed in one link, the backoff of channel access by the non-STR multi-link device in another link may be restricted. Accordingly, when reception by the non-STR multi-link device is performed in one link, the start of transmission by the non-STR multi-link device in another link may be prevented. In a detailed embodiment, when reception by the non-STR multi-link device starts in one link, the backoff of channel access by the non-STR multi-link device in another link may be restricted. It may be configured through a specific bit of the memory such as a channel access restriction flag. Whether to restrict channel access may be shared through the memory within the multi-link device. Through such an embodiment, channel access restriction may be implemented without separate frame exchange. For convenience of description, channel access restriction used in the specification indicates restriction of channel access or transmission in order to protect transmission or reception by the non-STR multi-link device unless there is a separate description.

When channel access is restricted, the station operating in the link in which the channel access is restricted cannot perform a backoff procedure regardless of the NAV and CCA result. Further, when the channel access is restricted, the station operating in the link in which the channel access is restricted cannot perform transmission regardless of the NAV and CCA result. However, even though the channel access is restricted, the station operating in the link in which the channel access is restricted can perform reception. Further, channel access restriction in the second link due to reception performed in the first link may be released based on a time point at which the reception in the first link is completed. Specifically, channel access restriction in the second link due to reception performed in the first link may be released when the reception in the first link is completed. In another detailed embodiment, channel access restriction in the second link due to reception performed in the first link may be released based on a time point at which ACK is transmitted after the reception in the first link is completed. Specifically, channel access restriction in the second link due to reception performed in the first link may be released at the time point at which ACK is transmitted after the reception in the first link is completed. In another detailed embodiment, channel access restriction in the second link due to reception performed in the first link may be released at a time point at which ACK transmission is completed after the reception in the first link is completed. Further, after the channel access restriction is released, the station may immediately reduce the backoff counter without additional sensing. At this time, the additional sensing may indicate sensing performed during a DCF interframe space (DIFS). In another detailed embodiment, when the channel is idle for a predetermined time right before the channel access restriction is released, the station may immediately reduce the backoff counter without additional sensing. At this time, the predetermined time may be one of a PCF interframe space (PIFS), a short interframe space (SIFS), and an arbitration interframe space (AIFS).

In the embodiment of FIG. 12, the non-STR multi-link device includes the first station (STA1) operating in the first link (link1) and the second station (STA2) operating in the second link (link2). When the second station (STA2) performs transmission in the second link (link2) while the first station (STA1) performs reception, intra-device interference is generated. As described above, channel access by the second station (STA2) performed in the second link (link2) is restricted while the first station (STA1) operating in the first link (link1) performs reception. After reception by the first station (STA1) in the first link (link1) is completed, channel access restriction is released. Right after the channel access restriction is released, the second station (STA2) may reduce a value of the previous backoff counter by 1 from 3 to 2 without additional sensing.

For convenience of expression, a single block (Tx solid line, Rx dotted line) is used to express Rx and Tx in the drawing used by FIG. 12, and it may be understood that the single block expresses an operation including Tx/Ack reception and Rx/Ack transmission even though a separate Ack block is not illustrated. This may be equally applied to the following drawings.

When the station identifies that a received PPDU is not a receiver intended by the station, the station may stop reception of the PPDU. In this case, the operation of releasing channel access prohibition by the multi-link device is a problem. The intended receiver in the specification is used to have the same meaning as a destination station.

Figure 13:
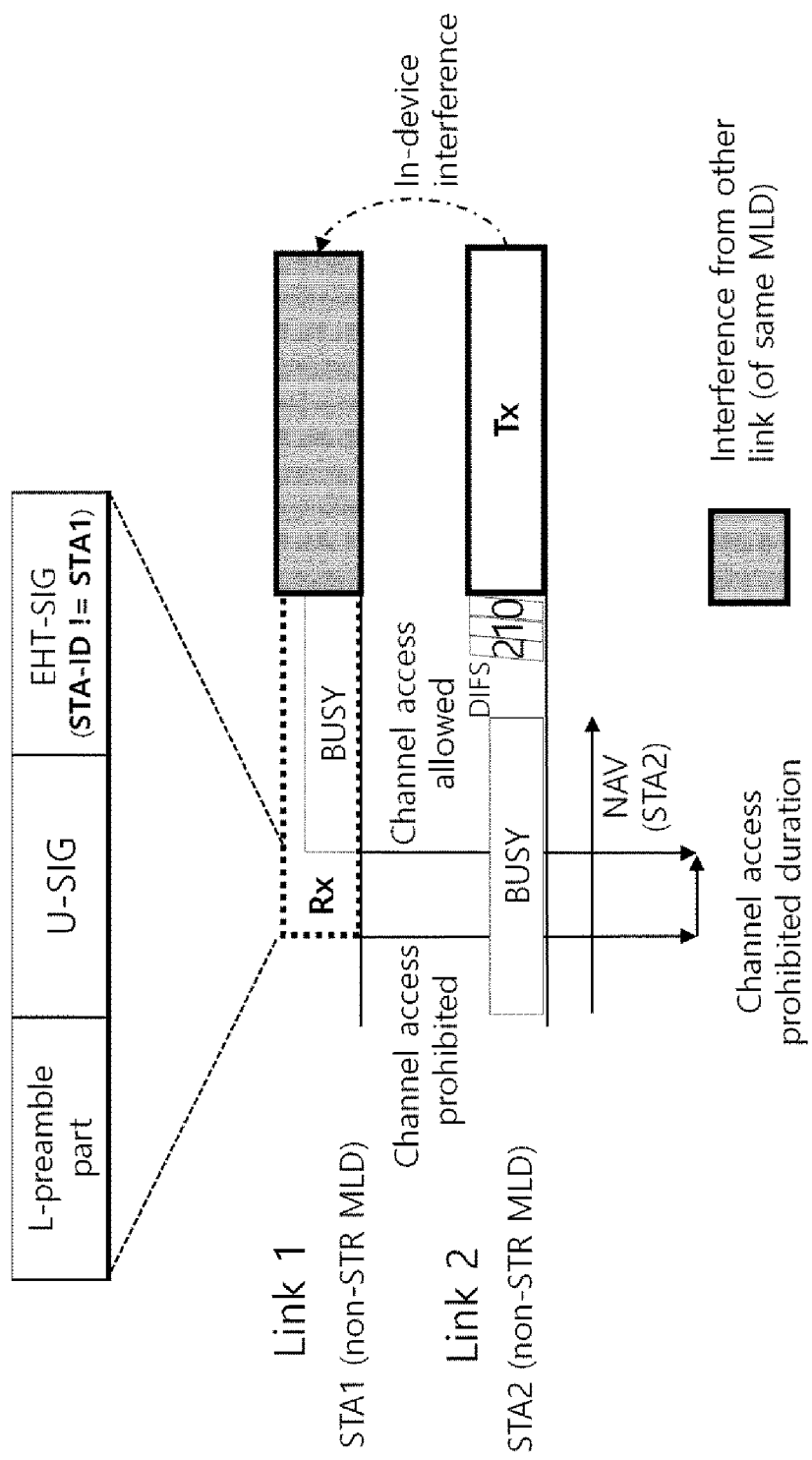
FIG. 13 illustrates an operation of releasing channel access prohibition when it is identified that an intended receiver of a PPDU received by the station of the non-STR multi-link device is not the station.

FIG. 13 illustrates the operation of releasing the channel access prohibition when it is identified that an intended receiver of a PPDU received by the station of the non-STR multi-link device is not the station according to an embodiment of the present invention.

When the station identifies that the received PPDU is not the receiver intended by the station, the station may release channel access prohibition. The station may determine whether the station is the intended receiver of the PPDU based on information indicating a receiver address of a signaling field of the PPDU. At this time, the information indicating the receiver address of the signaling field of the PPDU may be a value of the STA-ID field of the EHT-SIG field. Specifically, the station may determine whether the STA-ID field of the EHT-SIG field indicates the station. Further, the station may determine whether the station is the intended receiver of the PPDU based on a value of an RA field of a MAC frame included in the PPDU. Specifically, the station may determine whether the RA field of the MAC frame included in the PPDU indicates the station. In FIG. 13, the non-STR multi-link device includes the first station (STA1) operating in the first link (link1) and the second station (STA2) operating in the second link (link2). The first station (STA1) receives the PPDU. The first station (STA1) determines that the intended receiver of the received PPDU is not the first station (STA1) and stops receiving the PPDU. At this time, the first station (STA1) may release channel access prohibition of the second station (STA2). Even though the channel access prohibition of the second station (STA2) is released, channel access of the second station (STA2) may be delayed according to NAV configured in the second station (STA2).

As illustrated in FIG. 13, even though the channel access prohibition is released, the station included in the non-STR multi-link device may not have the channel access opportunities more frequently than the station which is not included in the multi-link device or the station included in the STR multi-link device. Accordingly, for fair competition with other stations, a method of guaranteeing the channel access opportunities of the station included in the non-STR multi-link device may be needed. For example, after releasing the channel access prohibition, the station of which channel access is prohibited may be allowed to reduce the backoff counter by 2 or more. This will be described with reference to FIG. 14.

FIG. 14 illustrates the performance of channel access by the station after channel access prohibition is released according to an embodiment of the present invention.

The station of which channel access prohibition is released may reduce the backoff counter by 2 or more after the channel access prohibition is released. This is to have balance of channel access opportunities with other stations since other stations perform the backoff procedure while the channel access of the station is prohibited.

In another detailed embodiment, the station of which channel access is prohibited may perform a channel access procedure of reducing CCA (CSMA) and the backoff counter while the channel access is prohibited. In FIG. 14, the non-STR multi-link device includes the first station (STA1) operating in the first link (link1) and the second station (STA2) operating in the second link (link2). In FIG. 14, channel access of the second station (STA2) is prohibited while the first station (STA1) performs reception. In FIG. 14(a), the second station (STA2) may perform a channel access procedure of reducing CCA (CSMA) and the backoff counter while the channel access of the second station (STA2) is prohibited. In FIG. 14(a), since the channel of the second link (link2) is idle while the channel access of the second station (STA2) is prohibited, the second station (STA2) reduces the backoff counter.

Further, the station of which channel access is prohibited may delay transmission without starting transmission even though the backoff counter reaches 0 while the channel access is prohibited. At this time, the station may maintain the value of the backoff counter as 0. Further, although the station delays transmission, the station may maintain the value of CW. Accordingly, it is differentiated from doubling of the value of the CW by the station since the channel accessed by the station is busy. This is because the reason of delayed transmission is not the case in which it is determined that the channel is being used. In FIG. 14(b), the second station (STA2) may perform a channel access procedure of reducing CCA (CSMA) and the backoff counter while the channel access of the second station (STA2) is prohibited. In FIG. 14(b), since the channel of the second link (link2) is idle while the channel access of the second station (STA2) is prohibited, the second station (STA2) reduces the backoff counter. The backoff counter of the second station (STA2) reaches 0 while the channel access of the second station (STA2) is prohibited. The second station (STA2) delays transmission and starts transmission after the channel access prohibition is released.

As described above, the channel access prohibition may include prohibition of transmission of the second station when the first station of the non-STR multi-link device performs transmission. Further, the channel access prohibition may include prohibition of transmission of the second station when the first station of the non-STR multi-link device performs reception.

When the number of stations of which channel access is prohibited is plural in embodiments of FIG. 14(b), the probability of attempt of simultaneous release of channel access prohibition of the plurality of stations and simultaneous transmission of the plurality of stations is high. Accordingly, a method of reducing a transmission collision probability is needed. This will be described with reference to FIG. 15.

Figure 15:
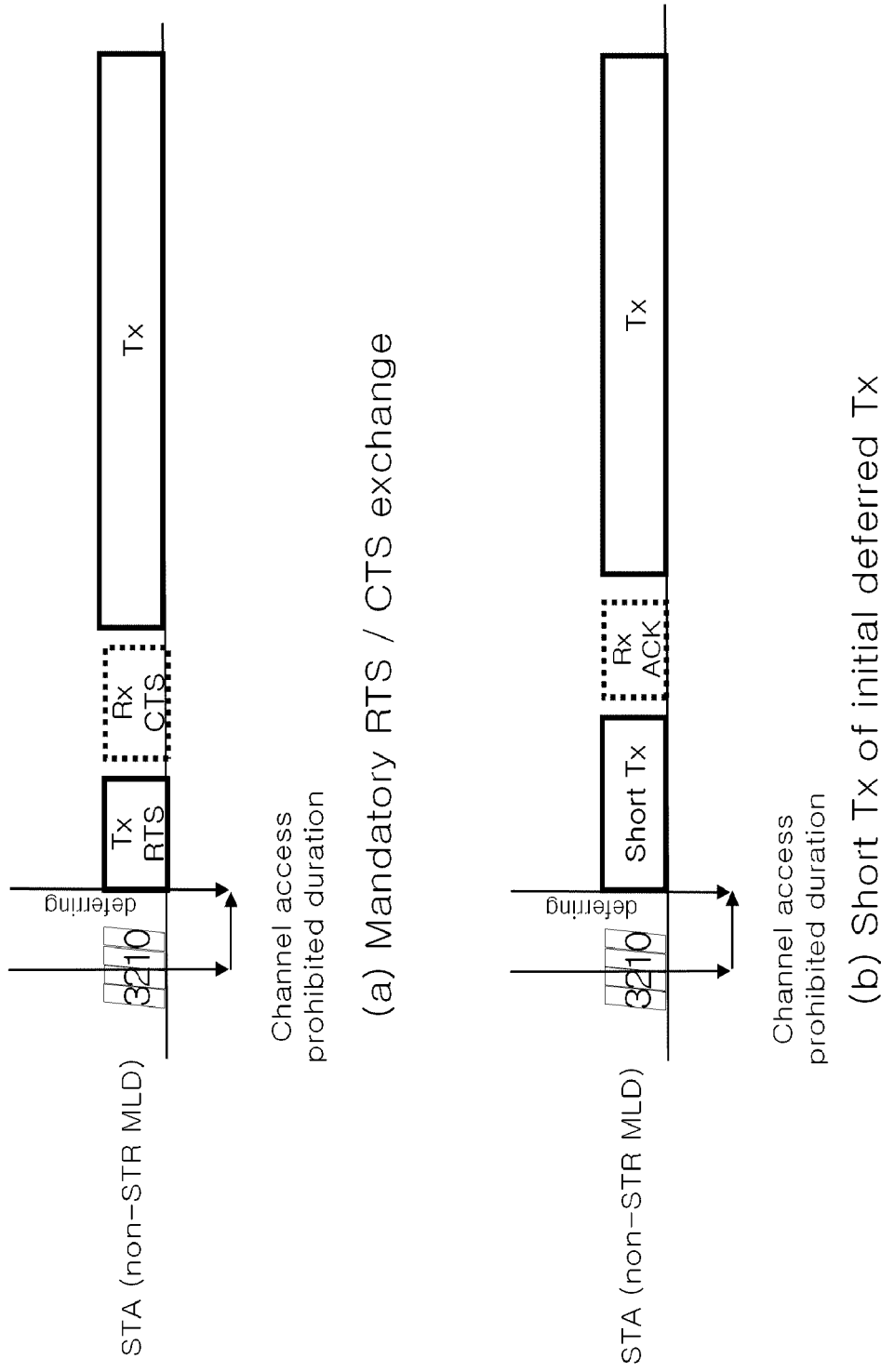
FIG. 15 illustrates an operation in which the station performs transmission after channel access prohibition is released according to an embodiment of the present invention.

FIG. 15 illustrates an operation in which the station performs transmission after the release of channel access prohibition according to an embodiment of the present invention.

As described above, transmission is performed in the first link among the plurality of links in which the non-STR multi-link device operates, and thus transmission may be prohibited in the second link. When the corresponding transmission is completed in the first link, transmission in the second link may start by RTS/CTS frame exchange. Accordingly, when transmission is performed in the first link among the plurality of link in which the non-STR multi-link device operates, the non-STR multi-link device may start the RTS/CTS frame exchange in the second link. After the release of channel access prohibition of the station of which transmission is delayed due to channel access prohibition, the station may start request to send (RTS)/clear to send (CTS) frame exchange before starting delayed transmission. At this time, when the station does not receive the CTS frame, the delayed transmission may not start. In the embodiment of FIG. 15(a), the station of which transmission is delayed due to channel access prohibition transmits the RTS frame before starting delayed transmission. The station starts delayed transmission after receiving the CTS frame in response to the RTS frame.

In another detailed embodiment, after channel access prohibition of the station of which transmission is delayed due to channel access prohibition is released, the station may transmit a frame including only some of the delayed transmission. At this time, after receiving a response to the frame including only some of the delayed transmission, for example, ACK, the station may transmit the part of the delayed transmission which has not been transmitted. When the station does not receive the response to the frame including only some of the delayed transmission, the station may not transmit the part of the delayed transmission which has not be transmitted. As described above, the station starts the RTS/CTS exchange or transmits only some of the delayed transmission by the station after the channel access prohibition is released because a collision probability of transmission after the channel access prohibition may be higher than that of general transmission. Accordingly, the above-described embodiment may be mandatorily applied to transmission performed after the release of channel access prohibition. In the conventional WLAN operation, the RTS/CTS frame was used to solve the hidden node problem and could be used based on the size of transmission data. In the above-described embodiments, the RTS/CTS frame is to prevent transmission collision with the station to perform delayed transmission in order to protect transmission or reception of the non-STR multi-link device.

As described above, when one station of the non-STR multi-link device performs reception, transmission of another station of the non-STR multi-link device may be restricted. Further, when one station of the non-STR multi-link device performs transmission, it may be difficult to accurately sense a channel state of a link in which another station of the non-STR multi-link device operates. Specifically, when the first station of the non-STR multi-link device performs transmission, the second station of the non-STR multi-link device may determine that a channel state of a link in which the second station operates is always busy. Accordingly, even though the channel of the link in which the second station operates is idle, the second station may determine that the channel is busy due to intra-device interference. As described above, when the station of which the channel state cannot be determined due to intra-device interference or when one station of the non-STR multi-link device continuously performs transmission, another station of the non-STR multi-link device is in a blind state. Due to the above-described situations, the station in the blind state may have difficulty in attempting transmission through the backoff procedure. Further, due to the above-described situations, the station in the blind state may have difficulty in starting reception of the PPDU or succeeding in decoding. Accordingly, a method of performing transmission in consideration of the station in the blind state is needed. This will be described with reference to FIG. 16.

Figure 16:
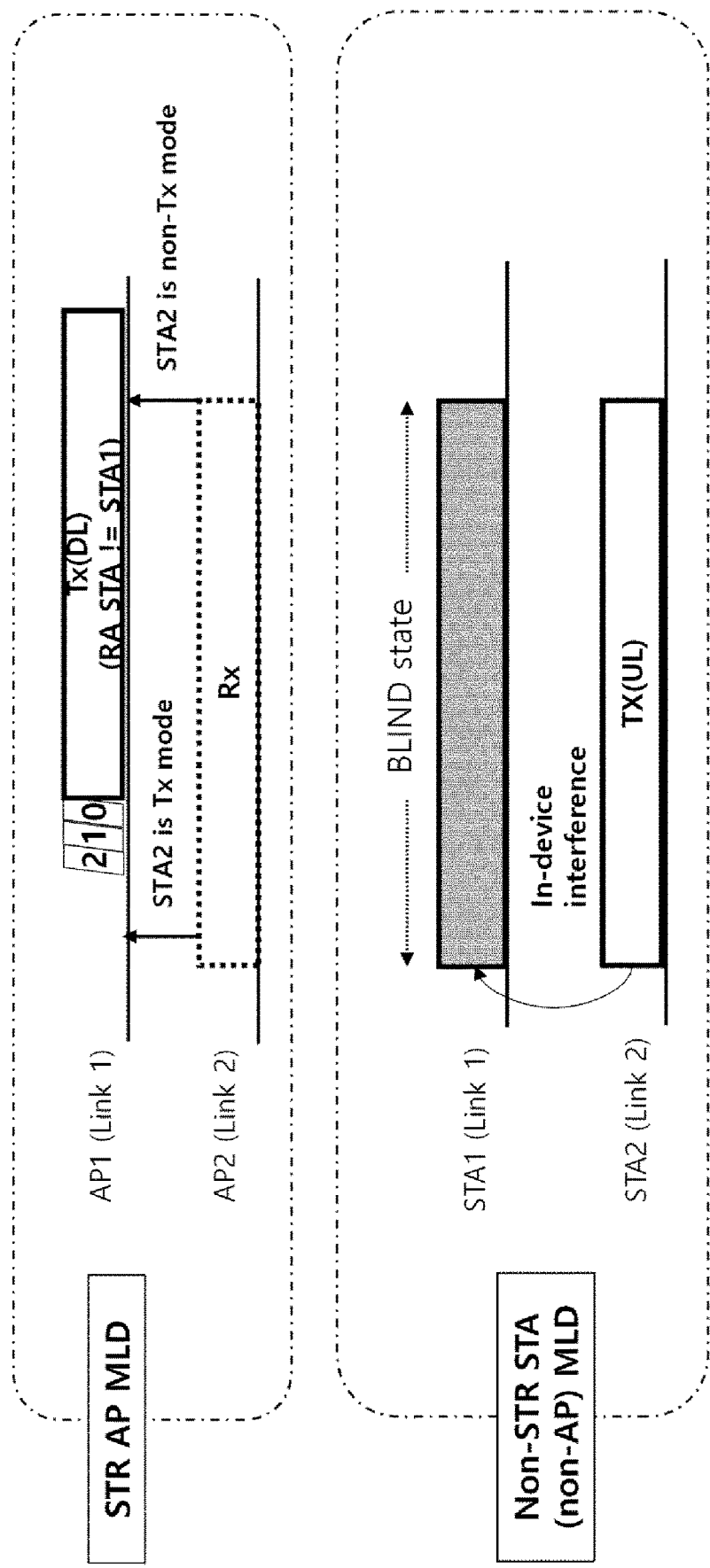
FIG. 16 illustrates transmission performed based on a state of the station within the non-STR multi-link device according to an embodiment of the present invention.

FIG. 16 illustrates transmission performed based on a state of a station within the non-STR multi-link device according to an embodiment of the present invention.

The station to perform transmission to the station of the non-STR multi-link device may determine whether to perform transmission according to whether the station of the non-STR multi-link device is in the blind state. At this time, the station to perform transmission to the station of the non-STR multi-link device may be a station included in the STR multi-link device. Further, the station to perform transmission to the station of the non-STR multi-link device may be an AP included in the AP multi-link device, and the non-STR multi-link device may be a non-AP multi-link device The station to perform transmission to the station of the non-STR multi-link device may determine whether the station of the non-STR multi-link device is in the blind state based on the following description. The station to perform transmission may determine whether another station of the multi-link device including the station is performing transmission to the corresponding non-STR multi-link device. When another station of the multi-link device including the station is performing reception from the corresponding non-STR multi-link device, the station may determine that the station of the non-STR multi-link device to receive transmission of the station is in the blind state. In the embodiment of FIG. 16, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The second station (STA2) is performing transmission to the second AP (AP2). Accordingly, the second AP (AP2) may inform the first AP (AP1) that reception is being performed from the second station (STA2). Specifically, the second AP (AP2) may inform the first AP (AP1) that the entity of transmission to the second AP (AP2) is the second station (STA2). In another detailed embodiment, the second AP (AP2) may inform the first AP (AP1) that the second station (STA2) currently performs transmission. At this time, the first AP (AP1) may determine that the first station (STA1) is in the blind state based on the notification.

That station may not perform transmission to the station in the blind state. This is because there is high probability that the station in the blind state cannot start reception or the station in the blind state cannot decode the PPDU even though transmission is performed to the station in the blind state. At this time, the station may cancel transmission to the station in the blind state and may perform transmission to another station.

When the STR multi-link device performs transmission to the non-STR multi-link device, the STR multi-link device may perform transmission to the non-STR multi-link device in a plurality of links. Specifically, when the STR multi-link device performs transmission to the non-STR multi-link device in the first link, the STR multi-link device may start transmission to the non-STR multi-link device in the second link. At this time, the STR multi-link device may determine the length of transmission performed in the second link based on the transmission corresponding to transmission to the non-STR multi-link device. Specifically, the STR multi-link device may determine the length of transmission to the non-STR multi-link device in the second link based on the length of the transmission to the non-STR multi-link device in the first link. In a detailed embodiment, the STR multi-link device may simultaneously end the transmission in the first link and the transmission in the second link. This is to prevent transmission to another station of the non-STR multi-link device while one of the stations of the non-STR multi-link device transmits a response, for example, ACK after transmission to one of the stations of the non-STR multi-link device first ends. Through the above-described embodiment, a plurality of stations of the non-STR multi-link device may simultaneously transmit responses to transmission to the plurality of stations.

The STR multi-link device cannot determine states of the stations included in the non-STR multi-link device in real time. Accordingly, even though the STR multi-link device operates according to the embodiments described with reference to FIG. 16, interference or transmission collision may be generated between links in which the non-STR multi-link device operates. For example, in the embodiment of FIG. 16, the first AP (AP1) may start transmission to the first station (STA1) before recognizing that the second station (STA2) is performing transmission to the second AP (AP2). As described above, a probability of inter-link interference or collision may be higher than a probability of intra-link interference or transmission collision. This will be described in more detail with reference to FIG. 17.

FIG. 17 illustrates a situation in which inter-link interference or collision is generated.

When transmission to the second AP of the STR AP multi-link device by the second station of the non-STR station multi-link device and transmission to the first station of the non-STR multi-link device by the first AP of the STR AP multi-link device simultaneously start, transmission collision may be generated between links. FIG. 17(a) illustrates the same. This is because, as described above, the STR multi-link device cannot determine the states of the stations included in the non-STR multi-link device in real time.

Further, even when transmission to the second AP of the STR AP multi-link device by the second station of the non-STR multi-link device starts earlier than transmission to the first station of the non-STR multi-link device by the first AP of the STR-AP multi-link device, transmission collision may be generated between links. FIG. 17(b) illustrates the same. This is because it takes time for the second AP (AP2) to inform the first AP (AP1) that the second station (STA2) is performing transmission. As described above, since transmission collision is generated between stations starting transmission at different time points, the probability of inter-link interference or transmission collision may be higher than the probability of intra-link interference or collision. Further, as the time spent for identifying a transmitter of the PPDU received by the AP of the STR multi-link device is delayed, the probability of interference or transmission collision between links may be higher. Accordingly, a method of solving the problem is needed. When one of the stations of the STR multi-link device performs reception, another station of the STR multi-link device may not perform channel access. However, when the channel access is prohibited, the meaning of implementation of the STR function may disappear. Accordingly, an operation method other than the channel access prohibition of the STR multi-link device is required. This will be described with reference to FIG. 18.

FIG. 18 illustrates an operation in which the STR multi-link device stops transmission to the non-STR multi-link device according to an embodiment of the present invention.

When the station of the STR multi-link device determines that the station of the non-STR multi-link device is in the blind state during transmission to the station of the non-STR multi-link device, the STR multi-link device may stop transmission to the station of the non-STR multi-link device in the blind state. Specifically, the STR multi-link device may determine whether the station of the non-STR multi-link device is in the blind state based on a value indicated by an STA (AID)-ID in a signaling field of the received PPDU or a transmitting address (TA) field of a MAC frame included in the received PPDU. At this time, the STA-ID may be a value indicating the station transmitting a UL PPDU. In a detailed embodiment, when the value indicated by the STA (AID)-ID in the signaling field of the received PPDU indicates the first station included in the non-STR multi-link device, the STR multi-link device may determine that the second station included in the non-STR multi-link device is in the blind state. Further, when the TA field of the MAC frame included in the received PPDU indicates the first station included in the non-STR multi-link device, the STR multi-link device may determine that the second station included in the non-STR multi-link device is in the blind state. An operation of the station after cancelling of transmission is first described.

When a TXOP configured in the station of the non-STR multi-link device is left, the station cancelling the transmission to the station of the non-STR multi-link device may attempt transmission to a station different from the station of the non-STR multi-link device. At this time, the station cancelling the transmission to the station of the non-STR multi-link device may perform transmission to the station different from the station of the non-STR multi-link device without a separate backoff procedure. In a detailed embodiment, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, the predetermined time interval may be one of SIFS, PDIF, and DIFS.

When performing transmission to the station different from the station of the non-STR multi-link device, the station cancelling the transmission to the station of the non-STR multi-link device may transmit traffic having a priority equal to or higher than that of traffic of the cancelled transmission. This is because, transmission of traffic having the priority lower than that of traffic used for channel access for the cancelled transmission is not fair. In the above-described embodiments, the station of the STR multi-link device may be an AP.

The station cancelling transmission to the station of the non-STR multi-link device may initialize the configured TXOP. Specifically, the station cancelling the transmission to the station of the non-STR multi-link device may transmit a CF-End frame after cancelling the transmission. It may allow another station operating in the link in which transmission is scheduled to use the link.

In FIG. 18, the STR AP multi-link device includes the first AP (AP1) operating in the first link (link1) and the second AP (AP2) operating in the second link (link2). The non-STR non-AP multi-link device includes the first station (STA1) operating in the first link (link1) and the second station (STA2) operating in the second link (link2). The second station (STA2) is performing transmission to the second AP (AP2). The first AP (AP1) determines that the first station (STA1) is in the blind state during transmission to the first station (STA1). Accordingly, the first AP (AP1) stops transmission to the first station (STA1). In FIG. 18(*a*), after stopping transmission to the first station (STA1), the first AP (AP1) performs transmission to a station different from the first station (STA1) as mentioned in the first described embodiment. In FIG. 18(*b*), after stopping transmission to the first station (STA1), the first AP (AP1) transmits a CF-END frame as mentioned in the later described embodiment.

When the station stops transmission, the station may transmit a fragment, which is being transmitted, and then may not transmit the following fragment. In a detailed embodiment, the station may immediately stop transmission of a packet which is being transmitted.

In the above-described embodiments, when stopping transmission to the station of the non-STR multi-link device in the blind state and performing transmission to the station different from the station of the non-STR multi-link device, the STR multi-link device is required to inform another station that transmission to another station can be performed for stable reception thereof. A method therefor is described. For convenience of description, a station different from the station of the non-STR multi-link device in the blind state is referred to as a different station.

The station of the STR multi-link device may insert an address of the different station into the MAC frame. Specifically, the station of the STR multi-link device may insert an address of an intended receiver of the MAC frame into a receiving address (RA) of the MAC frame and insert an address of the different station into a separate field. In a detailed embodiment, the station of the device may insert the address of the different station into EHT-SIG. Specifically, the station of the STR multi-link device may insert the address of the intended receiver of the PPDU and the address of the different station into a user field of the signaling field of the PPDU. At this time, the address of the different station may be inserted after the address of the intended receiver of the PPDU in the user field of the signaling field of the PPDU.

In another detailed embodiment, the station may monitor reception of the PPDU during a predetermined time after recognizing that the intended receiver of the PPDU is not the station. Specifically, the station may monitor whether PPDU reception continues for a predetermined time after recognizing that the intended receiver of the received PPDU is not the station. Accordingly, the station may determine whether to stop transmission of the PPDU and start transmission to the station. In the embodiments, when it is determined that PPDU transmission continues for a predetermined time, the station may enter a doze state. When it is determined that the PPDU transmission does not continue for the predetermined time, the station may maintain a wake-up state. At this time, when the station receives a new PPDU, the station may decode the PPDU.

In another detailed embodiment, the station transmitting the PPDU may insert information signaling that PPDU transmission can be stopped into the PPDU. The information signaling that the PPDU transmission can be stopped may be a sub field of 1 bit. For example, when a value of the sub field signaling that PPDU transmission can be stopped is 1, the station receiving the PPDU may determine that the PPDU transmission can be stopped before a time point indicated by a length field of the signaling field of the PPDU and a duration field of the MAC frame. When the station determines that the PPDU transmission can be stopped before a time point indicated by a length field of the signaling field of the PPDU and a duration field of the MAC frame, the station may postpone entering into the doze state. Further, the station transmitting the PPDU may insert the information signaling that the transmission can be stopped into a reserved field of the PPDU.

As described above, it is possible to prevent unnecessary channel occupation through transmission cancel or transmission stop.

When transmission is stopped or delayed due to transmission collision between links, a value of CW used for channel access may be doubled like general transmission failure. When transmission is stopped or delayed due to transmission collision between links, a value of CW used for channel access may not be doubled unlike general transmission failure. That is, the station may maintain the value of CW used for channel access. Doubling the value of CW is to reduce the probability of transmission collision by increasing a range of numbers which can be the value of backoff counter. When the station can be clearly recognize transmission collision between links, such a need may be low. Further, when transmission is stopped or delayed due to transmission collision between links, doubling of a value of CW by the station may delay the transmission. However, when inter-link transmission collision and intra-link collision are simultaneously generated, the station needs to double the value of CW. This will be described with reference to FIG. 19.

FIG. 19 illustrates processing of the value of CW when the STR multi-link device recognizes transmission collision between links according to an embodiment of the present invention.

As described in the embodiments, when the station cancels transmission due to transmission performed by the non-STR multi-link device, the station may sense the channel state after cancelling the transmission. When it is sensed that the channel is not idle, the station may double the value of CW. At this time, doubling may follow the embodiment described with reference to FIG. 6. Further, when it is sensed that the channel is idle, the station may maintain the value of CW. The embodiment is to, since the possibility of transmission collision within the link is low even though it is sensed that the channel is idle, handle the case to be different from transmission success. In another detailed embodiment, when it is sensed that the channel is idle, the station may configure the value of CW as a minimum value (CW_min) of CW. The embodiment is to, since the possibility of transmission collision within the link is low when it is sensed that the channel is idle, handle the case to be the same as transmission success. The station may apply the above-described embodiments to CW of the AC of traffic included in the cancelled transmission.

Further, when the transmission is cancelled according to the above-described embodiments, the station may not increase a retry counter. At this time, the retry counter may include at least one of a long retry counter and a short try counter.

In the embodiment, cancelling transmission may include at least one of stopping transmission or delaying transmission before starting the transmission.

When the station cancels transmission after transmitting a CTS-to-Self frame before attempting the transmission, the station may not start RTS/CTS frame exchange before attempting the transmission after cancelling the transmission. This is because NAV is configured through the CTS-to-Self frame. Further, when a TXOP is left when the station attempts transmission again after cancelling the transmission, the station may attempt the transmission without any backoff procedure.

In FIG. 19, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The second station (STA2) is performing transmission to the second AP (AP2). The first AP (AP1) determines that the first station (STA1) is in the blind state during transmission to the first station (STA1). Accordingly, the first AP (AP1) stops transmission to the first station (STA1). In FIG. 19(a), the first AP (AP1) determines that the channel of the first link (link1) is idle. At this time, since the TXOP is not left, the first AP (AP1) accesses the channel through the backoff procedure. In FIG. 19(b), the first AP (AP1) determines that the channel of the first link (link1) is not idle. At this time, since the TXOP is left, the first AP (AP1) attempts transmission without the backoff procedure.

In the above-described embodiments, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, duration of the predetermined time interval may be a problem. The station receiving the PPDU of which transmission is cancelled may fail in decoding the PPDU. At this time, when it is sensed that the channel is idle by an extended interframe space (EIFS), the station failing in decoding the PPDU may start the backoff procedure. Accordingly, it is a problem whether to configure the predetermined time interval to be longer than or equal to the EIFS. This will be described with reference to FIG. 20.

Figure 20:
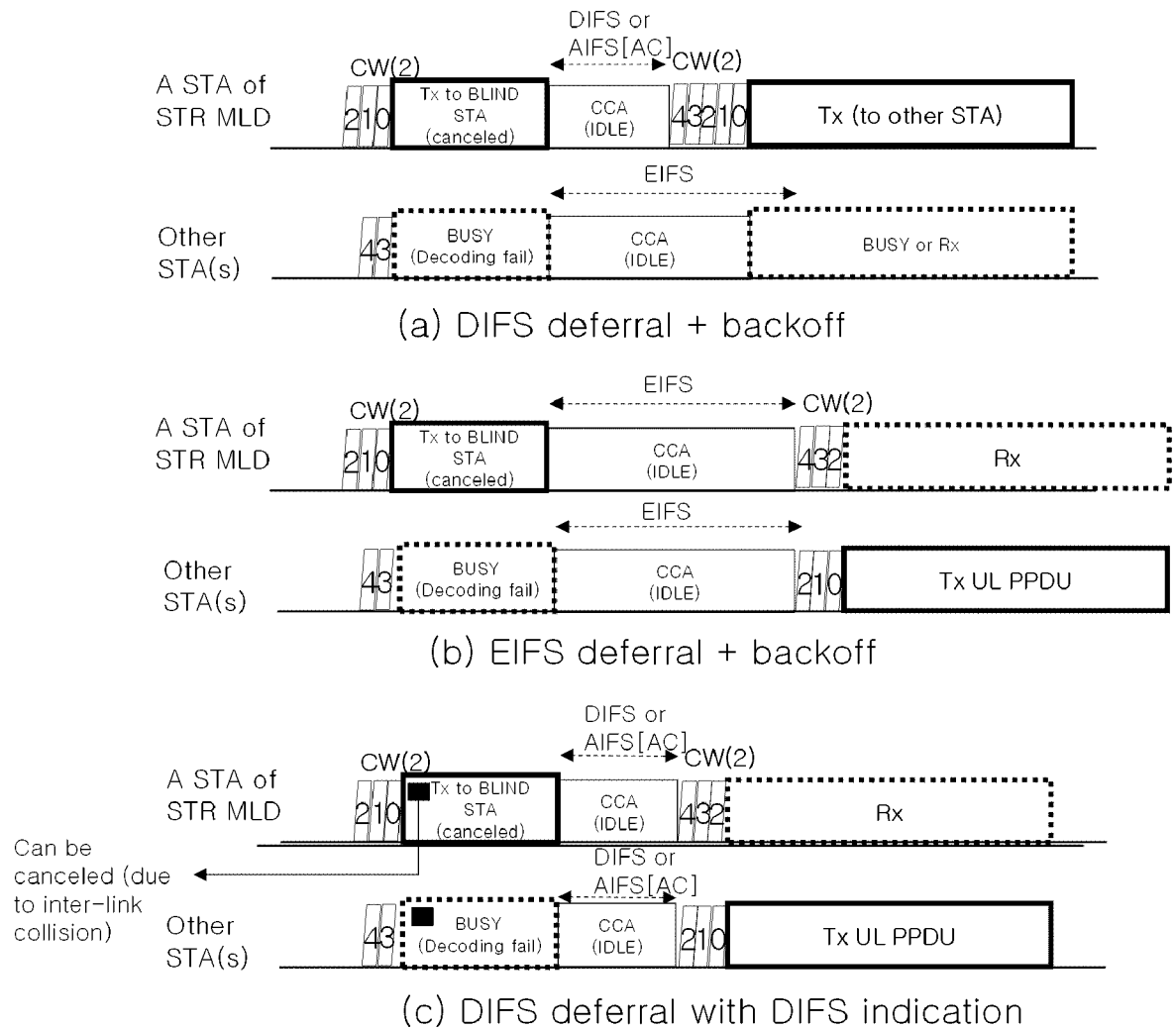
FIG. 20 illustrates an operation in which the STR multi-link device stops transmission to the non-STR multi-link device and then performs channel access again according to an embodiment of the present invention.

FIG. 20 illustrates an operation in which the STR multi-link device performs channel access again after stopping transmission to the non-STR multi-link device according to an embodiment of the present invention.

As illustrated in FIG. 20(a), the predetermined time interval may be DIFS. This considers that the station of the STR multi-link device acquires a channel access opportunity through a competition procedure and loses the acquired channel access opportunity due to transmission collision between links. That is, since the station of the STR multi-link device acquires the channel access opportunity through the competition procedure, a higher priority to perform channel access is provided to the station than other stations. When EDCA is applied, DIFS may be replaced with AIFS [AC].

In another detailed embodiment, the predetermined time interval may be EIFS as illustrated in FIG. 20(b). This considers that the STR multi-link device can be considered to already exhaust the transmission opportunities and considers fairness with other stations.

In another detailed embodiment, as illustrated in FIG. 20(c), when information in the signaling field of the PPDU indicating that transmission can be stopped is signaled, the predetermined time interval may be DIFS. Further, when the station receiving the PPDU detects the stop of PPDU transmission, the station may sense whether the channel is idle during DIFS rather than EIFS. At this time, it is sensed that the channel is idle during DIFS, the corresponding station may start the backoff procedure. Through the embodiment, it is possible to improve the performance of overall networks and guarantee fairness between stations. When EDCA is applied, DIFS may be replaced with AIFS [AC].

As described above, the STR multi-link device may recognize that transmission collision between links may be generated. Specifically, when the first station of the STR multi-link device completes the backoff procedure, the second station of the STR multi-link device may be receiving the PPDU. At this time, when the second station has not completed decoding of the signaling field of the PPDU, the first station may determine that the transmission collision between links cannot be recognized but there is a possibility thereof. At this time, the first station may insert information indicating that transmission can be stopped into the transmitted PPDU as described above. Further, for stable and efficient transmission, the NSTR multi-link device may transmit the CTS-to-Self frame before transmission to the non-STR multi-link device. This will be described with reference to FIG. 21.

Figure 21:
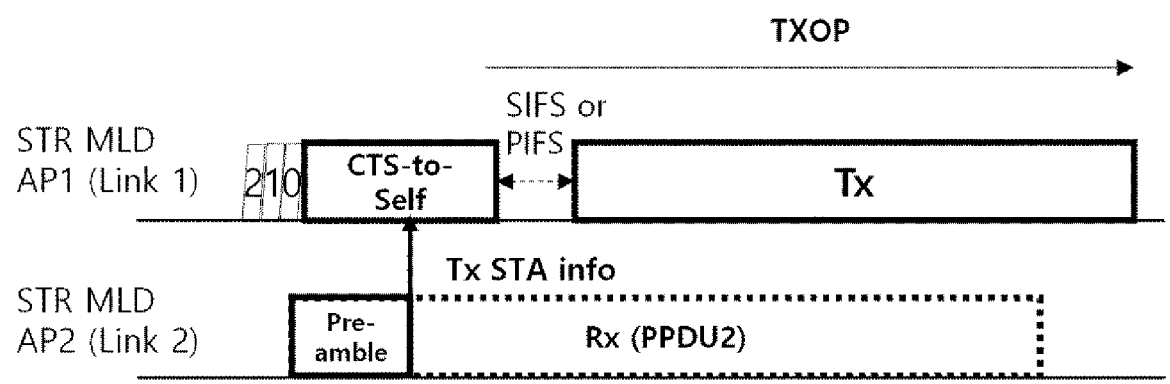
FIG. 21 illustrates an operation in which the STR multi-link device transmits a CTS-to-Self frame before transmission to the non-STR multi-link device according to an embodiment of the present invention.

FIG. 21 illustrates an operation in which the STR multi-link device transmits the CTS-to-Self frame before transmission to the non-STR multi-link device according to an embodiment of the present invention.

The station of the STR multi-link device may transmit the CTS-to-Self frame before transmission to the non-STR multi-link device. Specifically, when the second station of the STR multi-link device attempts transmission to the non-STR multi-link device while the first station of the STR multi-link device performs reception, the second station of the STR multi-link device may transmit the CTS-to-Self frame before transmission to the non-STR multi-link device. Accordingly, the second station may secure the TXOP for transmission to the non-STR multi-link device. Further, before performing transmission to the non-STR multi-link device, the second station may determine whether transmission to the first station is performed from the corresponding non-STR multi-link device. The second station may determine a destination station of the transmission according to whether the transmission to the first station is performed from the corresponding non-STR multi-link device. Specifically, when the transmission to the first station is not performed from the corresponding non-STR multi-link device, the second station may perform transmission to the corresponding non-STR multi-link device. When the transmission to the first station is performed from the corresponding non-STR multi-link device, the second station may perform transmission to the station which is not included in the corresponding non-STR multi-link device. For example, when the first station plans transmission of an SU-PPDU for the station of the non-STR multi-link device, an MU-PPDU including data for the station of the non-STR multi-link device, or a PPDU including a trigger frame for triggering transmission of the station of the non-STR multi-link device, the first station may cancel the planned transmission. At this time, the first station may attempt transmission of an SU-PPDU for a station which is not the station of the non-STR multi-link device, an MU-PPDU that does not include the data for the station of the non-STR multi-link device, or a PPDU including a trigger frame that does not trigger transmission of the station of the non-STR multi-link device. At this time, the first station may start transmission after a time longer than SIFS from the transmission of the CTS-to-Self frame. Specifically, the first station may start transmission after PIFS from the transmission of the CTS-to-Self frame. The station transmitting the CTS-to-Self frame should start transmission after SIFS from the transmission of the CTS-to-Self frame. When the planned transmission is cancelled and new transmission is attempted as described in the embodiments, a processing time of the STR multi-link device for generating the MPDU to be newly transmitted is needed. Accordingly, exception may be applied to rules for the time interval between the CTS-to-Self frame and the transmission. In the embodiments, the second station exceeds the TXOP acquired by CTS-to-Self and thus cannot perform transmission in principle.

In FIG. 21, the STR multi-link device includes the first AP (AP1) operating in the first link (link1) and the second AP (AP2) operating in the second link (link2). Since the second AP (AP2) performs reception and the first AP (AP1) plans transmission to the station of the non-STR multi-link device, the first AP (AP1) transmits the CTS-to-Self frame before the planed transmission. As described above, the first AP (AP1) determines the destination station of the transmission based on the determination for the station transmitting the PPDU received by the second AP (AP2). Further, the first AP (AP1) performs transmission after SIFS or PIFS from the transmission of the CTS-to-Self frame.

The second station may start the RTS/CTS frame exchange procedure by transmitting the RTS frame instead of transmitting the CTS-to-Self frame. Accordingly, the second station may acquire an effect similar to the transmission of the CTS-to-Self frame. In the case of the RTS/CTS frame exchange, the second station may acquire the TXOP only when the destination station of transmission is not in the blind state.

Figure 22:
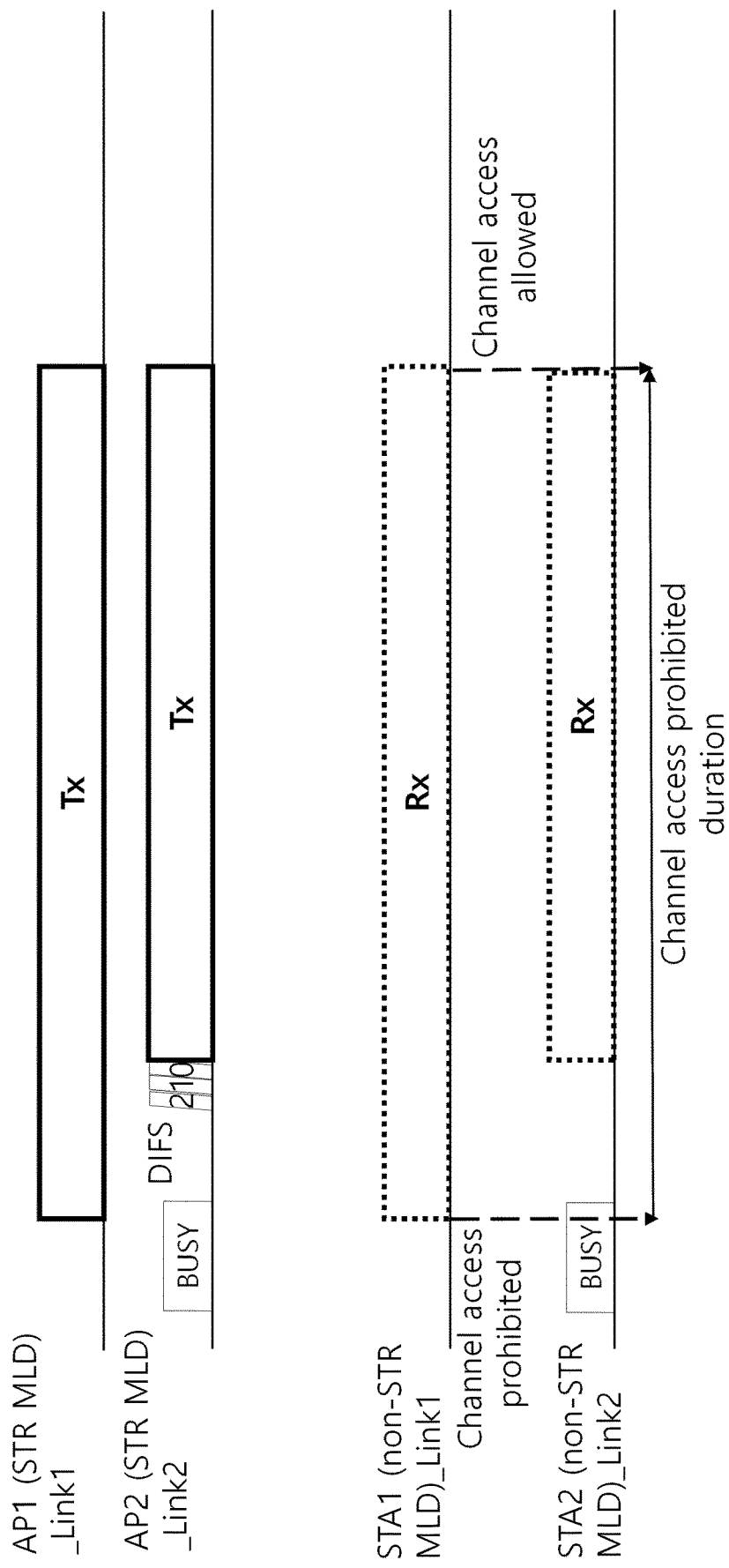
FIG. 22 illustrates the performance of transmission to a plurality of stations included in one non-STR multi-link device by a plurality of APs included in the STR multi-link device according to an embodiment of the present invention.

FIG. 22 illustrates the performance of transmission to a plurality of stations included in one non-STR multi-link device b a plurality of APs included in the STR multi-link device according to an embodiment of the present invention.

The plurality of stations included in one non-STR multi-link device may simultaneously perform reception. This is because simultaneous reception by a plurality of stations may cause only small interference. FIG. 22 illustrates the performance of simultaneous reception by a plurality of stations included in one non-STR multi-link device. At this time, for the stable operation of the non-STR multi-link device, a plurality of APs included in the STR multi-link device may perform a plurality of transmissions of which the transmission ends are synchronized to a plurality of stations included in one non-STR multi-link device. This will be described with reference to FIG. 23.

Figure 23:
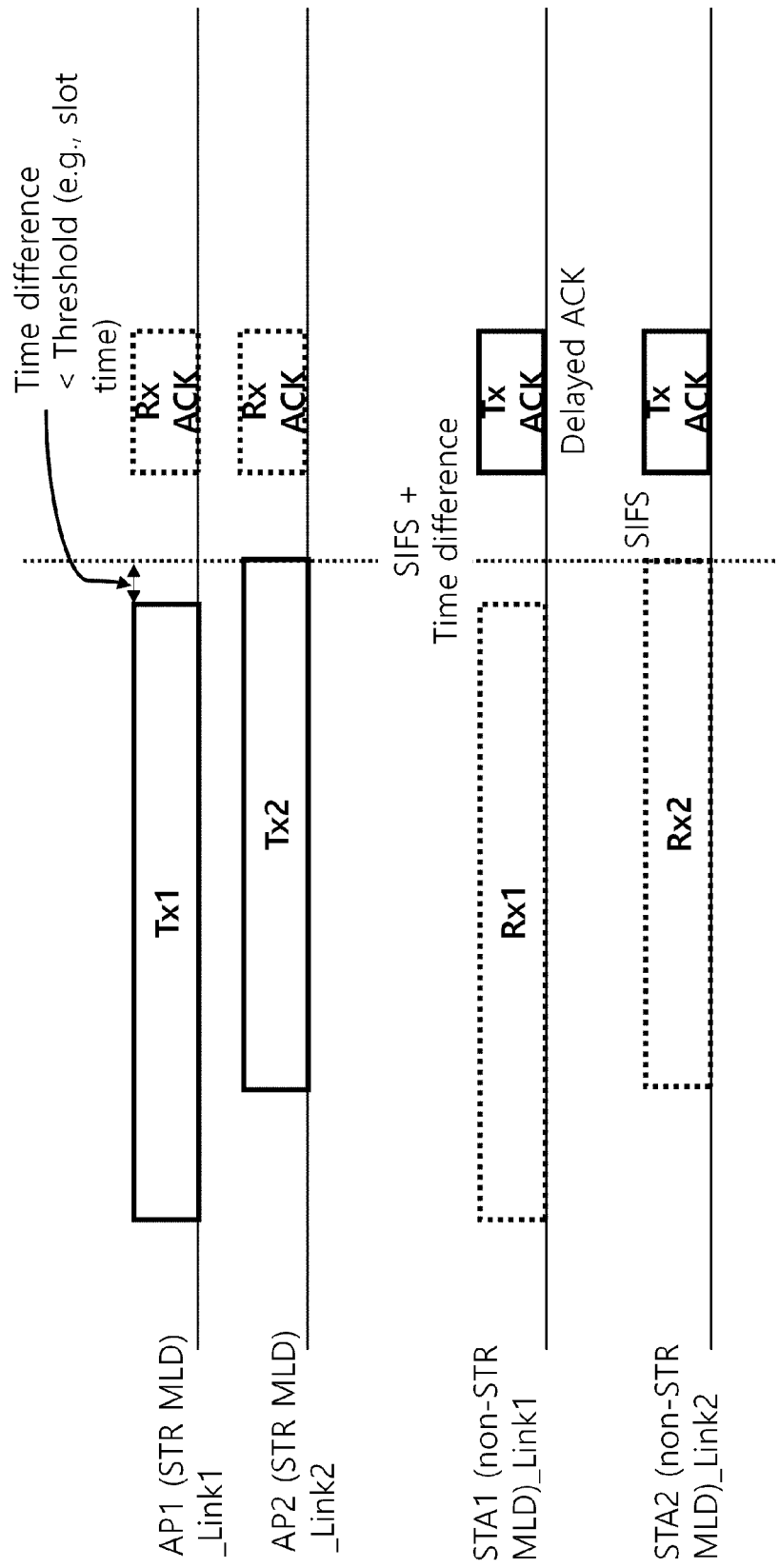
FIG. 23 illustrates the performance of a plurality of transmissions of which transmission ends are synchronized to a plurality of stations included in one non-STR multi-link device by a plurality of APs included in the STR multi-link device according to an embodiment of the present invention.

FIG. 23 illustrates the performance of a plurality of transmissions of which the transmission ends are synchronized to a plurality of stations included in one non-STRU multi-link device by a plurality of APs included in the STR multi-link device according to an embodiment of the present invention.

When the multi-link device performs transmission in one of the non-STR links, the multi-link device may simplify the channel access procedure for transmission performed in another link. Specifically, when the first station of the multi-link device completes the backoff channel access procedure in the first link, if the channel is idle during a predetermined time interval within the link of the second station of the STR multi-link device, the second station of the STR multi-link device may start transmission in the second link.

In a detailed embodiment, when one station of the STR multi-link device performs transmission to one station of the non-STR multi-link device, the channel access procedure of another station of the STR multi-link device may be simplified. Specifically, when the first station of the STR multi-link device completes the backoff channel access procedure of transmission to the first station of the non-STR multi-link device, if the channel is idle during a predetermined time interval within the link of the second station of the STR multi-link device, the second station of the STR multi-link device may start transmission to the second station of the non-STR multi-link device. At this time, the predetermined time interval may be PIFS. Such an operation may be applied when the first station and the second station of the STR multi-link device perform transmission to stations included in one non-STR multi-link device. In the embodiments, the first station and the second station may start transmission with a difference within a predetermined time interval. The predetermined time interval may be a slot time.

Further, when the first station and the second station of the STR multi-link device perform transmission to stations included in one non-STR multi-link device, transmission ends of the first station and the second station may be synchronized. At this time, synchronization of the transmission ends of the first station and the second station may indicate the end of the first station and the end of the second station with a difference within a first predetermined time interval. The first predetermined time interval may indicate the inside of a slot boundary or a symbol boundary.

The plurality of stations of the non-STR multi-link device receiving the synchronized transmission ends may simultaneously perform the following transmission, for example, responses. At this time, the responses may include ACK. In the conventional WLAN, the transmission following reception is performed after SIFS from the reception. However, with respect to a plurality of transmissions having ended with a slight time difference, performing the following transmissions with a slight time difference may make implementation more complicated compared to performing the following transmissions at the same time. Accordingly, as described above, the plurality of stations of the non-STR multi-link device receiving the synchronized transmission ends may simultaneously perform the following transmissions. At this time, an interval between transmissions follow at least one of the plurality of transmissions of which the transmission ends are synchronized may be a sum of SIFS and time within a predetermined time interval. Specifically, transmission following the transmission that first ends among the plurality of transmissions of which the transmission ends are synchronized may be performed at an interval obtained by adding the SIFS and the time within the predetermined time interval from the transmission. At this time, the predetermined time interval may be one of a slot time or a symbol length. Further, a difference within the predetermined time interval may be a difference between the end of transmission that last ends among the plurality of transmissions of which the transmission ends are synchronized and transmission that first ends among the plurality of transmissions of which the transmission ends are synchronized.

In another detailed embodiment, when the plurality of transmissions end with a time difference within the first predetermined time interval, a plurality of stations receiving the transmissions may perform the synchronized following transmissions. The plurality of following transmissions of which the transmission ends are synchronized may indicate a plurality of following transmissions performed with a time difference within a second predetermined time interval. Further, a difference within the second predetermined time interval may be a difference between the end of transmission that last ends among the plurality of synchronized transmissions and transmission that first ends among the plurality of transmissions of which the transmission ends are synchronized. At this time, the second predetermined time interval may be smaller than the first predetermined time interval. PPDUs of which transmission ends are synchronized may be referred to as sync PPDUs.

In FIG. 23, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). Each of the first AP (AP1) and the second AP (AP2) synchronize ends of transmission to the first station (STA1) and the second station (STA2). That is, after the first station (STA1) ends transmission, the second station (STA2) ends transmission within a predetermined time interval from the first station (STA1). The first station (STA1) and the second station (STA2) simultaneously transmit ACK. At this time, the first station (STA1) transmits ACK after SIFS and difference between the end of transmission of the first station and the end of transmission to the second station (STA2) from the end of transmission to the first station (STA1).

The embodiments may be applied to transmission in which an ACK policy is not configured as No ACK. Specifically, the ACK policy may be applied to the case other than an immediate response. In a detailed embodiment, when a plurality of stations of the multi-link device receive transmissions of which transmission ends are synchronized, the plurality of stations of the multi-link device may simultaneously receive an ACK request and transmit ACK according to the ACK request. The plurality of stations of the multi-link device receiving transmission in which the ACK policy is configured as a value other than No ACK within a predetermined time may simultaneously start ACK.

When there is a non-STR multi-link device, the non-STR multi-link device should be considered during an operation of configuring the TXOP by transmitting the RTS/CTS frame and the CTS-to-Self frame. This will be described with reference to FIGS. 24 to 29.

Figure 24:
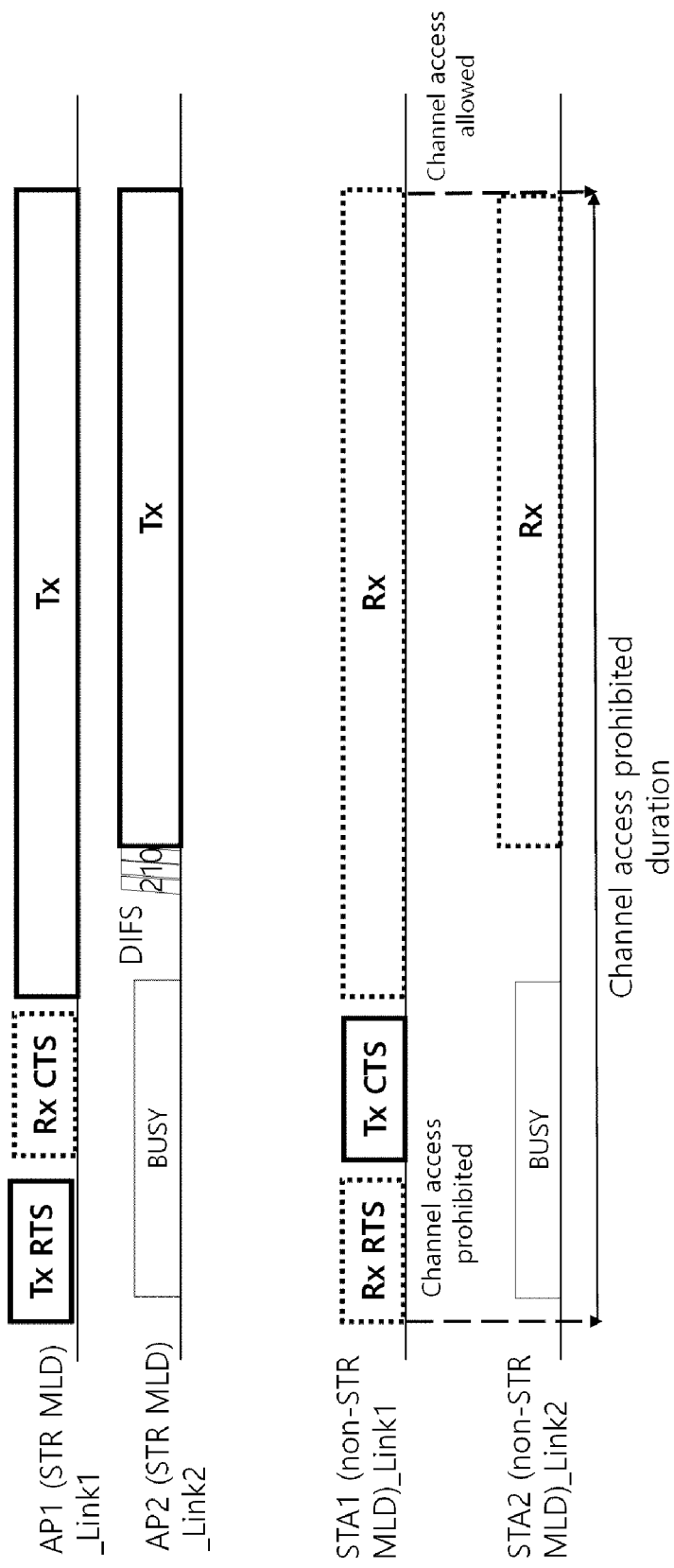
FIG. 24 illustrates an exchange of an RTS/CTS frame by the multi-link device according to an embodiment of the present invention.

FIG. 24 illustrates an exchange of RTS/CTS frames by the multi-link device according to an embodiment of the present invention.

Even when there is the non-STR multi-link device, the RTS/CTS frame exchange procedure may follow the procedure defined in the conventional WLAN. The RTS/CTS frames may be used to configure NAV of the station operating in another link. Specifically, the station receiving the RTS/CTS frames may operate in a link different from the link in which the corresponding station operates and transfer the RTS/CTS frames to another station included in the multi-link device including the corresponding station.

However, as described in the above embodiments, when there is the non-STR multi-link device, channel access or transmission may be restricted. Accordingly, as illustrated in FIG. 24, RTS/CTS may not be transmitted. That is, the station planning transmission to the first station of the non-STR multi-link device may not attempt the RTS/CTS frame exchange if the second station of the non-STR multi-link device is performing reception.

In FIG. 24, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). When the first AP (AP1) transmits the RTS frame to the first station (STA1), channel access of the second station (STA2) is prohibited. The second AP (AP2) may determine that channel access of the second station (STA2) is prohibited. Accordingly, the second AP (AP2) does not attempt the RTX/CTS frame exchange with the second station (STA2). In the embodiment, a hidden node problem may occur. This will be described with reference to FIG. 25.

Figure 25:
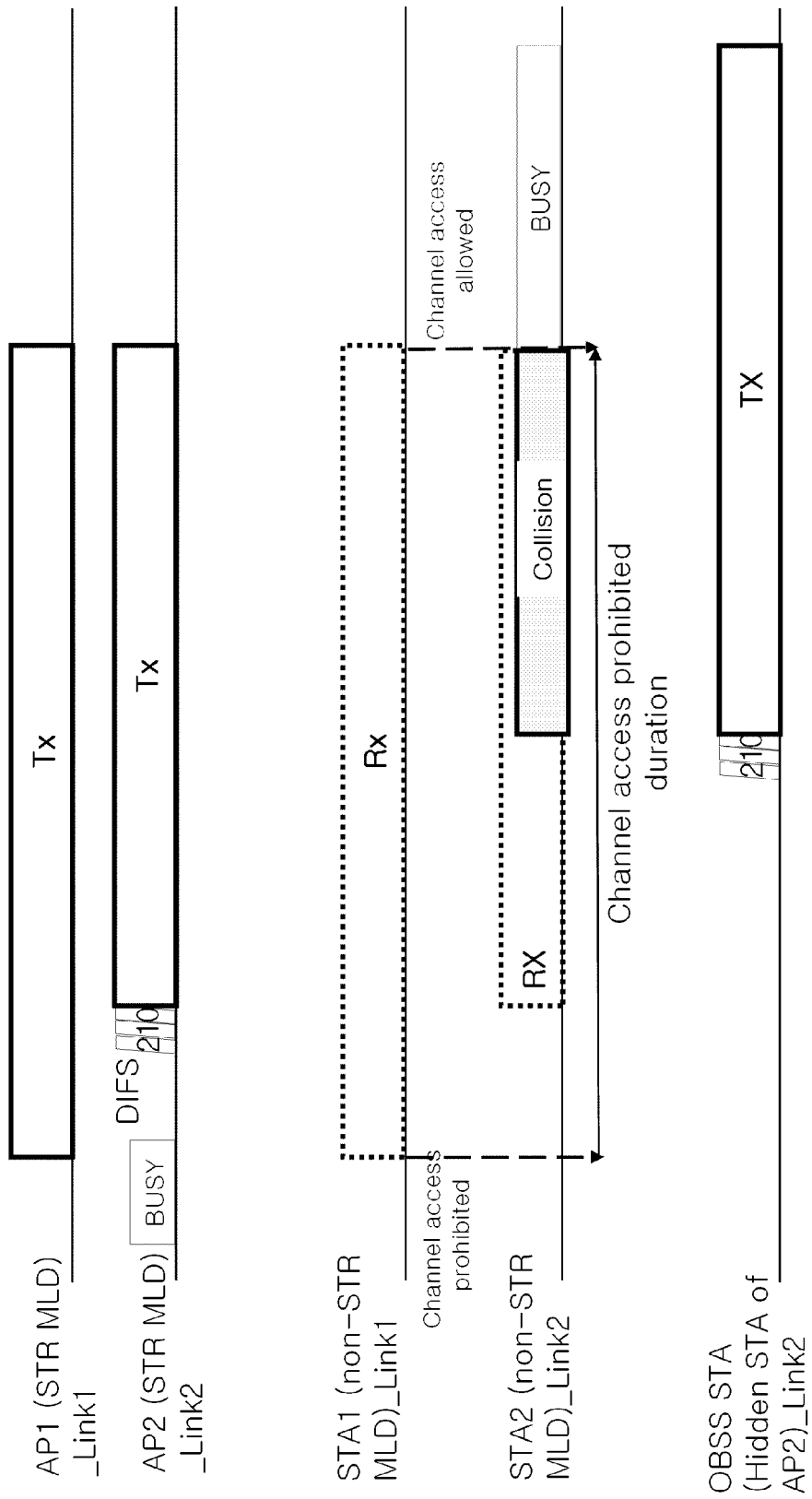
FIG. 25 illustrates a hidden node problem occurring in an RTS/CTS frame exchange procedure according to an embodiment of the present invention described with reference to FIG. 24.

FIG. 25 illustrates the hidden node problem occurring in the RTS/CTS frame exchange procedure according to the embodiment described with reference to FIG. 24.

The station performing transmission to the station of the non-STR multi-link device may perform transmission without the CTS/RTS exchange as described above. At this time, since the TXOP is not configured in another station, another station may attempt transmission and thus the station of the non-STR multi-link device may fail in receiving transmission. In the embodiment of FIG. 25, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). Due to transmission to the first station (STA1) of the first AP (AP1), the second AP (AP2) could not transmit the RTS frame before transmission. Accordingly, the TXOP for transmission of the second AP (AP2) is not configured in the station operating in the second link (link2). Therefore, when the second AP (AP2) performs transmission to the second station (STA2), a station of another BSS (OBSS STA) performs transmission in the second link (link2). According thereto, the second station (STA2) fails in receiving transmission of the second AP (AP2). In order to solve the hidden node problem, the following embodiments may be applied.

In a detailed embodiment, when one station of the non-STR multi-link device performs reception, the station is not allowed to perform transmission to any station of the non-STR multi-link device. In another detailed embodiment, when the second station of the non-STR multi-link device performs reception while the station performs transmission to the first station of the non-STR multi-link device, the station may simultaneously perform the transmission and the transmission to the second station. When the second station of the non-STR multi-link device performs reception while the station performs transmission to the first station of the non-STR multi-link device, the station may synchronize the end of transmission to the first station and the end of transmission to the second station. Specifically, when the second station of the non-STR multi-link device performs reception while the station performs transmission to the first station of the non-STR multi-link device, the station may simultaneously end the transmission to the first station and the transmission to the second station. In the embodiments, transmission to the second station may be performed by another station of the multi-link device including the station.

Figure 26:
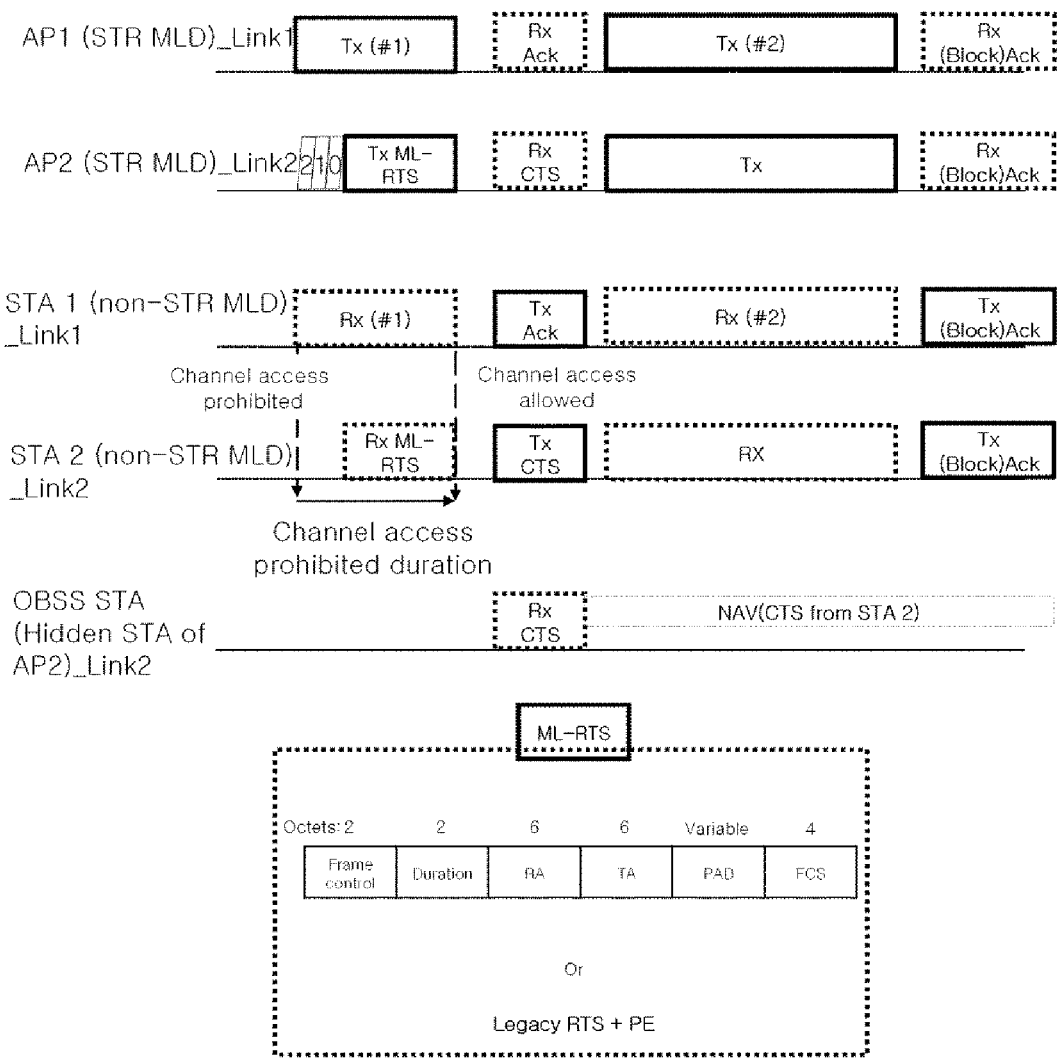
FIG. 26 illustrates the RTS/CTS frame exchange by the multi-link device according to an embodiment of the present invention.

FIG. 26 illustrates an RTS/CTS frame exchange by the multi-link device according to an embodiment of the present invention.

In another embodiment of the present invention, when the second station of the multi-link device transmits an RTS frame to a fourth station of the non-STR multi-link device while the first station of the multi-link device continues to perform transmission to a third station of the non-STR multi-link device, the first station may end the transmission to the third station before a time point at which the fourth station transmits the RTS frame. Accordingly, the fourth station may transmit a CTS frame to the second station. Therefore, a TXOP for the frame exchange between the second station and the fourth station may be configured. However, it may be difficult to implement the end of transmission before the time point at which the first station transmits the RTS frame to the fourth station.

In another embodiment of the present invention, when the second station of the multi-link device transmits an RTS frame to a fourth station of the non-STR multi-link device while the first station of the multi-link device continues to perform transmission to a third station of the non-STR multi-link device, the second station may transmit the RTS frame to the fourth station in time for the end of transmission to the third station by the first station. To this end, the second station may insert padding into the RTS frame. At this time, the RTS frame may be an RTS frame format for flexibly controlling the transmission length. For convenience of description, the RTS frame format is referred to as a multilink (ML)-RTS frame. The ML-RTS frame may include a pad field for padding. For example, the ML-RTS frame format may be the same as the RTS frame format illustrated in FIG. 26. Further, the first station may insert padding into transmission to the third station in time to comply with the transmission end with the RTS frame.

In the embodiment of FIG. 26, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The second AP (AP2) transmits the ML-RTS frame to the second STA (STA2) in time for the end of transmission to the first station (STA1) of the first AP (AP1). Thereafter, when the first station (STA1) transmits ACK to the first AP (AP1), the second station (STA2) transmits ACK to the second AP (AP2). Accordingly, a TXOP for the frame exchange between the second AP (AP2) and the second station (STA2) is configured in stations operating in the channel of the second link.

In another detailed embodiment, another frame for configuring NAV may be exchanged instead of the RTS/CTS frame. In the above-described embodiments, an ACK request frame may be transmitted instead of the RTS frame. The ACK request frame may include duration information related to the transmission end time point. Further, a frame including ACK transmitted in response to the ACK request may also include duration information. At this time, duration information of the frame including ACK may be configured according to duration information of the ACK request frame.

The above-described embodiments have been described for the RTS/CTS frame exchange, but may be used for a control frame exchange as well as the RTS/CTS frame. At this time, the control frame exchange may include an exchange between a PS-Poll frame and a response frame of the PS-Poll.

Figure 27:
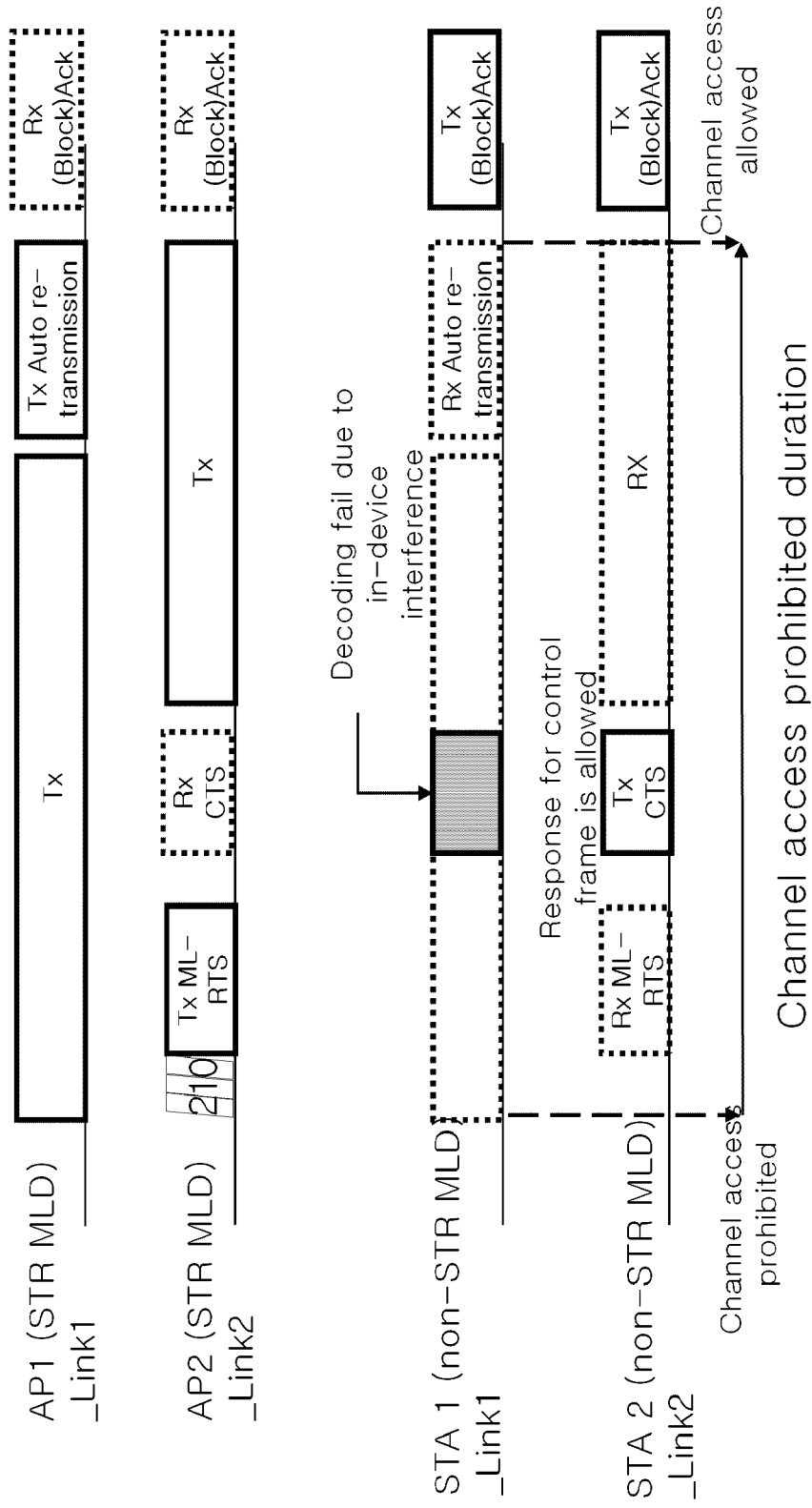
FIG. 27 illustrates transmission of a response to a control frame by the multi-link device exceptionally even in the case in which channel access is prohibited according to an embodiment of the present invention.

FIG. 27 illustrates exceptional transmission of a response to a control frame by the multi-link device in the case in which channel access is prohibited according to an embodiment of the present invention.

As described in the above embodiments, when the non-STR multi-link device exists, channel access of some stations may be prohibited. Even though channel access of the station is prohibited, the station may transmit a response to the control frame. Specifically, even though channel access of the station is prohibited, the station may transmit a CTS frame in response to the RTS frame.

As described above, when the response to the control frame is transmitted as the exception of channel access prohibition, the following embodiment may be applied. The first station transmits the response to the control frame as the exception of channel access prohibition. When the first station transmits the response to the control frame, the third station performs transmission to the second station included in the multi-link device including the first station. In this case, the third station may perform retransmission to the first station. This is because the third station can expect failure of transmission to the second station.

In the embodiment of FIG. 27, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The first AP (AP) performs transmission to the first station (STA1). The second AP (AP2) transmits the RTS frame to the second station (STA2). Since the first station (STA1) performs reception, channel access of the second station (STA2) is prohibited. However, the second station (STA2) transmits the CTS frame to the second AP (AP2) as the exception of channel access prohibition. The first AP (AP1) may determine that a possibility of failure of transmission of the first AP (AP1) is high due to transmission of the CTS frame by the second station (STA2). Accordingly, the first AP (AP1) performs retransmission to the first station (STA1). A retransmission method will be described in more detail with reference to FIG. 28.

Figure 28:
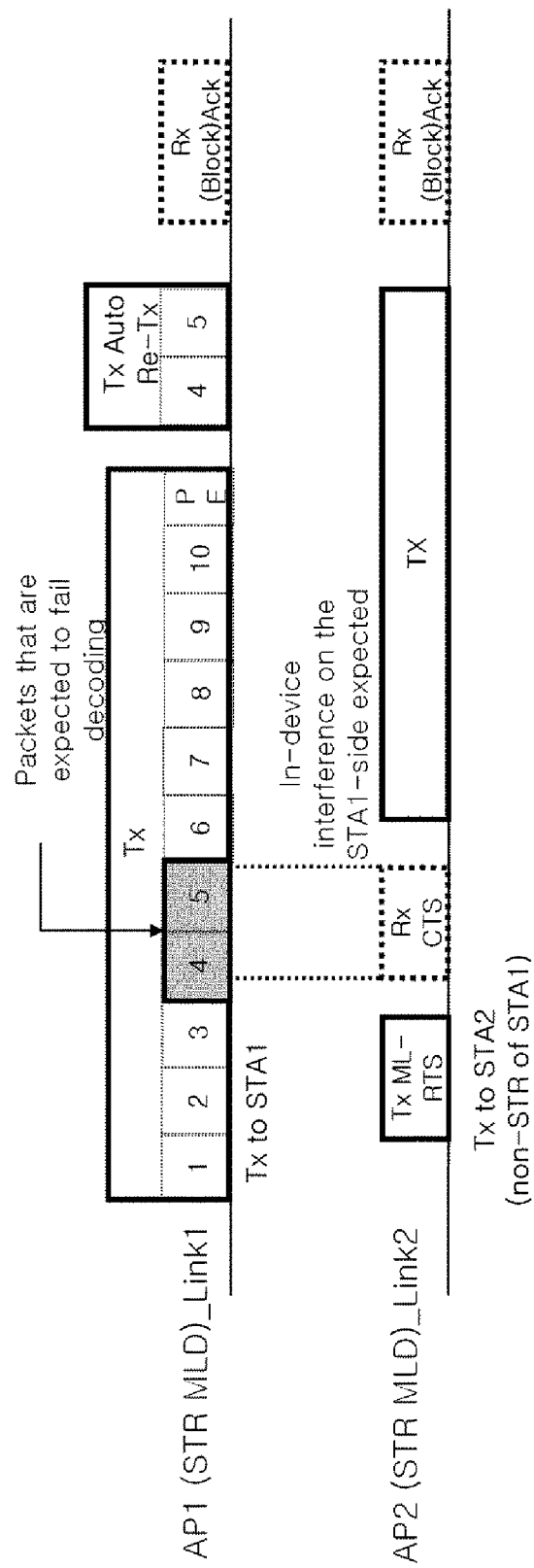
FIG. 28 illustrates retransmission of the transmission to the station of the non-STR multi-link device.

FIG. 28 illustrates retransmission of the transmission to the station of the non-STR multi-link device.

In the retransmission described with reference to FIG. 27, only some of the packets included in the initial transmission may be retransmitted. Specifically, the station performing retransmission may retransmit only some of the packets included in the initial transmission. The station performing retransmission may determine some of the packets included in the initial transmission as packets to be retransmitted based on a time interval in which the station performing retransmission receives the CTS frame. Specifically, the station performing retransmission may determine packets transmitted in a time interval including the time interval in which the station performing retransmission receives the CTS frame among the packets included in the initial transmission as the packets to be retransmitted. At this time, the station performing retransmission may retransmit the packets transmitted in the time interval including the time interval in which the station performing retransmission receives the CTS frame based on a propagation delay. In another detailed embodiment, the station performing retransmission may retransmit all packets included in the initial transmission.

Further, the station performing retransmission may perform retransmission before receiving ACK for the transmission. At this time, the station performing retransmission may receive Block ACK indicating whether initial transmission and retransmission are received after the retransmission. To this end, the station performing retransmission may perform retransmission before SIFS after the initial transmission. In another detailed embodiment, the station failing in reception due to the control frame transmitted as the exception of channel access prohibition may wait for receiving retransmission without transmitting ACK.

In the embodiment of FIG. 28, the first AP (AP1) retransmits a fourth packet and a fifth packet in consideration of the interval in which the second AP (AP2) receives the CTS frame and a transmission delay. The first AP (AP1) receives ACK including whether retransmission is received after the retransmission.

Figure 29:
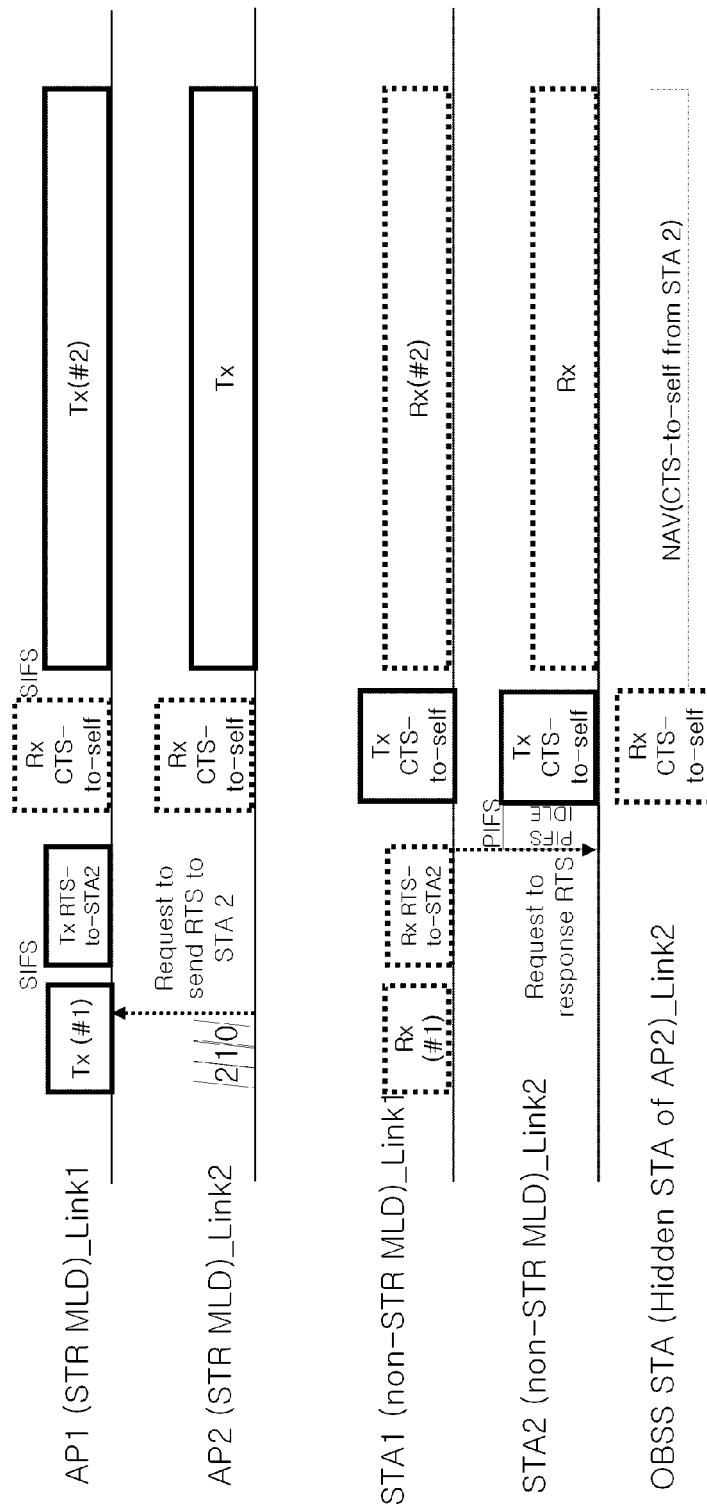
FIG. 29 illustrates transmission of the control frame through the link in which the station of which channel access is not prohibited operates rather than the link in which the station of which channel access is prohibited operates according to an embodiment of the present invention.

FIG. 29 illustrates transmission of the control frame through a link in which the station of which channel access is not prohibited operates rather than a link in which the station of which channel access is prohibited operates according to an embodiment of the present invention.

As described in the embodiment illustrated in FIG. 26, ends of transmission to the plurality of stations of the non-STR multi-link device may be synchronized. However, this needs to control of the already generated MPDU or to generate the MPDU again, and thus may cause implementation to be difficult. Accordingly, the multi-link device may transmit the control frame through the link in which the station of which channel access is not prohibited operates rather than the link in which the station of which channel access is prohibited operates. Specifically, the multi-link device may transmit the control frame through the link in which reception from the multi-link device is currently performed among stations of the non-STR multi-link device. At this time, the control frame may be the RTS frame.

In the embodiment of FIG. 29, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The first AP (AP1) performs transmission to the first station (STA1). Even though the second AP (AP2) succeeds the backoff procedure, the first station (STA1) is receiving the transmission from the first AP (AP1) and thus the second AP (AP2) cannot perform transmission to the second station (STA2). At this time, the second AP (AP2) makes a request for transmitting the RTS frame with the second station (STA2) as a receiver to the first AP (AP1). The first AP (AP1) may insert the RTS frame with the second station (STA2) as the receiver into transmission being performed by the first AP (AP1). In another detailed embodiment, after the first AP (AP1) ends transmission being performed by the first AP (AP1), the first AP (AP1) may transmit the RTS frame with the second station (STA2) as the receiver in the first link (link1) after SIFS from the corresponding transmission. The first station (STA1) receives the RTS frame with the second station (STA2) as the receiver and transfers the received RTS frame to the second station (STA2). The second station (STA2) performs CCA during PIFS. When the channel is idle during PIFS, the second station (STA2) transmits the CTS-to-Self frame. The first AP (AP1) may stop transmission to the first station (STA1) during a time interval in which it is expected for the second station (STA2) to transmit a response to the RTS frame. Further, the first station (STA1) may transmit ACK for the received transmission while the second station (STA2) transmits a response to the RTS frame. In another detailed embodiment, the first station STA1) may also transmit the response to the RTS frame while the second station (STA2) transmits the response to the RTS frame. FIG. 29 is to help for understanding of description and may be used for transmission of the control frame as well as the RTS frame and the CTS-to-Self frame. Further, another time interval other than PIFS may be used.

Figure 30:
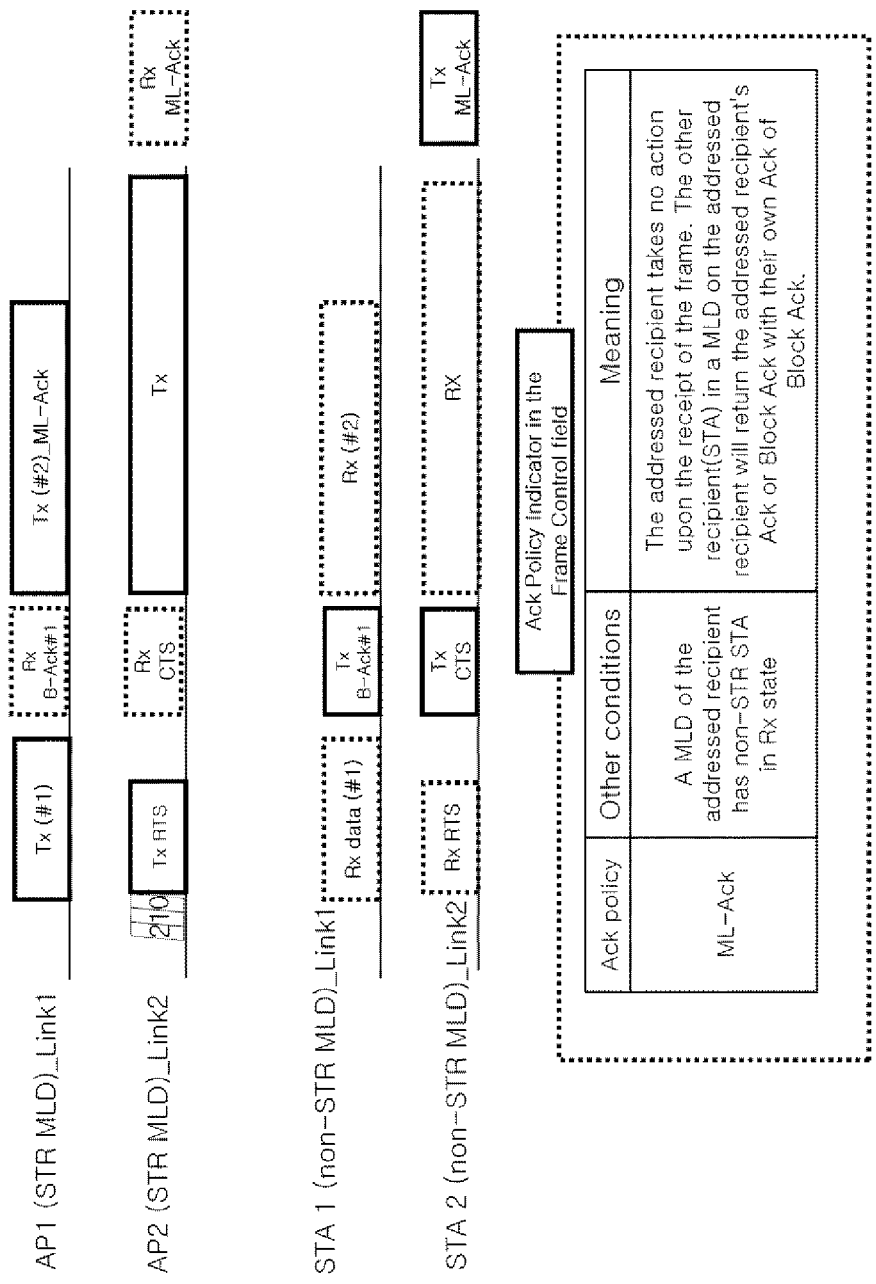
FIG. 30 illustrates transmission of ACK by the multi-link device according to an embodiment of the present invention.

FIG. 30 illustrates transmission of ACK by the multi-link device according to an embodiment of the present invention.

The station of the multi-link device may make a request for a link to transmit ACK to the station of the no-STR multi-link device. Specifically, the station of the multi-link device may make a request for transmitting ACK in a link different from the link in which transmission has been performed. In the embodiment of FIG. 28, the first AP (AP1) of the STR multi-link device performs transmission (Tx(#2)) to the first station (STA1) of the non-STR multi-link device. At this time, the first AP (AP1) makes a request for transmitting ACK for transmission (Tx(#2)) through the second link (link2). This is because it is determined that transmission of ACK for the transmission (Tx(#2)) of the first AP(AP1) is difficulty since the transmission (Tx(#2)) of the first AP(AP1) ends earlier than transmission to the second station (STA2) by the second AP (AP2).

Further, for the ACK transmission, the station may configure an ACK policy as an implicit BAR in order not to transmit an immediate response to transmission. In another detailed embodiment, the station may configure the ACK policy for transmission as BlockAckReq. However, in order to transmit Block ACK, BlockAckReq should be transmitted, and thus channel access burden and a transmission delay may be generated. Accordingly, a new ACK policy for the multi-link device may be needed.

One station of the multi-link device may also transmit ACK for transmission received by another station included in the multi-link device, which is the same as ACK for transmission received by the station. The ACK transmission may be referred to as multilink (ML)-ACK. Further, ML-ACK may be configured as the ACK policy. In the embodiment of FIG. 30, the first AP (AP1) configures ML-ACK as the ACK policy of transmission (Tx(#2)). The first station (STA1) does not transmit ACK to the first AP (AP1) after receiving transmission (Tx(#2)). The second station (STA2) completes reception of the transmission from the second AP (AP2) and transmits ACK for transmission from the first AP (AP1) and transmission from the second AP (AP2) together. The non-STR multi-link device may include not only the first station (STA1) and the second station (STA2) but also a third station (STA3), and the STR multi-link device may include not only the first AP (AP1) and the second AP (AP2) but also a third AP (AP3). At this time, ML-ACK may be configured as the ACK policy of transmission to the second station (STA2) from the second AP (AP2). When transmission from the third AP (AP3) to the third station (STA3) is completed later than transmission from the second AP (AP2) to the second station (STA3), the third station (STA3) may transmit ACK for transmission from the first AP (AP1) to the first station (STA1), ACK from the second AP (AP2) to the second station (STA2), and ACK for transmission from the third AP (AP3) to the third station (STA3) to the third AP (AP3).

Through the embodiments, even though transmissions to the stations of the non-STR multi-link device are not simultaneously completed, it is possible to prevent interference between links that may be generated due to ACK transmission. In the above-described embodiment, the ACK policy may be configured as BlockAck instead of ML-ACK. In another detailed embodiment, the ACK policy may be configured as No Ack instead of ML-ACK.

The number of links acquiring transmission opportunities may increase while the multi-link device performs traffic transmission. At this time, through the link acquiring the transmission opportunity later, the multi-link device may transmit traffic, which the multi-link device is scheduled to transmit through the link acquiring the transmission opportunity first. At this time, NAV configured in the link acquiring the transmission opportunity first by the multi-link device may be configured to be larger than NAV required for transmitting traffic. When the NAV is configured to be larger than NAV required for transmitting traffic in the link acquiring the transmission opportunity first by the multi-link device, the multi-link device may transmit a CF-END frame after completing transmission in the link acquiring the transmission opportunity first, so as to reset NAV.

Reception of the sync PPDU and signaling related to the reception of the sync PPDU are described with reference to FIGS. 31 to 34.

In order to receive the sync PPDU, the first station of the non-STR multi-link device should determine whether the second station having the non-STR relation with the first station starts receiving the sync PPDU. Further, the first station should continuously perform preamble detection (PD). When it is considered that channel access of the first station receiving the sync PPDU is prohibited by reception of another station of the non-STR multi-link device, such an operation of the first station may be irrational. Accordingly, the first station may enter a doze state in a predetermined condition. The sync PPDU may be transmitted within the conventionally configured TXOP. Accordingly, a performance gain that can be obtained by reception of the sync PPDU may be determined according to the length of the remaining TXOP. Therefore, the first station may determine whether to give up reception of the sync PPDU based on the length of the sync PPDU. When the first station gives up reception of the sync PPDU, the first station may enter the doze state. Such a power-saving operation may be referred to as inter-link TXOP power save (PS). In the inter-link TXOP PS, the station entering the doze state may wake up from the doze state in order to receive frames periodically transmitted from the AP, for example, a beacon frame, a TIM frame, and a DTIM frame. Further, when the TXOP ends, for example, when a CF-END frame is transmitted, the station entering the doze state in the inter-link TXOP PS may wake up from the doze state.

The TXOP may be changed to a period indicated through a length field of the signaling field of the PPDU or a duration field of the MAC frame. Specifically, in the above-described embodiment, the station may determine a time of occupation of the PPDU based on the period indicated through the length field or the duration field of the MAC frame.

The non-AP multi-link device may signal information on whether the sync PPDU is received and sync PPDU support conditions to the AP multi-link device. Further, the AP multi-link device may signal information on whether the AP multi-link device supports PPDU transmission to the non-AP multi-link device. At this time, the multi-link device may signal information on whether the sync PPDU is supported for each multi-link device. For example, the AP multi-link device may signal information on whether sync PPDU transmission is supported for each AP multi-link device. In another detailed embodiment, the multi-link device may signal information on whether the sync PPDU is supported for each station. Specifically, the AP multi-link device may signal information on whether sync PPDU transmission is supported for each AP included in the AP multi-link device. For example, the AP multi-link device including the first AP, the second AP, and the third AP may indicate that the first AP supports sync PPDU transmission, and the second AP and the third AP do not support sync PPDU transmission.

When information indicating that the AP multi-link device associated with the non-AP multi-link device does not support sync PPDU transmission, the station of the non-AP multi-link device may enter the doze state of the inter-link PS while another station of the non-AP multi-link device performs reception. This is because, the AP multi-link device associated with the non-AP multi-link device cannot transmit the sync PPDU. At this time, the station of the non-AP multi-link device may determine the length of time to maintain the doze state based on the length of the PPDU received by another station of the non-AP multi-link device.

Whether the sync PPDU transmission or reception is supported may be determined according to an operation policy as well as the hardware performance. Accordingly, whether the sync PPDU transmission or reception is supported may be signaled not only through information on the performance but also through information on an operating mode. A method of signaling the support of sync PPDU transmission or reception will be described in detail with reference to FIG. 31.

FIG. 31 illustrates an element field indicating information on support of sync PPDU reception or transmission according to an embodiment of the present invention.

As described above, the information indicating whether the sync PPDU transmission is supported may be included in an element indicating a capability of the station. For convenience of description, the element indicating the capability of the station is referred to as a capability element. Further, in the capability element, a field of information indicating whether sync PPDU transmission is supported is referred to as a Supporting Sync PPDU Tx sub field. At this time, the capability element may be a multi-link element which is an element indicating a capability of a multi-link. Further, the capability element may be an EHT capability element indicating a capability related to EHT. FIG. 31(*a*) illustrates an example of the capability element.

When a value of the Supporting Sync PPDU Tx sub field is 1, Supporting Sync PPDU Tx may indicate that the station or the multi-link device indicated by the Supporting Sync PPDU Tx sub field supports sync PPDU transmission. When a value of the Supporting Sync PPDU Tx sub field is 0, Supporting Sync PPDU Tx may indicate that the station or the multi-link device indicated by the Supporting Sync PPDU Tx sub field does not support sync PPDU transmission. Further, when a station which is not included in the multi-link device transmits the capability element, Supporting Sync PPDU Tx sub field may signal information that is not information irrelevant to whether sync PPDU transmission is supported or may be used as a reserved field.

As described above, the information indicating whether sync PPDU reception is supported may be included in an element indicating information related to the operation of the station. For convenience of description, the element indicating the information related to the operation of the station is referred to as an operation element. Further, in the operation element, a field of information indicating whether sync PPDU reception is supported is referred to as a Supporting Sync PPDU Rx Disable sub field. FIG. 31(*b*) illustrates an example of the operation element. When a value of the Supporting Sync PPDU Rx Disabled sub field is 1, it may indicate that sync PPDU reception is not supported. Specifically, when the value of the Supporting Sync PPDU Rx Disabled sub field is 1, the Supporting Sync PPDU Rx Disabled sub field may indicate that the station transmitting the Supporting Sync PPDU Rx Disabled sub field does not want to wait for receiving the sync PPDU. In the multi-link device configuring the value of the Supporting Sync PPDU Rx Disabled sub field as 1, the second station of the multi-link device may not perform PD and CCA while the first station of the multi-link device performs reception. The AP multi-link device associated with the multi-link device transmitting the Supporting Sync PPDU Rx Disabled sub field does not simultaneously transmit PPDUs to a plurality of stations of the multi-link device transmitting the Supporting Sync PPDU Rx Disabled sub field. The PPDU may be an SU PPDU, a full BW MU PPDU, or an OFDMA MU PPDU transmitted through one of a non-HT PPDU format, an HT PPDU format, a VHT PPDU format, an HE PPDU format, and an EHT PPDU format. At this time, the AP multi-link device should not transmit a frame making a request for a response, for example, an immediate response. The frame making a request for a response may include at least one of RTS, multi-user (MU)-RTS, a trigger frame, and a block ack request (BAR).

Further, the operation element may include information related to the minimum length of the sync PPDU which can be received by the station or the multi-link device transmitting the operation element. At this time, a sub field indicating the information related to the minimum length of the sync PPDU is referred to as a Remaining TXOP Threshold sub field. The Remaining TXOP Threshold sub field may indicate a time. Further, the Remaining TXOP Threshold sub field may be expressed in units of us, ms, or symbols. The multi-link device associated with the multi-link device transmitting the Remaining TXOP Threshold sub field may not be allowed to transmit a sync PPDU shorter than the length indicated by the Remaining TXOP Threshold sub field to the multi-link device or the station transmitting the Remaining TXOP Threshold sub field.

Further, when the Remaining TXOP Threshold sub field is configured as a predetermined value, it may indicate that the multi-link device or the station transmitting the Remaining TXOP Threshold sub field does not support sync PPDU reception. The predetermined value may be a value indicating a time longer than the maximum time that can be expressed by the Remaining TXOP Threshold sub field. In another detailed embodiment, the predetermined value may be 0. When the embodiments are applied, the Sync PPDU Rx Disable sub field may be omitted in the operation field.

Further, in the above embodiments, it has been described that the Sync PPDU Rx Disable sub field and the Remaining TXOP Threshold sub field can be signaled through the operation element. The Sync PPDU Rx Disable sub field and the Remaining TXOP Threshold sub field may be signaled through an element other than the operation element or signaling information. An embodiment of implementing the inter-link TXOP power saving mode according to the signaling described with reference to FIG. 31 is described with reference to FIGS. 32 to 34.

Figure 32:
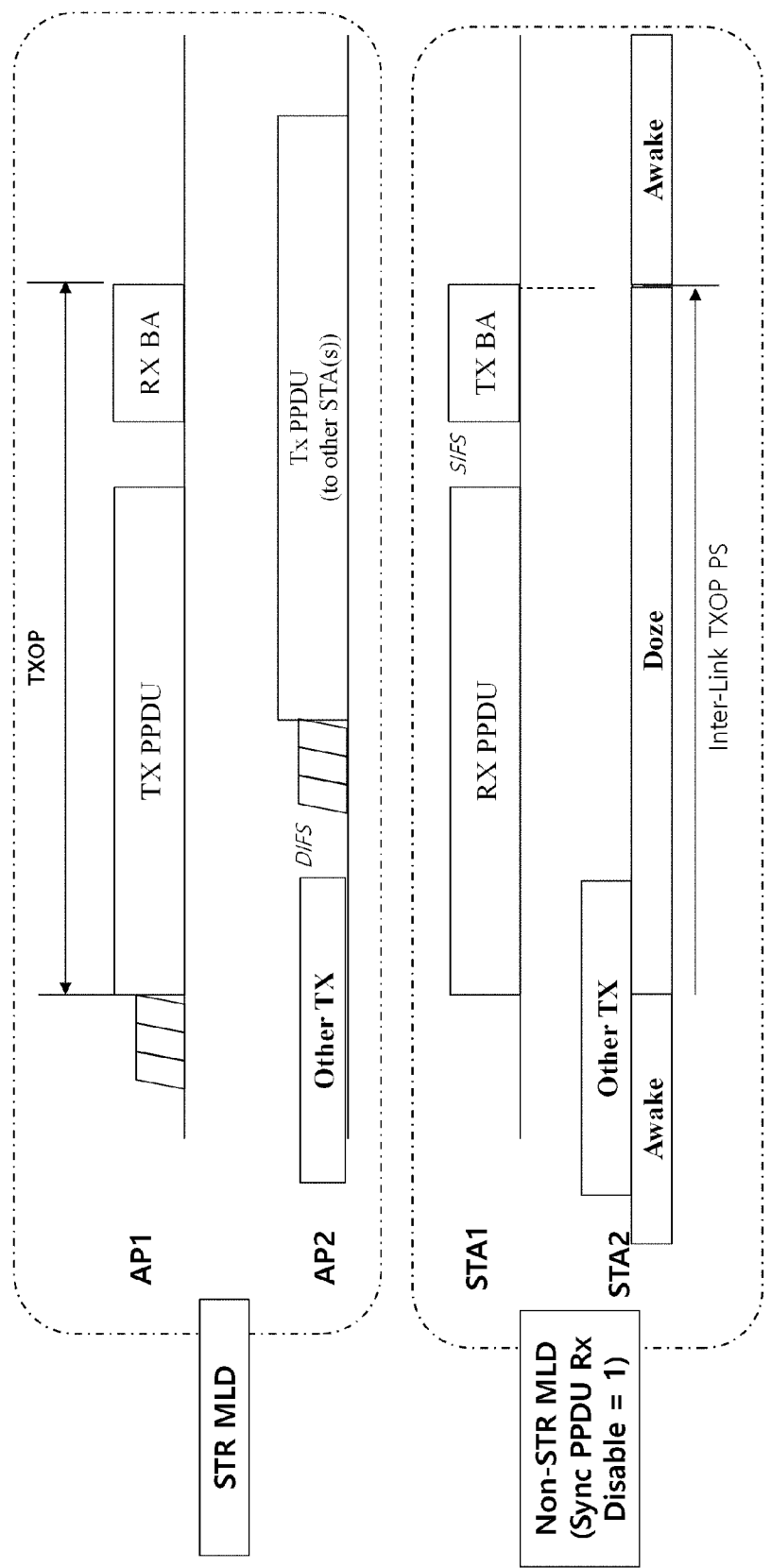
FIG. 32 illustrates the performance of an inter-link TXOP power saving mode operation by the non-STR multi-link device according to an embodiment of the present invention.

FIG. 32 illustrates the performance of an inter-link TXOP power saving mode operation by the non-STR multi-link device according to an embodiment of the present invention.

When information indicating that the non-STR multi-link device does not support sync PPDU reception is signaled, the second station of the non-STR multi-link device may enter the doze state while the first station of the non-STR multi-link device performs reception. At this time, the second station may maintain the doze state until the end time point of the TXOP indicated by the PPDU received by the first station. As described above, the time point at which the second station expects reception of the frame periodically transmitted from the AP may be before the time point at which the TXOP indicated by the PPDU received by the first station ends. At this time, the second station may wake up from the doze state before the time point at which the TXOP indicated by the PPDU received by the first station ends. As described above, the frame periodically transmitted from the AP may include at least one of the beacon frame, the TIM frame, and the DTIM frame.

The second station may maintain the doze state even after the time point at which the TXOP indicated by the PPDU received by the first station ends. Specifically, the second station may maintain the doze state even after the time point at which the TXOP indicated by the PPDU received by the first station ends based on information received from the AP associated with the second station. At this time, the information received from the AP associated with the second station may be NAV-related information. Further, the information received from the AP associated with the second station may be operation information of the AP associated with the first station. When NAV configured by the second AP of the AP multi-link device performing transmission to the second station of the non-AP multi-link device does not expire, the first AP of the AP multi-link device may transmit information on an expected time point at which transmission or reception of the first AP and an expected time point at which NAV expires to the first station of the non-AP multi-link device signaling information indicating that the first AP of the AP multi-link device does not want to receive the sync PPDU. When NAV configured by the second AP of the AP multi-link device performing transmission to the second station of the non-AP multi-link device does not expire, it may include transmission or reception of PPDU by the second AP from one station. When NAV configured by the second AP of the AP multi-link device performing transmission to the second station of the non-AP multi-link device does not expire, it may include a configuration of NAV in the second AP by the PPDU which is not transmitted by the second station.

In the embodiment of FIG. 32, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is not desired. The first AP (AP1) performs transmission to the first station (STA1). At this time, the second station (STA2) maintains the doze station until the time point at which the TXOP indicated by the PPDU which the first AP (AP1) transmits to the first station (STA1) ends.

Figure 33:
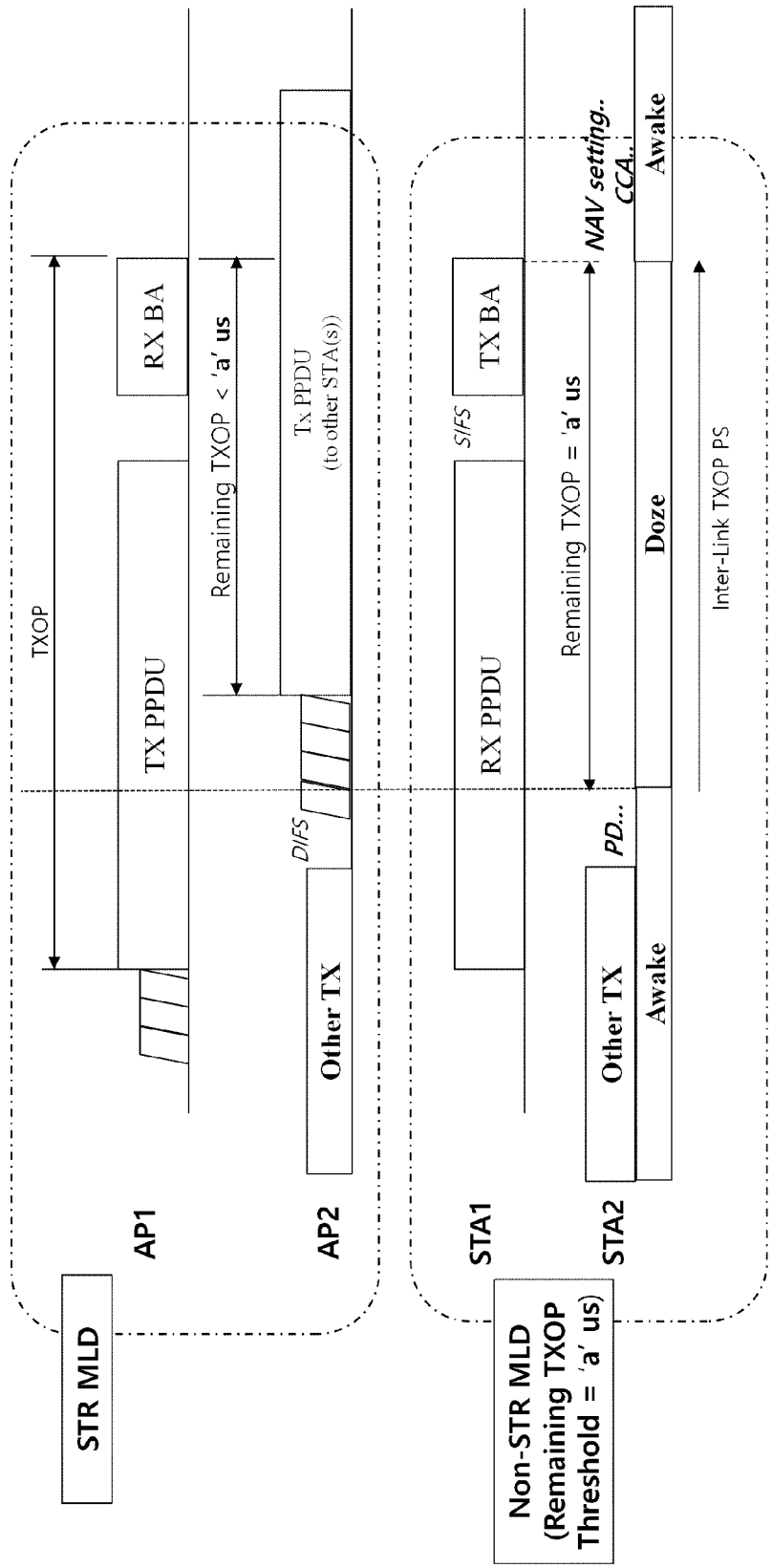
FIG. 33 illustrates entry of the station of the non-STR multi-link device into a doze state from sync PPDU reception standby according to an embodiment of the present invention.

FIG. 33 illustrates entry of the station of the non-STR multi-link device into the doze state from sync PPDU reception standby according to an embodiment of the present invention.

When the remaining duration of the TXOP indicated by the PPDU being received by the first station of the non-STR multi-link device is shorter than or equal to the length indicated by the Remaining TXOP Threshold sub field transmitted by the non-STR multi-link device, the first station of the non-STR multi-link device may enter the doze state of the inter-link TXOP. At this time, when the remaining duration of the TXOP indicated by the PPDU being received by the first station is longer than the length indicated by the Remaining TXOP Threshold sub field transmitted by the non-STR multi-link device, the second station may receive the sync PPDU transmitted to the second station before entering the doze state. At this time, the second station may receive the sync PPDU. To this end, the second station may perform PD and determine whether an intended receiver of the received PPDU is the second station. Specifically, the second station may determine whether an AID indicated by the signaling field of the PPDU or an RA of the MAC frame included in the PPDU indicates the second station.

In the embodiment of FIG. 33, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2).

The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. When the TXOP of the PPDU which the first AP (AP1) transmits to the first station (STA1) is equal to or shorter than 'a', the second station (STA2) enters the inter-link TXOP power saving state.

Figure 34:
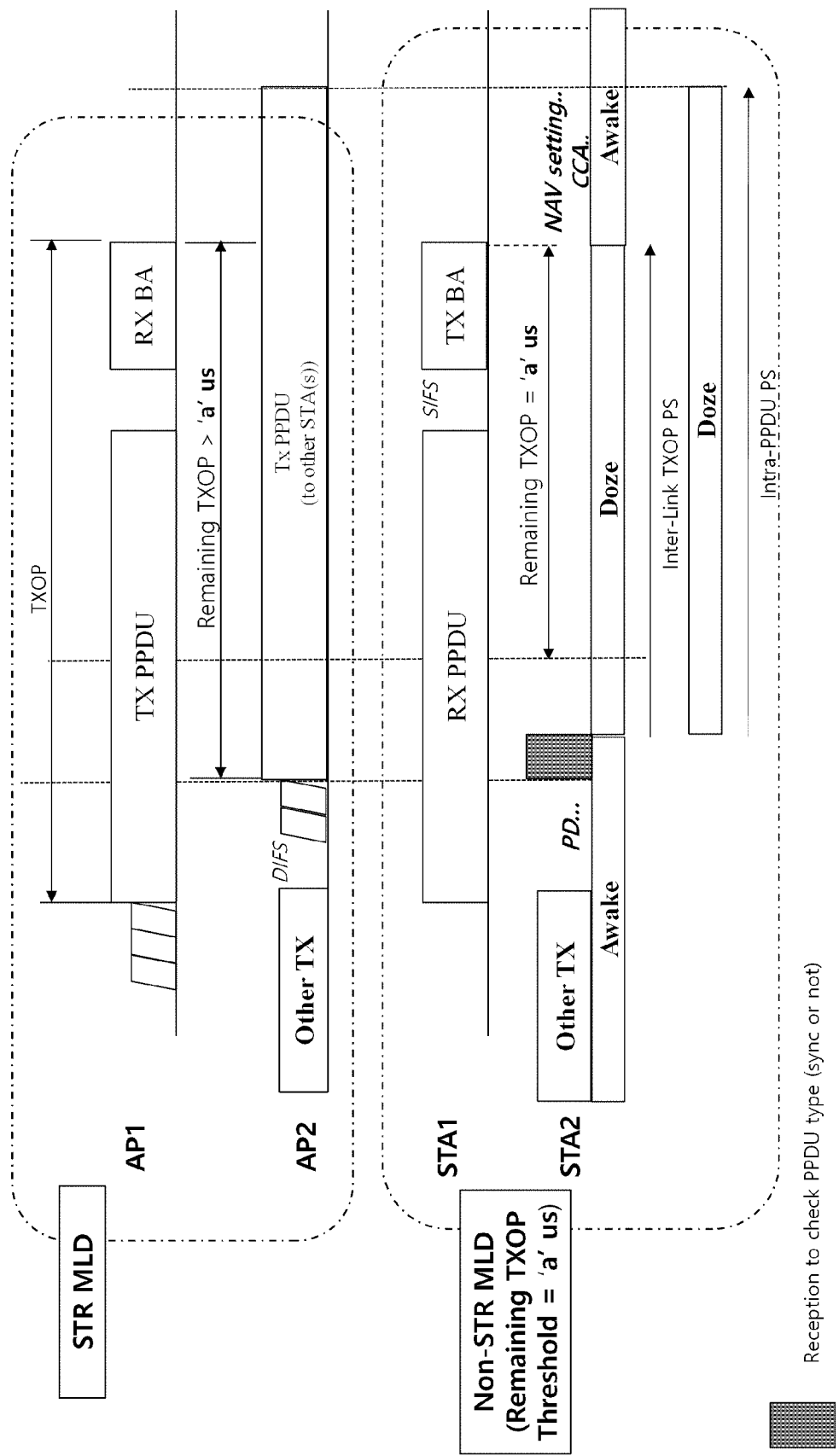
FIG. 34 illustrates entry of the station of the non-STR multi-link device into doze state from sync PPDU reception standby according to another embodiment of the present invention.

FIG. 34 illustrates entry of the station of the non-STR multi-link device into the doze state from sync PPDU reception standby according to another embodiment of the present invention.

When transmission of the PPDU which is not the sync PPDU is detected in the BSS operated by the AP associated with the station of the non-STR multi-link device while the station of the non-STR multi-link device waits for receiving the sync PPDU, the station of the non-STR multi-link device may enter the inter-link TXOP power saving state. At this time, the station may determine that the PPDU with the intended receiver, which is not the station, is not the sync PPDU. Further, when transmission of the PPDU, which is the not the sync PPDU, is detected in the BSS operated by the AP associated with the station of the non-STR multi-link device in the doze state even though the minimum TXOP signaled by the station is left, the station of the non-STR multi-link device may enter the inter-link TXOP power saving state.

In the embodiment of FIG. 34, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. The second station (STA2) detects transmission of the PPDU, which is not the sync PPDU, in the BSS to which the second station belongs. The TXOP of the PPDU which the first AP (AP1) transmits to the first station (STA1) is larger than 'a', but the second station (STA2) enters the inter-link TXOP power saving state.

In the above-described blind state, for example, a state in which another station of a multi-link device including a station performs transmission, it may be difficult for the station to perform carrier sensing in a physical layer and accurately determine the state of a transmission medium. Specifically, interference may occur in a station of a non-STR multi-link device due to transmission. Due to the interference, even though the station of the non-STR multi-link device performs carrier sensing, it may be difficult to determine a current state of the transmission medium. In this case, the carrier sensing may be the above-described CCA. As described above, the CCA may include at least one of the PD and the ED. Accordingly, in the blind state, the station may fail to set an NAV, based on a PPDU or a frame transmitted by another station. Therefore, when the station which has left the blind state attempts channel access immediately, a transmission collision may occur. To prevent this, channel access by the station which has left the blind state may be restricted. In this case, the channel access restriction may indicate determining whether a wireless medium is idle by using a determination condition stricter than a determination condition used by the station when the channel access restriction is not applied. Specifically, when the channel access of the station is restricted, the NAV is configured and the station may determine that the wireless medium is busy. In embodiments to be described below, a channel access restriction may indicate the channel access restriction according to such embodiments. Specifically, channel access of the station having left the blind state may be restricted for a designated time from a time point at which the station leaves the blind state. For convenience of description, the designated time is referred to as a channel access restriction time. In addition, a time interval in which the channel access restriction time is applied is referred to as a channel access restriction interval.

In a specific embodiment, the channel access restriction time may be NAVSyncDelay. The channel access restriction time may be configured based on a maximum length of a PPDU. For example, the channel access restriction time may be Max PPDU (aPPDUMaxTime)+SIFS+BAtime. In this case, Max PPDU (aPPDUMaxTime) indicates a maximum length of a PPDU. In addition, BAtime indicates a time required to transmit a BA frame. For example, when a maximum length of a HE PPDU among the maximum length of the PPDU supported by the station is largest, the Max PPDU (aPPDUMaxTime) may be 5.484 ms. In addition, an SIFS may be 16 us. Such an embodiment can prevent a transmission collision from occurring, the collision being caused by an attempt to perform channel access after the blind state by the station having no NAV set therefor in the blind state. In addition, as described above, such an embodiment can prevent a transmission collision from occurring by the station even when the station enters into a sleep state in the blind state.

The station for which channel access is restricted for the channel access restriction interval may perform the CCA. Through the CCA, the station may receive a PPDU and set an NAV, based on the received PPDU or a frame included in the PPDU.

Figure 35:
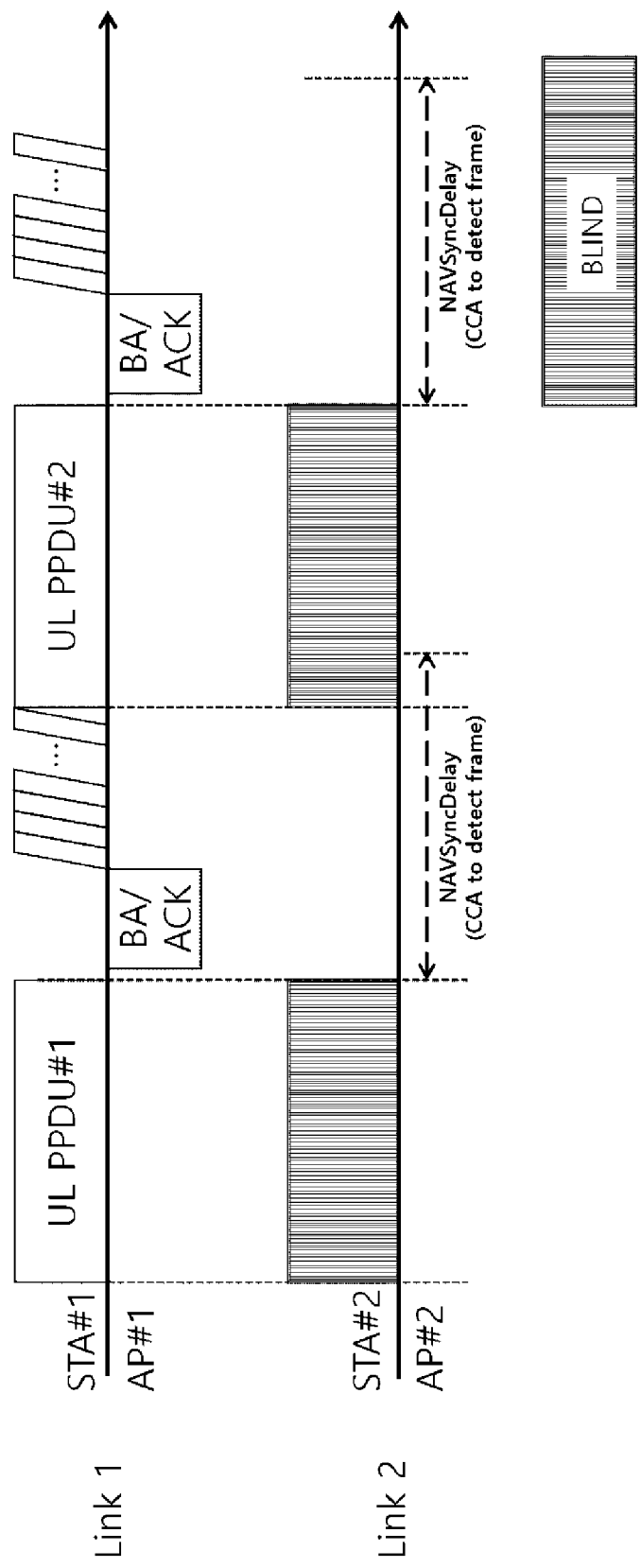
FIG. 35 illustrates a channel access restriction for a station having left a blind state according to an embodiment of the present invention.

FIG. 35 illustrates a channel access restriction for a station having left a blind state according to an embodiment of the present invention.

The station of a non-STR multi-link device frequently enters into a blind state, the above-described channel access restriction may excessively restrict channel accessibility of the station. Specifically, when the channel access restriction time is configured with an excessively large value, e.g., NAVSyncDelay, the channel access restriction may excessively restrict the channel accessibility of the station.

In an embodiment of FIG. 35, a first station (STA #1) and a second station (STA #2) of a non-STR multi-link device operate in a first link (Link 1) and a second link (Link 2), respectively. A first AP (AP #1) and a second AP (AP #2) of an STR multi-link device operate in the first link (Link 1) and the second link (Link 2), respectively. While the first station (STA #1) transmits a UL PPDU in the first link (Link 1), the second station (STA #2) is switched to a blind state. As described above, the second station (STA #2) may fail to perform PD in the blind state. When the second station (STA #2) leaves the blind state, the second station (STA #2) performs CCA for a channel access restriction time. In this case, as described above, the channel access restriction time may be NAVSyncDelay. When a channel access restriction interval expires and an NAV is not set, the second station (STA #2) may attempt channel access. In this case, the channel access may include a backoff procedure. Such a channel access restriction may repeat whenever the second station (STA #2) returns after switching to the blind state. When the first station (STA #1) frequently transmits transmission, channel accessibility of the second station (STA #2) may be excessively restricted.

To prevent this, the channel access restriction time may be set according to an embodiment other than the above-described embodiment. In a specific embodiment, a channel access restriction time may be set according to a situation so as to prevent channel accessibility of a non-STR station from being excessively restricted. A description thereof is made through FIG. 36.

Figure 36:
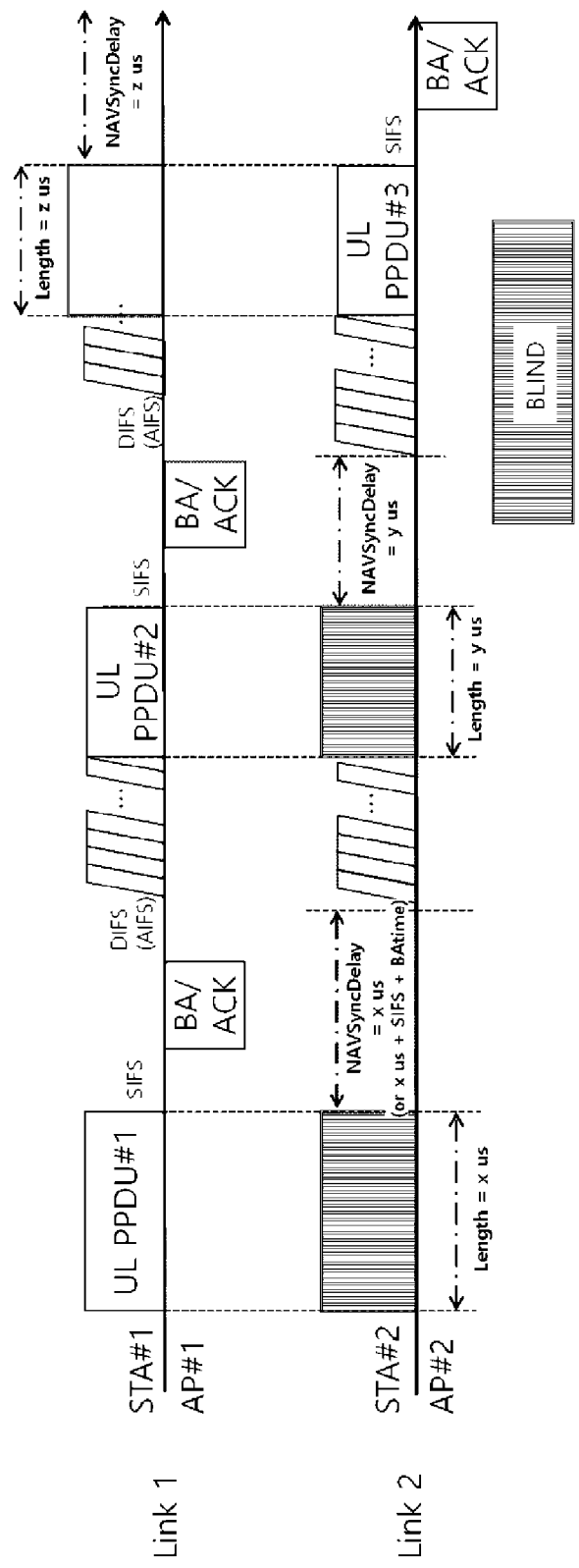
FIG. 36 illustrates a channel access restriction for a station having left a blind state according to another embodiment of the present invention.

FIG. 36 illustrates a channel access restriction for a station having left a blind state according to another embodiment of the present invention.

A channel access restriction time of a station may be determined based on a time for which the station is in a blind state immediately before the channel access. Specifically, the channel access restriction time of the station may be identical to a time for which the station is in the blind state immediately before channel access. For example, when the station stays in the blind state for 5 ms and then leaves the blind state, channel access of the station may be restricted for 5 ms. When the station stays in the blind state for 1 ms and then leaves the blind state, channel access of the station may be restricted for 1 ms. In another specific embodiment, the channel access restriction time may be a sum of a time for which the station is in the blind state, an SIFS, and a time required to transmit a BA frame. Instead of using the time required to transmit the BA frame, a time required to transmit an ACK frame may be used.

The time for which the blind state is maintained may be determined based on the length of transmission having caused the blind state. That is, the time for which the blind state is maintained may be identical to a transmission time having caused the blind state. In another specific embodiment, when the channel access restriction time is set as a time less than a maximum value of the channel access restriction time, the station may use a value smaller than an ED threshold value used after a time corresponding to the maximum value of the channel access restriction time expires, as an ED threshold value until the time corresponding to the maximum value of the channel access restriction time expires from a time point at which the channel access restriction interval expires. In this case, the maximum value of the channel access restriction time may be NAVSyncDelay. For example, the channel access restriction time of the station may be a time less than NAVSyncDelay. In this case, when the channel access restriction interval expires from a time point at which the station leaves the blind state, the station may attempt channel access. Until the maximum value of the channel access restriction time from a time point at which the channel access restriction interval expires and the station leaves the blind state, the station may perform ED at −72 dBm. In this case, after an interval corresponding to the maximum value of the channel access restriction time expires from a time point at which the station leaves the blind state, the station may perform ED at −62 dBm.

In another specific embodiment, the channel access restriction time of the station may be determined as a time by summing the time for which the station is in the blind state and a predetermined time. For example, the channel access restriction time of the station may be a sum of a time for which the station is in the blind state, an SIFS, and the length of an ACK frame.

In another specific embodiment, the channel access restriction time of the station may be determined as a multiple of a time for which the station is in the blind state. As such, determining the length of the channel access restriction time, based on the time for which the station is in the blind state corresponds to reflecting that there is a high possibility that a PPDU transmitted by another station cannot be received as the blind state stays longer.

In an embodiment of FIG. 36, a first station (STA #1) and a second station (STA #2) of a non-STR multi-link device operate in a first link (Link 1) and a second link (Link 2), respectively. A first AP (AP #1) and a second AP (AP #2) of an STR multi-link device operate in a first link (Link 1) and a second link (Link 2), respectively. While the first station (STA #1) transmits a UL PPDU in the first link (Link 1), the second station (STA #2) is switched to a blind state. The second station (STA #2) maintains a first blind state for x us. Channel access by the second station (STA #2) immediately after the first blind state is restricted for x us. In addition, the second station (STA #2) maintains a second blind state for y us. Channel access by the second station (STA #2) immediately after the second blind state is restricted for y us. In addition, the first station (STA #1) maintains the first blind state for z us. Channel access by the first station (STA #1) immediately after the first blind state is restricted for z us.

The above-described another embodiment is applicable to the embodiment of FIG. 36. That is, the channel access restriction time may be a sum of a time for which the station is in the blind state, an SIFS, and a time required to transmit a BA frame. Instead of using the time required to transmit the BA frame, a time required to transmit an ACK frame may be used.

In another specific embodiment, the channel access restriction time may be determined according to whether the time for which the station is in the blind state is within a predetermined threshold value. In this case, the threshold value may be a value agreed between an AP of an STR multi-link device and a non-STR multi-link device. A description thereof is made through FIG. 37.

Figure 37:
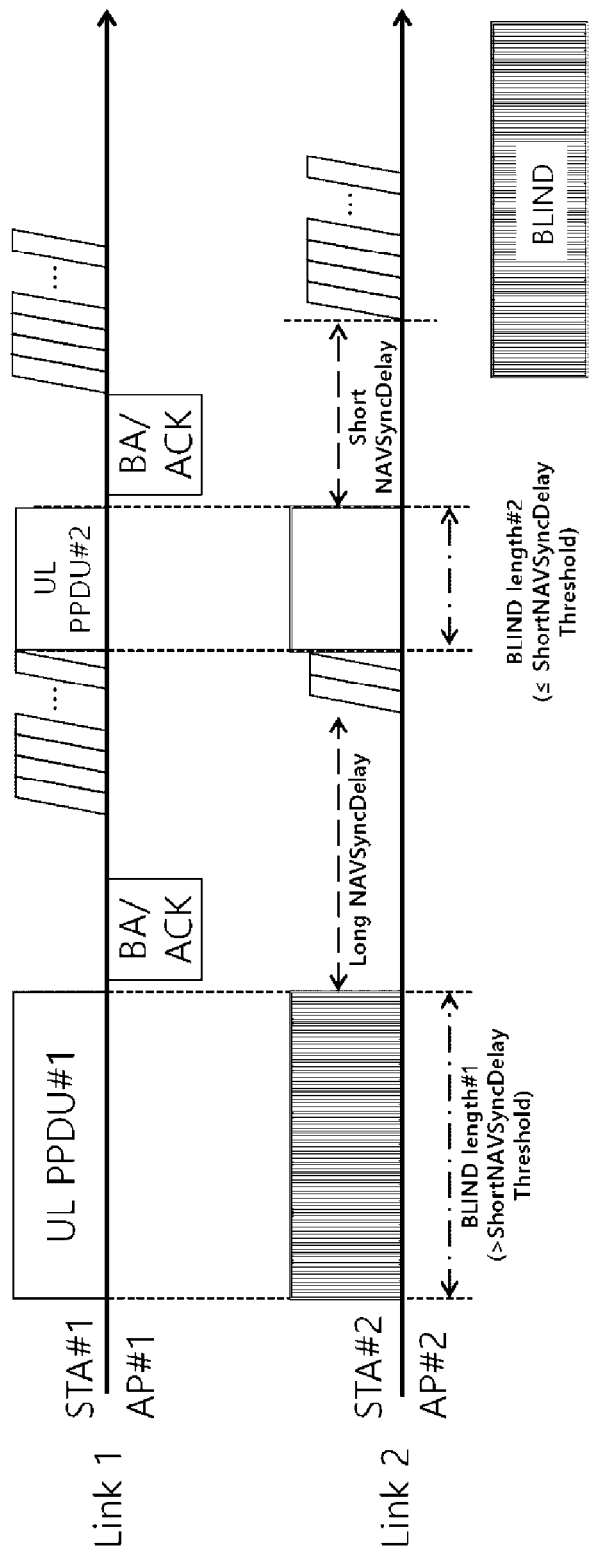
FIG. 37 illustrates a channel access restriction for a station having left a blind state according to another embodiment of the present invention.

FIG. 37 illustrates a channel access restriction for a station having left a blind state according to another embodiment of the present invention.

When a time for which a station is in a blind state is equal to or less than a predetermined threshold value, a channel access restriction time of the station may be a first predetermined value. In addition, when the time for which the station is in the blind state is greater than the predetermined threshold value, the channel access restriction time of the station may be a second predetermined value. In this case, the first predetermined value may be smaller than the second predetermined value.

In an embodiment of FIG. 37, a first station (STA #1) and a second station (STA #2) of a non-STR multi-link device operate in a first link (Link 1) and a second link (Link 2), respectively. A first AP (AP #1) and a second AP (AP #2) of an STR multi-link device operate in the first link (Link 1) and the second link (Link 2), respectively. While the first station (STA #1) transmits a UL PPDU in the first link (Link 1), the second station (STA #2) is switched to a blind state. The second station (STA #2) stays in a blind state for a time greater than a threshold value in the first blind state. Accordingly, channel access by the second station (STA #2) is restricted for a second predetermined time (long NAVSyncDelay). The second station (STA #2) stays in the blind state for a time equal to or less than a threshold value in a second blind state. Accordingly, channel access by the second station is restricted for the first predetermined time (short NAVSyncDelay).

In another specific embodiment, the channel access restriction time may be determined according to one of multiple stages, to which a time for which the station is in the blind state corresponds. Specifically, there may be four threshold values for the time for which the station is in the blind state, and there may be five stages according to the four threshold values. In this case, when the time for which the station is in the blind state corresponds to stage 2, the channel access restriction time is configured as a stage-2 channel access restriction time.

In addition, a channel access restriction time corresponding to the lowest stage may be 0. That is, when the time for which the station is in the blind state has a value equal to or smaller than a specific value, the channel access restriction may not be applied. A description thereof is made through FIG. 38.

Figure 38:
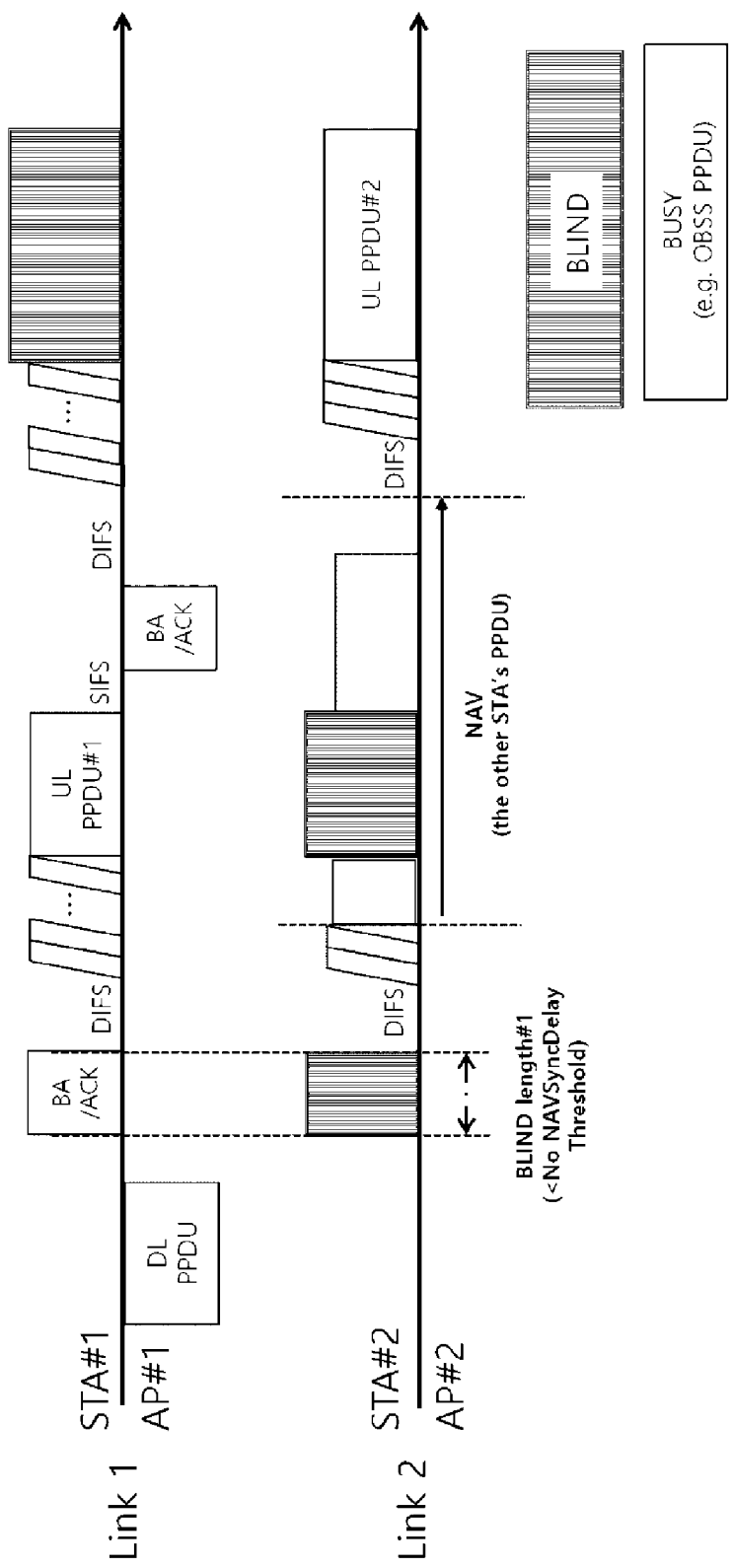
FIG. 38 illustrates a case where channel access is not restricted when a station having left a blind state satisfies a predetermined condition according to another embodiment of the present invention.

FIG. 38 illustrates a case where channel access is not restricted when a station having left a blind state satisfies a predetermined condition according to another embodiment of the present invention.

When at least one of predetermined conditions is satisfied, channel access by a station may not be restricted immediately after the station leaves a blind state. That is, any one of the predetermined conditions is not satisfied, channel access by the station may be restricted immediately after the station leaves the blind state. Through this, an excessive restriction on channel accessibility of the station can be prevented. Specifically, when a time for which the station is in the blind state has a value equal to or smaller than a specific value, a channel access restriction may not be applied. In this case, the specific value may be determined based on a time required to transmit a specific frame. Specifically, the specific value may be determined based on the length of a specific frame. For example, the specific value may be determined based on a transmission rate and the length of a specific frame. In such embodiments, the specific frame may be at least one of an ACK frame, a BA frame, and a CTS frame. In another specific embodiment, when a time interval for which the station is in the blind state is included in an NAV configured for the station, a channel access restriction may not be applied to the station after the station leaves the blind state. As such, the embodiments in which the channel access restriction is not applied can prevent channel accessibility of the station having left the blind state from being excessively restricted when a relatively shorter frame, e.g., the ACK frame, the BA frame, and the CTS frame, is transmitted.

In another specific embodiment, in a case where an NAV is set for the station when the station leaves the blind state, a separate channel access restriction other than the NAV may not be applied to the station after the station leaves the blind state. Specifically, in a case where while the NAV is set for the station, the station is switched to the blind state and then leaves the blind state, a channel access restriction may not be separately applied to the station. That is, the channel access restriction time may be 0. This is because there is a high probability that transmission of another station is not performed due to the NAV.

When the NAV is set in the channel access restriction interval, the station may perform channel access within a part of a time interval of the channel access restriction interval, without the channel access restriction. Specifically, in the above-described embodiment, the NAV set for the station may be an NAV set after the station is switched to the blind state. Specifically, a first station may receive a PPDU and may switch to a blind state before completing the reception of the PPDU. That is, a second station of a non-STR multi-link device including the first station may start transmission of the PPDU while the first station is receiving the PPDU. In this case, the first station may complete the reception of the PPDU and set an NAV. In addition, the completion of the reception of the PPDU may indicate occurrence of PHY-RXEND.indication primitive. In addition, when the first station enters into the blind state during the reception of the PPDU and fails to complete the reception of the PPDU, the first station may set an NAV at a time point at which the completion of the reception of the PPDU is expected.

In addition, in the above-described embodiments, the NAV may indicate a NAV when a single NAV is operated. In addition, the NAV may indicate an NAV when multiple NAVs are operated. The multiple NAVs may include a basic NAV and an intra-BSS NAV. The intra-BSS NAV is set by an intra-BSS PPDU. The basic NAV is set by an inter-BSS PPDU, or a PPDU which is not distinguished as an intra-BSS PPDU or an inter-BSS PPDU.

In addition, in the above-described embodiments, when the NAV is set, it may indicate that a value of the NAV is set as a value (non-zero) other than 0. In addition, in the above-described embodiments, when the NAV is set, it may indicate that the NAV is updated. The station may acquire duration information from a PPDU or a frame and set an NAV according to the duration information. Specifically, the station may acquire the duration information from a signaling field of the PPDU. In a specific embodiment, the station may acquire duration information for a HE-SIG-A field or a U-SIG field of a PPDU. In addition, the station may acquire duration information for a duration/ID field of a MAC header of an MPDU included in a PPDU. In addition, the station may set an NAV according to duration information acquired from a PPDU at the end of the PPDU, or may set an NAV according to duration information acquired from a frame included in a PPDU at the end of the PPDU. In this case, the station may determine the end of the PPDU based on an L-SIG field included in the PPDU. Specifically, the station may acquire duration of a PPDU by using L_DATARATE and L_LENGTH fields of the L-SIG field, and determine the end of the PPDU according to the acquired duration.

In addition, in a case where while a link in which the station operates is occupied by a PPDU transmitted by another station, the station is switched to the blind state and then leaves the blind state, a channel access restriction may not be applied to the station after the station leaves the blind state. For convenience of description, an example in which a non-STR multi-link device includes a first station and a second station, the first station operates in a first link, and the second station operates in a second link is described. While a PPDU transmitted by a third station operating in the first link occupies the first link, the first station operating in the first link may switch to a blind state due to transmission performed by the second station. Before the transmission of the PPDU transmitted by the third station ends, the first station may leave the blind state. In this case, the first station may attempt to perform channel access without a channel access restriction. In such an embodiment, the channel access restriction may not be applied to the station after the station leaves the blind state only when a receiver address of the PPDU occupying the link does not indicate the station or the station is not an intended receiver of the PPDU. In another specific embodiment, the channel access restriction may not be applied to the station after the station leaves the blind state, regardless of the receiver address or the intended receiver of the PPDU occupying the link. In such embodiments, the station may determine the end of the PPDU based on the L-SIG field, as described above. In another specific embodiment, the station may determine the end of the PPDU based on information on a TXOP included in the PPDU. Specifically, the station may determine the end of the PPDU based on a TXOP indicated by a signaling field of the PPDU. In addition, the station may acquire a duration field of an MPDU included in the PPDU and determine the end of the PPDU based on the TXOP indicated by the duration field.

In the above-described embodiments, it may be determined that the station leaves the blind state at a time point at which another station of a non-STR multi-link including the station terminates transmission.

In an embodiment of FIG. 38, a first station (STA #1) and a second station (STA #2) of a non-STR multi-link device operate in a first link (Link 1) and a second link (Link 2), respectively. A first AP (AP #1) and a second AP (AP #2) of an STR multi-link device operate in the first link (Link 1) and the second link (Link 2), respectively. While the first station (STA #1) transmits a UL PPDU in the first link (Link 1), the second station (STA #2) is switched to a blind state. As described above, when the second station (STA #2) satisfies a predetermined condition, a channel access restriction is not applicable to the second station (STA #2) having left the blind state. For example, a time for which the second station (STA #2) stays in the blind state is less than a predetermined time (no NavSyncDelay threshold), the channel access restriction may not be applied even immediately after the station (STA #2) leaves the blind state. In another specific embodiment, When the second station (STA #2) stays in the blind state while an NAV is configured for the second station (STA #2) and the NAV is applied, the channel access restriction may not be applied even immediately after the second station (STA #2) leaves the blind state.

When first channel access attempted by a station fails in a channel access restriction interval of the station, channel access by the station may not be allowed during the remaining channel access restriction interval. Specifically, in the above-described embodiments, embodiments of mitigating the channel access restriction are described. That is, embodiments in which channel access is restricted for a time shorter than a maximum value of a channel access restriction time or channel access is not restricted are described. In such embodiments, when a transmission collision occurs due to a first transmission of a station after channel access restriction mitigation is applied to the station and the station leaves the blind state, a channel access restriction may be applied to the station for a predetermined time. Specifically, when a first transmission of a station fails after channel access restriction mitigation is applied to the station and the station leaves the blind state, channel access may be restricted for a predetermined time from a time point at which the station determines that transmission of a first frame has failed. In this case, the predetermined time may be determined based on the maximum value of the channel access restriction time. That is, transmission of the station may not be allowed for the remaining channel access restriction interval from a time point at which the station determines that transmission of the first frame has failed. Accordingly, the station may not attempt to perform transmission for the remaining channel access restriction interval from a time point at which the station determines that transmission of the first frame has failed. In addition, the channel access restriction may correspond to determining that an NAV is set when the station determines whether a wireless medium is idle.

In this case, the first transmission may indicate a first transmission among transmissions performed according to EDCA. Accordingly, a channel access restriction may not be also applied for a predetermined time when transmission corresponding to a response to a frame received by the station fails. The transmission corresponding to the response to the frame received by the station may include at least one of transmission of an ACK frame, transmission of a BA frame, transmission of a CTS frame, and transmission of a TB PPDU. In addition, the first transmission may indicate a first transmission before a frame which configures the station as a destination device or an intended receiver is received. In addition, the first transmission may indicate transmission performed before a time corresponding to the maximum value of the channel access restriction time passes from a time point at which the station leaves the blind state. In this case, the station performs transmission after a time corresponding to the maximum value of the channel access restriction time passes from a time point at which the station leaves the blind state, and channel access by the station is not restricted even though the transmission fails.

In the above-described embodiments, applying no channel access restriction may include releasing a channel access restriction after channel access is restricted. For example, an operation of applying no channel access restriction may correspond to applying a channel access restriction and then configuring a remaining time of a channel access restriction interval as 0 when a condition corresponding to an exception to the application of the channel access restriction is satisfied.

Figure 39:
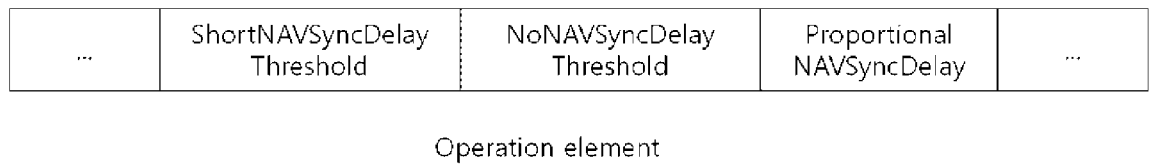
FIG. 39 illustrates an operation element including information on a channel access restriction time according to an embodiment of the present invention.

FIG. 39 illustrates an operation element including information on a channel access restriction time according to an embodiment of the present invention.

As described through FIG. 37, a channel access time may be determined based on a time for which a station is in a blind state. An AP may signal a threshold value of a time for which the station is in the blind state, the threshold value being used in such embodiments, through an element of a management frame. In addition, the AP may signal a channel access restriction time through the element of the management frame. In addition, the AP may signal, through the element of the management frame, whether to adaptively adjust the channel access restriction time based on the time for which the station is in the blind state. In such embodiments, the element of the management frame may be an operation element.

The station may determine the channel access restriction time based on the threshold value of the time for which the blind state is maintained, the threshold value being signaled from the AP associated with the station. In addition, the station may apply a channel access restriction based on the channel access restriction time signaled from the AP associated with the station. In addition, the station may apply the channel access restriction based on whether to adaptively adjust the channel access restriction time signaled from the AP associated with the station, based on the time for which the station is in the blind state.

In an embodiment of FIG. 39, NoNAVSyncDelayThreshold indicates a threshold value for determining whether a channel access restriction is applied. ShortNAVSyncDelayThreshold indicates a threshold value for determining whether a relatively shorter length of channel access restriction time is applied. ProportionalNAVSyncDelay indicates whether the channel access restriction time is determined based on the time for which the station stays in the blind state.

As an exception to the channel access restriction, which is described above, the station may be allowed to transmit a PPDU which starts to be simultaneously transmitted with a PPDU transmitted by another station of a non-STR multilink device including the station, in a channel access restriction interval. In this case, when multiple PPDU transmissions simultaneously start, it may indicate that transmissions start within a predetermined time difference. As such, a PPDU which starts to be transmitted within a predetermined time difference from another PPDU transmission start is referred to as a start sync PPDU. A description thereof is made through FIG. 40.

Figure 40:
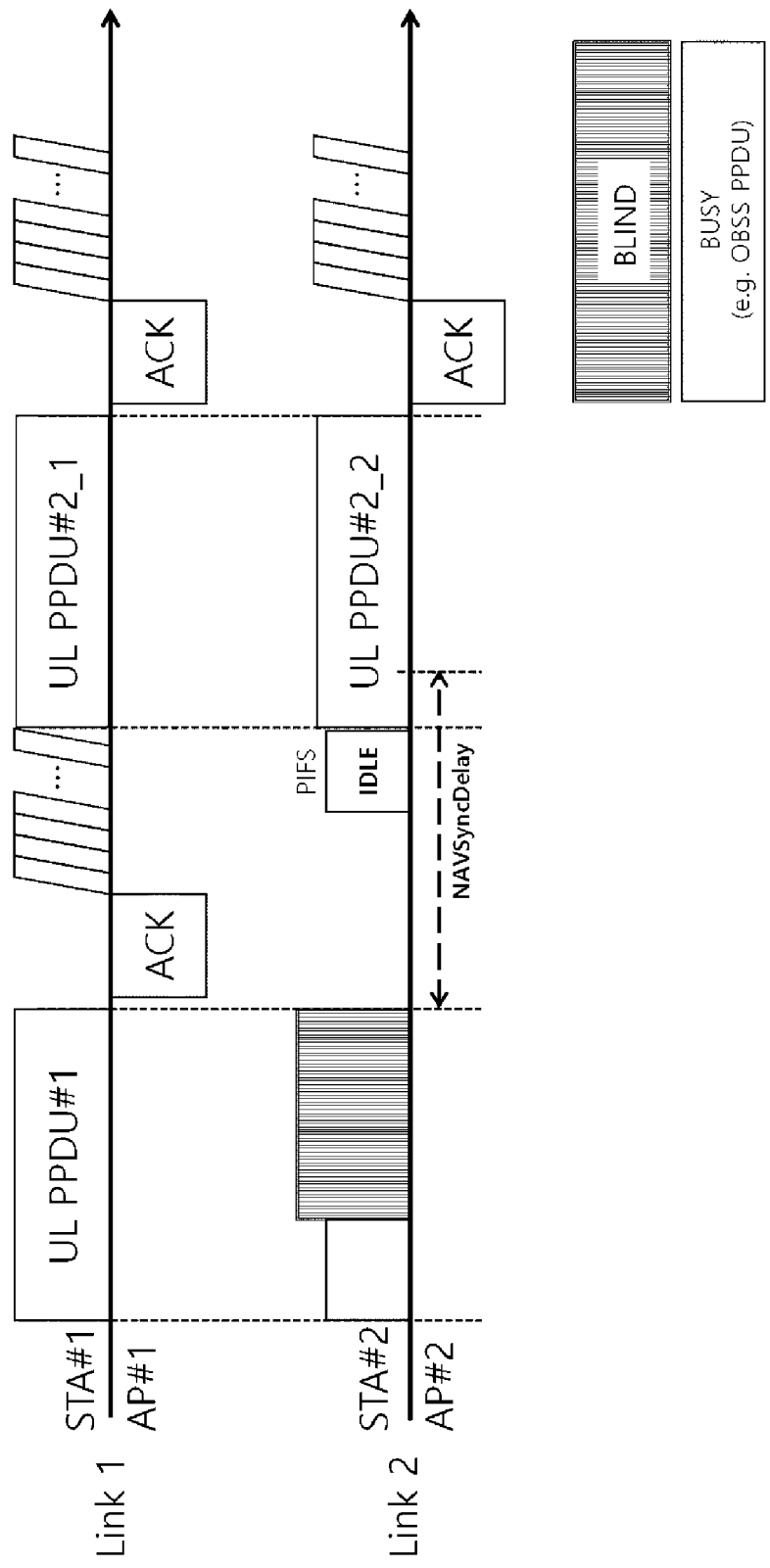
FIG. 40 illustrates a case where a station and another station of a non-STR multi-link device including the station perform simultaneous transmission in a channel access restriction interval according to an embodiment of the present invention.

FIG. 40 illustrates a case where a station and another station of a non-STR multi-link device including the station perform simultaneous transmission in a channel access restriction interval according to an embodiment of the present invention.

When the station of the non-STR multi-link device transmits a start sync PPDU, a transmission end time point of the start sync PPDU may be different from that of a synchronized PPDU. In this case, the station may be restricted not to request an immediate response. The immediate response may include at least one of an ACK frame and a BA frame. Specifically, the station transmitting the start sync PPDU, the transmission of which ends first, may be restricted not to request an immediate response. In this case, a general response rule may not be applied. In addition, the immediate response may not be transmitted according to determination of the station having received the start sync PPDU. Specifically, the station having received the start sync PPDU may determine whether to transmit the immediate response based on whether the received PPDU is a start sync PPDU and whether the station having transmitted the start sync PPDU is a station of a non-STR multi-link device.

In addition, a situation in which a first station and a second station of one non-STR multi-link device operate in a first link and a second link, respectively, is assumed and described. When the first station acquires a transmission opportunity through a backoff procedure in the first link and the second station detects, at a time point at which the transmission opportunity is acquired, that the second link is idle for a PIFS, the first station and the second station may transmit a start sync PPDU. In this case, even though the channel access restriction is applied even immediately after the second station leaves the blind state, the second station may transmit the start sync PPDU. In such an embodiment, the second station also needs to detect that a channel is idle for the PIFS. Accordingly, when the second station detects that a channel is busy, through CCA at the start sync PPDU transmission time point, the second station cannot transmit the start sync PPDU. In such an embodiment, a predetermined time interval other than the PIFS, e.g., a DIFS, may be used.

In addition, the AP may signal, to the station, whether the station can transmit the start sync PPDU in the channel access restriction interval as an exception to the channel access restriction. In this case, the AP may signal, to the station through the operation element, whether the station can transmit the start sync PPDU in the channel access restriction interval as an exception to the channel access restriction. Specifically, the operation element may include a field indicating whether the station can transmit the start sync PPDU in the channel access restriction interval as an exception to the channel access restriction. For convenience of description, this field indicates an NAVSyncDelay exception field. When the NAVSyncDelay exception field indicates that the station can transmit the start sync PPDU in the channel access restriction interval as an exception to the channel access restriction, the station may transmit the start sync PPDU in the channel access restriction interval as an exception to the channel access restriction. When the NAVSyncDelay exception field indicates that the station cannot transmit the start sync PPDU in the channel access restriction interval as an exception to the channel access restriction, the station cannot transmit the start sync PPDU in the channel access restriction interval as an exception to the channel access restriction.

In an embodiment of FIG. 40, a first station (STA #1) and a second station (STA #2) of a non-STR multi-link device operate in a first link (Link 1) and a second link (Link 2), respectively. A first AP (AP #1) and a second AP (AP #2) of an STR multi-link device operate in a first link (Link 1) and a second link (Link 2), respectively. While the first station (STA #1) transmits a UL PPDU (UL PPDU #1) in the first link (Link 1), the second station (STA #2) is switched to a blind state. A channel access restriction is applied to the second station (STA #2) which leaves the blind state. The first station (STA #1) successfully performs the backoff procedure and acquires a transmission opportunity in the channel access restriction interval. In this case, the second station (STA #2) detects that the second link (Link 2) is idle for a PIFS. Accordingly, even though the second station (STA #2) is within the channel access restriction interval, the first station (STA #1) and the second station (STA #2) transmit start sync PPDUs (UL PPDU #2_1 and UL PPDU #2_2).

As such, when the station is allowed to transmit the sync PPDU immediately after leaving the blind state as an exception to the channel access restriction, this may cause interference in transmission by another wireless communication terminal, specifically, a station operating in an OBSS. This is because a transmission protection mechanism performed at a MAC level is not applied to the station immediately after the station leaves the blind state. Accordingly, a condition for transmitting, as an exception to the channel access restriction, a sync PPDU immediately after the station leaves the blind state may be strictly regulated. A description thereof is made through FIG. 41.

Figure 41:
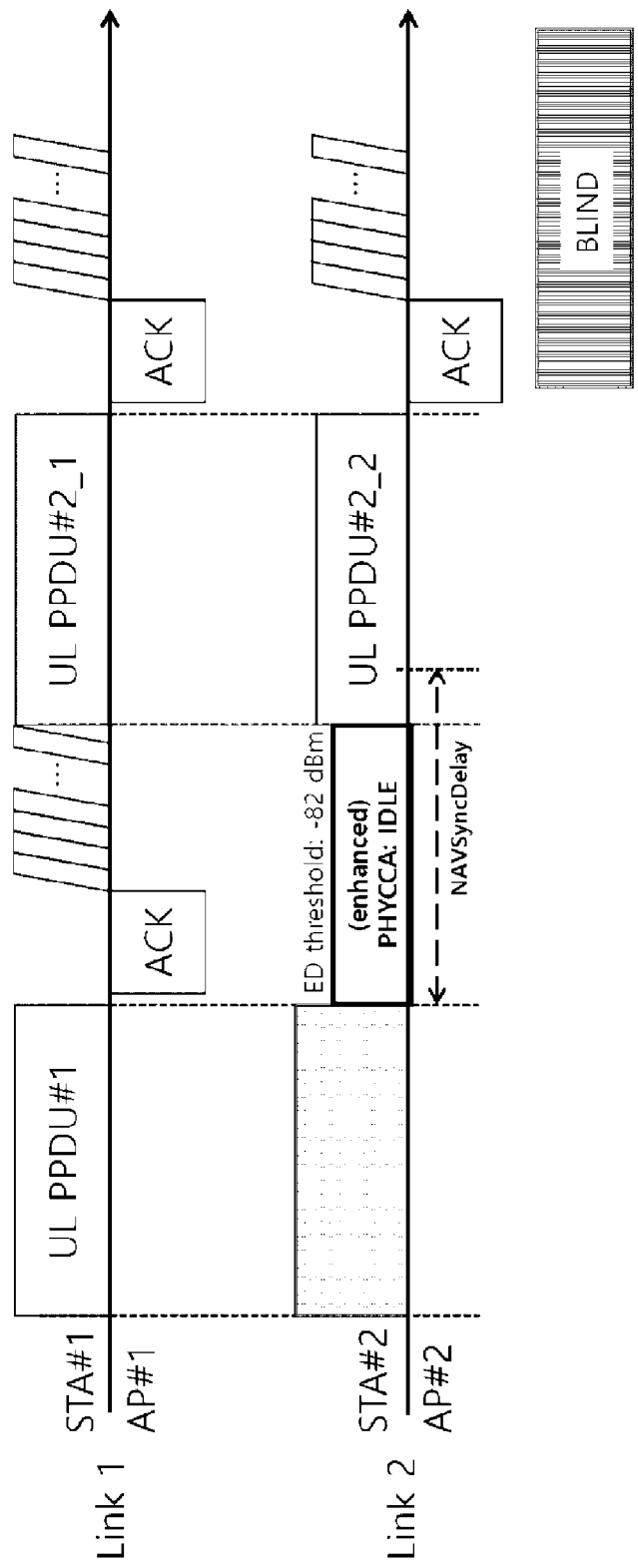
FIG. 41 illustrates a case where a station and another station of a non-STR multi-link device including the station perform simultaneous transmission in a channel access restriction interval according to another embodiment of the present invention

FIG. 41 illustrates a case where a station and another station of a non-STR multi-link device including the station perform simultaneous transmission in a channel access restriction interval according to another embodiment of the present invention.

The station may receive a parameter related to channel sensing, i.e., CCA, from an AP associated with the station. The parameter related to the CCA may include an ED threshold value. The station may perform CCA according to the parameter related to the CCA, received from the AP. Specifically, the station may perform ED according to an ED threshold value received from the AP. Such an operation may be applied when the station performs channel access to perform a start sync PPDU as an exception to a channel access restriction.

When the station performs channel sensing for a PIFS to transmit the start sync PPDU as an exception to the channel access restriction, the station may perform ED by using a condition stricter than a condition applied when performing ED for transmission of the start sync PPDU in a case where the channel access restriction is not applied. For convenience of description, the ED for transmission of the start sync PPDU in a case where the channel access restriction is not applied is referred to as general sync PPDU ED. In addition, ED performed for transmission of the start sync PPDU by the station as an exception to the channel access restriction is referred to as exceptional sync PPDU ED. For example, the station may perform the exceptional sync PPDU ED by using a threshold value smaller than a threshold value used for the general sync PPDU ED. When the station performs the exceptional sync PPDU ED, the station may determine whether a channel is idle for a time interval longer than a time interval used for the general sync PPDU ED.

In addition, an AP may signal, to the station, whether a condition of the exceptional sync PPDU ED is stricter than an ED condition of the general sync PPDU ED. Specifically, the AP may signal the condition of the exceptional sync PPDU ED to the station. For example, the AP may signal a threshold value used for the exceptional sync PPDU ED to the station. In addition, the length of an idle time interval used for the exceptional sync PPDU ED may be signaled to the station. The AP may perform such signaling by using an operation element.

In addition, the AP may signal whether the station may transmit the start sync PPDU as an exception to the channel access restriction. In such an embodiment, the station may transmit the start sync PPDU in the channel access restriction interval only when it is signaled that the station can transmit the start sync PPDU as an exception to the channel access restriction. In this case, the station may transmit the start sync PPDU according to the exceptional sync PPDU ED condition.

In an embodiment of FIG. 41, a first station (STA #1) and a second station (STA #2) of a non-STR multi-link device operate in a first link (Link 1) and a second link (Link 2), respectively. A first AP (AP #1) and a second AP (AP #2) of an STR multi-link device may operate in the first link (Link 1) and the second link (Link 2), respectively. While the first station (STA #1) transmits a UL PPDU (UL PPDU #1) in the first link (Link 1), the second station (STA #2) is switched to a blind state. A channel access restriction is applied to the second station (STA #2) which leaves the blind state. The first station (STA #1) successfully performs a backoff procedure and acquires a transmission opportunity in a channel access restriction interval. In this case, the second station (STA #2) detects that the second link (Link 2) is idle for a PIFS, by using a −82 dBm threshold value lower than a threshold value used for general sync PPDU ED. Accordingly, even though the second station (STA #2) is within the channel access restriction interval, the first station (STA #1) and the second station (STA #2) transmit start sync PPDUs (UL PPDU #2_1 and UL PPDU #2_2).

Through such an embodiment, even though an exception to the channel access restriction is applied, a transmission collision which may be caused by the exception can be mitigated <Medium Access Recovery Procedure>

As described above, when a non-STR multi-link device has left a blind state, channel access of a station of the multi-link device having left the blind state may be restricted. In this case, the channel access of a station of the multi-link device may be restricted during a MediumSyncDelay. This may be the case in which multiple stations of the multi-link device are operating on a non-STR link. When transmission is performed on a first link on which a first station of the non-STR multi-link device is operating, a second station operating on the second link, among stations of the non-STR multi-link device, may be in a blind state. Therefore, the time when the second station of the non-STR multi-link device has left the blind state may be a time point at which transmission is terminated on a second link. In this case, the first link and the second link may be a non-STR link pair.

In a specific embodiment, channel access restriction may be applied when the duration of a time interval during which a station of a multi-link device is in a blind state is greater than a predetermined threshold. In this case, the threshold may be referred to as aMediumSyncThreshold.

Additionally, when the station of the multi-link device leaves the blind state, the station of the multi-link device may start a MediumSyncDelay timer. When the value of the MediumSyncDelay timer is greater than 0, channel access of the station of the multi-link device is restricted. In this case, the restriction on the channel access of the station of the multi-link device is released when the value of the MediumSyncDelay timer becomes 0.

Furthermore, when channel access of the station of the multi-link device is restricted, channel access to all ACs may be restricted. Therefore, the MediumSyncDelay timer of the station of the multi-link device may be applied to all EDCAFs of the stations in the multi-link device.

The channel access restriction described above may be as follows.

When channel access restriction is applied to a station of a multi-link device, the types of frames that a station in the multi-link device may transmit as a first frame, hereinafter referred to as a start frame, may be limited. The start frame may be an RTS frame.

Furthermore, when channel access restriction is applied to the station of the multi-link device, the number of times the station of the multi-link device can attempt to channel access in a time interval during which the channel access restriction is applied may be limited. Specifically, the number of times the station of the multi-link device can attempt channel access until the MediumSyncDelay timer expires may be limited. In this case, the attempting of the channel access may be an attempt to transmit a start frame as described above. Furthermore, the maximum number of attempts may be designated by an AP multi-link device. For example, when the maximum number of attempts is designated as 1, the station of the multi-link device may attempt to transmit an RTS frame once while the value of the MediumSyncDelay timer is greater than 0. The maximum number of attempts may be counted regardless of whether the transmission is successful or not. Furthermore, even when the MediumSyncDelay timer is reset, the maximum number of attempts may not be reset. For example, when the maximum number of attempts is 1 and when the station of the multi-link device attempts channel access for start frame transmission, the MediumSyncDelay timer may be reset before the expiration of the MediumSyncDelay timer. In this case, the station of the multi-link device may not be allowed to attempt start frame transmission again. When the station does not receive a response frame in response to a start frame within a predetermined time, the station may consider the channel access to have failed. The start frame may be an RTS frame. The response frame may be a CTS frame. In addition, the predetermined time may be CTStimeout.

Furthermore, while the channel access restriction is applied, the station of the multi-link device may use a CCA-ED threshold as a predetermined value. In this case, the predetermined value may be designated by an AP. The designated value may be a smaller value than when the channel access restriction is not applied, e.g., a value lower than −62 dBm.

When the MediumSyncDelay timer expires, i.e., the value of the MediumSyncDelay timer is reduced to 0, or is released, i.e., the value of the MediumSyncDelay timer is reset to 0, the channel access restriction may be released. When the station of the multi-link device receives a valid MPDU that occupies a primary channel, the station of the multi-link device may set the value of the MediumSyncDelay timer to 0. Furthermore, when the station of the multilink device receives a PPDU that sets TXOP_DURATION of RXVECTOR to a value other than UNSPECIFIED, the station of the multi-link device may set the value of the MediumSyncDelay timer to 0. In these embodiments, a station of a non-AP multi-link device may not be allowed to set the value of the MediumSyncDelay timer to 0 on the basis of an RTS frame transmitted by another non-AP station.

The value of aMediumSyncThreshold may be set based on at least one among a CTS frame, an RTS frame, and ACK. Specifically, the value of aMediumSyncThreshold may be set based on the time taken to transmit the CTS frame, the RTS frame, and the ACK in a non-HT duplicated PPDU format or a non-HT PPDU format. In a specific embodiment, the value of aMediumSyncThreshold may be set based on the time taken to transmit the CTS frame, the RTS frame, and the ACK at a basic rate in the non-HT duplicated PPDU format or the non-HT PPDU format. In this case, the basic rate may be 6 Mbps. For example, the value of aMediumSyncThreshold may be set to a value that is equal to or greater than the time taken to transmit the CTS frame, the RTS frame, and the ACK at the basic rate in the non-HT duplicated PPDU format or the non-HT PPDU format. In addition, the value of aMediumSyncThreshold may be set to a time equal to or greater than the time taken to transmit a start frame at the basic rate in the non-HT duplicated PPDU format or the non-HT PPDU format. As described above, the start frame may be an RTS frame, and the value of aMediumSyncThreshold may be 52 us. 52 us is the time taken to transmit a non-HT PPDU or a non-HT duplicated PPDU, which includes an RTS frame. Specifically, the time taken to transmit a preamble of the non-HT PPDU or the non-HT duplicated PPDU is 20 us, and the time taken for the transmission of an RTS frame is 32 us. 32 us is the time taken to transmit 20 octets included in the RTS frame, 2 octets corresponding to a service field, and 6 bits corresponding to a Tail at 6 Mbps. In this case, one symbol transmitted at 6 Mbps may include 24 bits.

In the above-described embodiments, the value of aMediumSyncThreshold is set based on the transmission time of the start frame because, when channel access is restricted the station of the multi-link device transmits a start frame to acquire a TXOP. Specifically, when a station of a multi-link device transmits a start frame, another station may enter a blind state. Therefore, when the value of aMediumSyncThreshold is set to a time that is shorter than the time taken to transmit the start frame, stations around the station of the multi-link device may be sequentially experience restriction on channel access. This may be prevented by setting the value of aMediumSyncThreshold based on the transmission time of the start frame.

In another specific embodiment, the transmission rate of a PPDU including a start frame may be determined based on the value of aMediumSyncThreshold. Specifically, a station in the multi-link device may determine the transmission rate of a PPDU including a start frame such that the transmission time of the PPDU including the start frame is equal to or less than the time of aMediumSyncThreshold. For example, when the value of aMediumSyncThreshold is 44 us and when a start frame is an RTS frame, a station of the multi-link device may transmit a non-HT PPDU including the RTS frame by using a data rate faster than 6 Mbps. In another specific embodiment, the data rate of the PPDU including the start frame may be predetermined. Specifically, the data rate of the PPDU including the start frame may be designated as a value greater than 6 Mbps. Specifically, the data rate of the PPDU including the start frame may be designated as a value greater than 12 Mbps.

In another specific embodiment, channel access of a station, which was unable to perform medium monitoring due to the transmission of the start frame, i.e., is in a blind state, may not be restricted when the station leaves the blind state. Specifically, even when a station has been in a blind state for a duration longer than aMediumSyncThreshold due to the transmission of a start frame, channel access of the station may not be restricted when the station leaves the blind state. Thus, when channel access of any one station is restricted, channel access of multiple stations around the station may be prevented from being sequentially restricted.

<Setting Operation Mode of Multi-Link Device>

When any one station of a single radio multi-link device performs transmission or reception, no other station of the single radio multi-link device may perform transmission or reception. The fact that a multi-link device operates as a single radio multi-link device may be due to hardware constraints or operation mode definition, as described above. Therefore, a single radio multi-link device in the present specification may refer to a multi-link device in which the operation of a station is restricted due to hardware constraints, as well as a multi-link device in which the operation of a station is restricted due to the definition of an operation mode. Thus, the single radio multi-link device of the present specification may include a multi-link device that supports simultaneous transmission or reception by multiple stations of the multi-link device, but does not support simultaneous transmission or reception by the multiple stations of the multi-link device under a specification condition. The specific condition may include a specific time point.

Furthermore, the operation mode of a multi-link device may be applied on a link-by-link basis. For example, a multi-link device may include a first station operating on a first link, a second station operating on a second link, and a third station operating on a third link. At a specific time point, an EMLSR mode may be applied to the first station and the second station of the multi-link device, and the third station may not be operating. In this case, the first station and the second station may not be allowed to perform simultaneous frame exchanges.

The above-described channel access restriction may be applied to a station that had difficulty in performing medium monitoring due to an operation mode.

In the above-described embodiments, the operation of a station of a multi-link device may be replaced by the operation of the multi-link device. Furthermore, in the above-described embodiments, the operation of an AP may be replaced by the operation of a non-AP station, and the operation of the non-AP station may be replaced by the operation of the AP. Thus, the operation of an AP of a non-STR multi-link device may be replaced by the operation of a non-AP station of a non-STR multi-link device, and the operation of a non-AP station of an STR multi-link device may be replaced by the operation of an AP of the STR multi-link device. Furthermore, the operation of the non-AP station of the non-STR multi-link device may be replaced by the operation of the AP of the non-STR multi-link device, and the operation of the AP in the STR multi-link device may be replaced by the operation of the non-AP station of the STR multi-link device.

<Restriction on Medium Access Recovery Procedure>

As described above, when channel access restriction is applied for medium access recovery, a station's channel access may be restricted based on a parameter designated by an AP. The values of a parameter that are applied for channel access restriction will be described with reference to FIG. 42.

FIG. 42 illustrates the format of a Basic Multi-Link element which is used to signal a parameter that is applied to channel access restriction according to an embodiment of the present invention.

The parameter that is applied to the channel access restriction may include at least one among the number of channel access attempts allowed during a channel access restriction time interval, a CCA-ED threshold used to determine whether a channel is idle in the channel access restriction time interval, and the duration of the channel access restriction time interval.

In this case, the channel access restriction time interval may be a time interval in which the value of a MediumSyncDelay timer is greater than 0, as described above. Furthermore, a station may set an initial value of the MediumSyncDelay timer based on the duration of a channel access restriction time interval indicated by an AP or a default value. In this case, the default value may be aPPDUMaxTime. aPPDUMaxTime may be the transmission time of the longest PPDU that has been allowed to be transmitted in EHT PHY. Therefore, aPPDUMaxTime may be 5.484 ms.

The CCA-ED threshold used to determine whether a channel is idle in the channel access restriction time interval may be lower than a CCA-ED threshold that is applied outside the channel access restriction time interval. The CCA-ED threshold outside of the channel access restriction time interval is referred to as dot11OFDMEDThreshold, and the CCA-ED threshold in the channel access restriction time interval is referred to as dot11MSDOFDMEDthreshold. The value of dot11OFDMEDThreshold is −62 dBm, and the value of dot11MSDOFDMEDthreshold may be from −62 dBm to −72 dBm. When the value of dot11MSDOFDMEDthreshold is not indicated by the AP, the value of dot11MSDOFDMEDthreshold may be −72 dBm.

The maximum number of times of channel access in the channel access restriction time interval may be applied as described above. In addition, when the AP does not signal the maximum number of times of channel access in the channel access restriction time interval, the station may consider a default value to be the maximum number of times of channel access. The maximum number of times of channel access may be 1.

The AP may signal a parameter, which is applied to the channel access restriction, by using an element related to multiple links. In this case, the element related to the multiple links may be a Basic Multi-Link element. Specifically, the Basic Multi-Link element may include a field that indicates the parameter that applies to the channel access restriction. In this case, the field may be referred to as a Medium Synchronization Delay Information field.

FIG. 42(a) illustrates a Basic Multi-Link element including a Medium Synchronization Delay Information field. A station may receive a Basic Multi-Link element that includes a Medium Synchronization Delay Information field, and may acquire, from the Medium Synchronization Delay Information field, a value of a parameter that is applied to channel access restriction. In this case, the station may apply a parameter indicated by a most recently received Medium Synchronization Delay Information field to channel access. When the station has not received, since associating with an AP, the Medium Synchronization Delay Information field from the associated AP, the station may apply a default value of the parameter to channel access restriction.

FIG. 42(b) illustrates the specific format of a Medium Synchronization Delay Information field. The Medium Synchronization Delay Information field may include a Medium Synchronization Duration subfield indicating the duration of a channel access restriction time interval, a Medium Synchronization OFDM ED Threshold subfield indicating a CCA-ED threshold of the channel access restriction time interval, and a Medium Synchronization Maximum Number Of TXOPs subfield indicating the maximum number of channel access attempts in the channel access restriction time interval. The Medium Synchronization Duration subfield may be an 8-bit field. The Medium Synchronization OFDM ED Threshold subfield may be a 4-bit field. The Medium Synchronization Maximum Number Of TXOPs subfield may be a 4-bit field.

An AP may not be allowed to signal a value less than a default value in the channel access restriction time interval. As described above, the default value may be aPPDUMaxtime. Specifically, a station may set the duration of the channel access restriction time interval to a value obtained by adding a + default value to a value indicated by the value of the Medium Synchronization Duration subfield. For example, when the Medium Synchronization duration subfield indicates 100, the station may set an initial value of a MediumSyncDelay timer to aPPDUMaxtime+100*32 us. In this case, the initial value of the MediumSyncDelay timer may be 8.609 ms.

FIG. 42(c) illustrates a method for setting the Medium Synchronization OFDM ED Threshold subfield. The value of the Medium Synchronization OFDM ED Threshold subfield may be set to 0 to 10. A station may set the value of dot11MSDOFDMEDthreshold to a value obtained by adding a default value to a value indicated by the Medium Synchronization OFDM ED Threshold subfield. For example, when the value of the Medium Synchronization OFDM ED Threshold subfield is 2, the station may set the value of dot11MSDOFDMEDthreshold to −70 dBm.

The Medium Synchronization Maximum Number Of TXOPs subfield may indicate 1, which is the maximum number of channel access attempts. In this case, a station may attempt channel access as many times as the sum of 1 and the value of the Medium Synchronization Maximum Number Of TXOPs subfield in the channel access restriction time interval. Furthermore, when the value of the Medium Synchronization Maximum Number Of TXOPs subfield is set to a predetermined value, the Medium Synchronization Maximum Number Of TXOPs subfield may indicate that the number of times the station attempts channel access in the channel access restriction time interval is not limited. In this case, the predetermined value may be 15.

Figure 43:
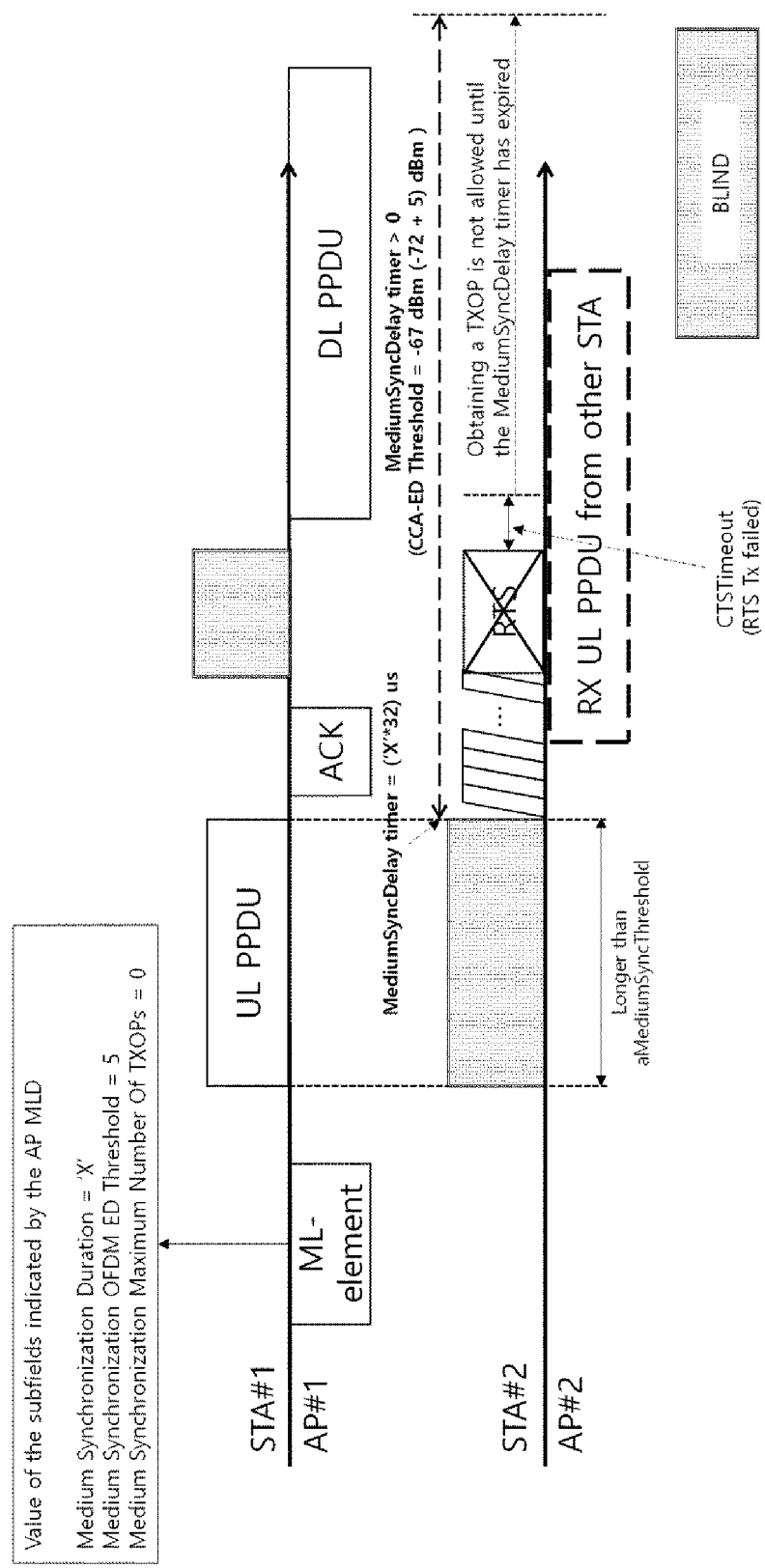
FIG. 43 illustrates a medium access recovery procedure which a station according to an embodiment of the present invention performs based on information regarding a parameter received from an AP.

FIG. 43 illustrates a medium access recovery procedure which a station according to an embodiment of the present invention performs based on information regarding a parameter received from an AP.

In the embodiment in FIG. 43, an AP multi-link device includes a first AP (AP #1) operating on a first link (Link 1) and a second AP (AP #2) operating on a second link (Link 2). Furthermore, a non-AP multi-link device includes a first station (STA #1) operating on the first link (Link 1) and a second station (STA #2) operating on the second link (Link 2). The first station (STA #1) receives information (Medium Synchronization Delay Information field) about channel access restriction from the first AP (AP #1). In this case, the second station (STA #2) may not perform medium monitoring on the second link (Link 2) due to frame exchange (UL PPDU) performed on the first link (Link1). Therefore, channel access restriction is applied to the second station (STA #2) from the time the first station (STA #1) terminates transmission. In this case, the second station (STA #2) applies the channel access restriction according to the information about the channel access restriction transmitted by the first AP (AP #1).

In the embodiment of FIG. 43, since the value of a Medium Synchronization Duration subfield is X, the second station (STA #2) sets an initial value of a MediumSyncDelay timer to X×32 us. Furthermore, since the value of a Medium Synchronization OFDM ED subfield is 5, the second station (STA #2) sets the value of dot11MSDOFDMEDthreshold to −67 dBm.

In the embodiment of FIG. 43, since the value of a Medium Synchronization Maximum Number Of TXOPs subfield is 0, the second station STA #2 may attempt channel access once in a channel access restriction time interval. Therefore, when the second station STA #2 transmits an RTS frame in the channel access restriction time interval and does not receive a CTS frame within CTStimeout, the second station STA #2 may not attempt channel access in the remaining channel access restriction time interval.

<MediumSyncDelay Timer Management Method>

A station may re-enter a state in which medium monitoring is impossible in a channel access restriction interval. In this case, a method for applying channel access restriction to the station may be an issue. In a specific embodiment, when a station re-enters a stat in which medium monitoring is impossible in a channel access restriction interval, the channel access restriction may be re-applied to the station when the station leaves the state in which medium monitoring is impossible. That is, if the station re-enters a state in which medium monitoring is impossible in a channel access restriction interval, the station may set the value of a MediumSyncDelay timer to an initial value when the station leaves the state in which medium monitoring is impossible. When the station resets the MediumSyncDelay timer to the initial value, the station may not be allowed to initialize the number of channel access attempts. This may be to prevent the station from setting the MediumSyncDelay timer to the initial value in order to attempt channel access again.

In another specific embodiment, when a station re-enters a state in which medium monitoring is impossible in a channel access restriction interval, the station may increase the duration of the channel access restriction time interval by the duration of a time interval during which monitoring is impossible. Specifically, when a station re-enters the state in which medium monitoring is impossible in a channel access restriction time interval, the station in the state in which monitoring is impossible may not be allowed to decrease the value of the MediumSyncDelay timer. Alternatively, when the station re-enters a state in which medium monitoring is impossible in a channel access restriction interval, the station may increase the value of the MediumSyncDelay timer by a time interval during which monitoring is impossible.

Through these embodiments, the station may protect the transmission of neighboring stations by increasing a time interval during which channel access restriction is applied.

<Method for Managing the Number of TXOP Acquisition Attempts>

As described above, if a station re-enters a state in which medium monitoring is impossible in a channel access restriction interval, the station may set the value of a MediumSyncDelay timer to an initial value when the station leaves the state in which medium monitoring is impossible. When the station resets the MediumSyncDelay timer to the initial value, the station may not be allowed to initialize the number of channel access attempts. However, the station may repeatedly enter the state in which monitoring is impossible. When the number of channel access attempts is not initialized each time, the station's channel access may be excessively restricted. This will be described with reference to FIG. 44.

Figure 44:
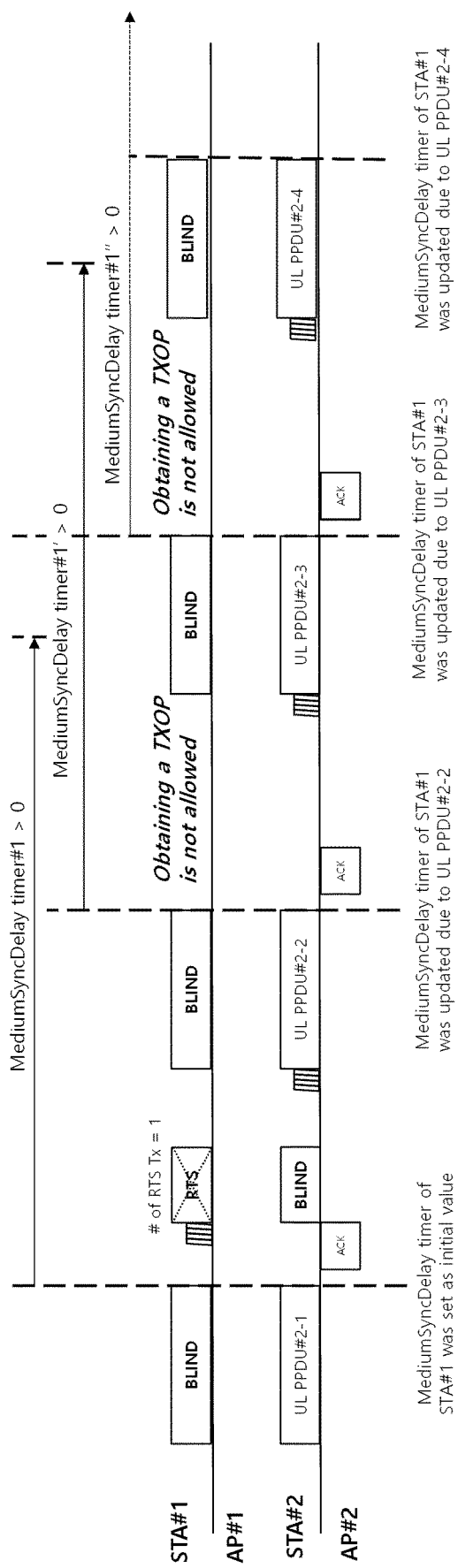
FIG. 44 illustrates that a station according to an embodiment of the present invention successively resets a MediumSyncDelay timer.

FIG. 44 illustrates that a station according to an embodiment of the present invention successively resets a MediumSyncDelay timer.

In the embodiment in FIG. 44, an AP multi-link device includes a first AP (AP #1) operating on a first link (Link 1) and a second AP (AP #2) operating on a second link (Link 2). Furthermore, a non-AP multi-link device includes a first station (STA #1) operating on the first link (Link 1) and a second station (STA #2) operating on the second link (Link 2). In this case, the second station (STA #2) may not perform medium monitoring on the first link (Link 1) due to frame exchange (UL PPDU) performed on the second link (Link2). Therefore, channel access restriction is applied to the first station (STA #1) from the time the second station (STA #2) terminates transmission. In this case, the first station (STA #1) may not transmit an RTS frame and receive a CTS frame. Then, before the end of a channel access restriction time interval, the first station (STA #1) enters a state in which medium monitoring is impossible, and the first station (STA #1) sets a MediumSyncDelay timer to an initial value. Since the first station (STA #1) has already attempted channel access and the maximum number of channel access attempts is set to 1, the first station may not attempt channel access until the channel access restriction time interval ends. Then, before the end of the channel access restriction time interval, the first station (STA #1) re-enters the state in which medium monitoring is impossible, and the first station (STA #1) sets the MediumSyncDelay timer to the initial value. Then, the first station (STA #1) re-enters the state in which medium monitoring is impossible before the channel access restriction time interval ends, and the first station (STA #1) sets the MediumSyncDelay timer to the initial value. As a result, the first station (STA #1) may not attempt channel access for an excessively long time. A method capable of solving the problem will be described with reference to FIG. 45.

Figure 45:
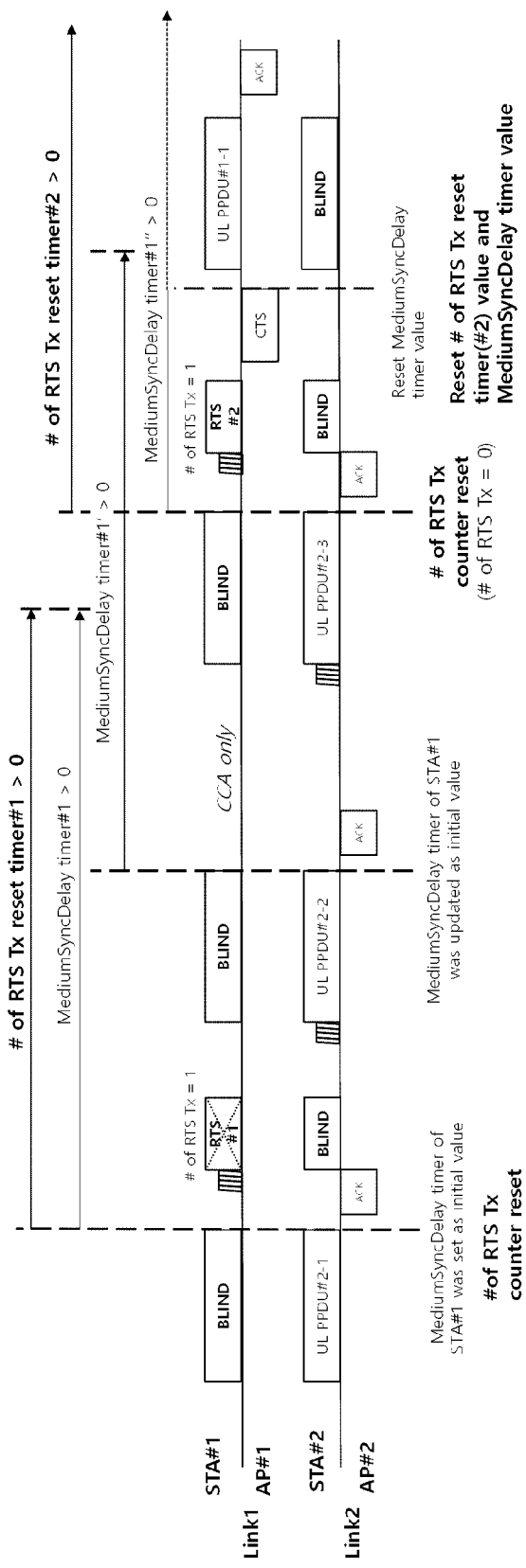
FIG. 45 illustrates that a station according to another embodiment of the present invention successively resets a MediumSyncDelay timer.

FIG. 45 illustrates that a station according to another embodiment of the present invention successively resets a MediumSyncDelay timer.

When a predetermined time has elapsed from the start of a channel access restriction time interval, a station may attempt channel access beyond the number of channel access attempts within the channel access restriction time interval. The predetermined time may be designated by an AP. The predetermined time may also be a fixed time, for example, aPPDUMAXTime. In addition, the predetermined time may be greater than the duration of the channel access restriction time interval. In a specific embodiment, when a predetermined time has elapsed from the start of the channel access restriction time interval, the station may initialize the number of channel access attempts within the channel access restriction time interval. For example, the station may set a channel access attempt count initialization timer at the start of the channel access restriction time interval. The value of the channel access attempt count initialization timer decreases steadily over time. In addition, when the channel access attempt count timer reaches 0, the station may set the number of channel access attempts within the channel access restriction time interval to 0. In this case, when the station sets the channel access attempt count initialization timer, the station may set the value of the channel access attempt count initialization timer to be equal to the value of the Medium- SyncDelay timer. In another specific embodiment, when the station sets the channel access attempt count initialization timer, the station may set the value of the channel access attempt count initialization timer to a value indicated by an AP. In this case, the AP may set only a value greater than the value of the MediumSyncDelay timer as an initial value of the channel access attempt count initialization timer.

In another specific embodiment, when the channel access attempt count initialization timer expires, the station may increase the maximum value of the number of channel access attempts. In this case, the station may increase the maximum value of the number of channel access attempts on the basis of the increased duration of the channel access restriction time interval. Specifically, when the channel access attempt count initialization timer expires, the station may add an initial value of a channel access attempt maximum value to the maximum value of the number of channel access attempts.

Furthermore, when the MediumSyncDelay timer is reset after the expiration of the channel access attempt count initialization timer, the station may set the channel access attempt count initialization timer. In another specific embodiment, when the channel access attempt count initialization timer expires, the station may set the channel access attempt count initialization timer.

Furthermore, if the station has not attempted channel access until the MediumSyncDelay timer is reset, the station may set the channel access attempt count initialization timer when the station resets the MediumSyncDelay timer.

The above-described embodiments regarding setting the channel access attempt count initialization timer may apply only when the initial value of the number of channel access attempts is greater than a predetermined value. For example, the predetermined value may be 2. In this case, when the initial value of the number of channel access attempts is 2, the channel access attempt count initialization timer may not be set. Furthermore, when the initial value of the number of channel access attempts is 3, the channel access attempt count initialization timer may be set according to the above-described embodiments.

Furthermore, when the MediumSyncDelay timer expires, the channel access attempt count initialization timer may be set to zero.

In the embodiment in FIG. 45, an AP multi-link device includes a first AP (AP #1) operating on a first link (Link 1) and a second AP (AP #2) operating on a second link (Link 2). Furthermore, a non-AP multi-link device includes a first station (STA #1) operating on the first link (Link 1) and a second station (STA #2) operating on the second link (Link 2). In this case, the second station (STA #2) may not perform medium monitoring on the first link (Link 1) due to frame exchange (UL PPDU) performed on the second link (Link2). Therefore, channel access restriction is applied to the first station (STA #1) from the time the second station (STA #2) terminates transmission. In this case, the first station (STA #1) may not transmit an RTS frame and receive a CTS frame. Then, before the end of a channel access restriction time interval, the first station (STA #1) enters a state in which medium monitoring is impossible, and the first station (STA #1) sets a MediumSyncDelay timer to an initial value. Since the first station (STA #1) has already attempted channel access and the maximum number of channel access attempts is set to 1, the first station may not attempt channel access until the channel access restriction time interval ends. In this case, when the first station (STA #1) sets the MediumSyncDelay timer to the initial value, the first station (STA #1) sets a channel access attempt count initialization timer (MediumSyncDelay timer #1'). Therefore, when the channel access attempt count initialization timer (MediumSyncDelay timer #1') expires, the first station (STA #1) attempts channel access again (transmits an RTS frame). The first station (STA #1) receives a CTS frame to recover medium synchronization.

<Disabling Link>

A multi-link device may disable some of multiple links on which the multi-link device operates. In this case, a station of the multi-link device operating on the disabled links may perform a power saving operation for entering a doze state. In traditional wireless LANs, an AP is not allowed to enter the doze state. This is because the AP need to periodically transmit management frames, such as beacon frames, and receive an association request from a new station. However, a multi-link device may include multiple stations operating on different links, and frame exchange on a disabled links may be very limited. Therefore, an AP, among APs of an AP multi-link device, which is operating on a disabled link, may enter a doze state. In the doze state, the AP of the AP multi-link device may support only minimal operations. Specifically, in the doze state, the AP of the AP multi-link device may perform CCA and PD but may not support frame exchange.

When the AP multi-link device disables any one link, this may cause confusion to stations operating on that link. Therefore, a procedure by which the AP multi-link device disables a link should be clearly defined. This will be described with reference to FIGS. 46 and 47.

<Method for Disable Link by AP Multi-Link Device>

When any one link is disabled, frame exchange on that link may be restricted. Specifically, the exchange of data frames, management frames, and control frames may not be allowed on the disabled link. However, a non-AP station may be allowed to transmit a peer-to-peer (P2P) PPDU to a P2P station of the disabled link.

FIG. 46 illustrates disabling-related information transmitted by an AP multi-link device according to an embodiment of the present invention.

The AP multi-link device may use a management frame to signal information related to a time interval during which a link is disabled. The information related to the time interval during which the link is disabled may include at least one of a start time and a duration of the time interval during which the link is disabled. Specifically, the AP multi-link device may signal the information related to the time interval, during which the link is disabled, by using a Multi-Link element that is included in the management frame. The Multi-Link element may include a time at which the link begins to be disabled and a duration of the time interval during which the link is disabled. A Common Info field of the Multi-Link element may include the time at which the link starts to be disabled and the duration of the time interval during which the link is disabled. Furthermore, the management frame may be at least one of a beacon frame and a probe response frame.

The AP multi-link device may signal information about disabling of a second link on a first link by using a management frame. Specifically, a Multi-Link element of the management frame may include a Per-STA profile that dictates information about individual links and APs operating on the individual links. The AP multi-link device may use the Per-STA profile in the Multi-Link element transmitted on the first link to signal information about disabling of the second link. A non-AP multi-link device may acquire the information about the disabling of the second link from the Per-STA profile of the Multi-Link element transmitted on the first link. The Per-STA profile may include information about a link corresponding to the Per-STA profile, an AP operating on the link corresponding to the Per-STA profile, and a BSS operated by the AP operating on the link corresponding to the Per-STA profile. Specifically, the Per-STA profile may indicate an MAC address, non-STR link pair, beacon period, and DTIM information of the AP operating on the link that corresponds to the Per-STA profile.

The AP multi-link device may use a reduced neighbor report (RNR) element in the management frame to signal whether a link is disabled. In addition, the AP multi-link device may use a TBTT Information field to signal whether a link corresponding to the TBTT Information field is disabled. Specifically, the TBTT Information field may indicate a 1-bit Unavailable Link Indication field that indicates whether the link corresponding to the TBTT Information field is disabled. When the link corresponding to the TBTT Information field is disabled, the value of the TBTT Information field may be set to 1.

The AP multi-link device uses a Neighbor AP TBTT offset subfield of the TBTT Information field of the RNR element included in the management frame to indicate the TU difference between a TBTT immediately preceding and a TTBT following a neighbor AP. When the value of the Neighbor AP TBTT offset subfield is set to 255, the Neighbor AP TBTT offset subfield indicates that the TU difference between the TBTT immediately preceding and the TTBT following a neighbor the AP is unknown. When the TBTT Information field of the RNR element dictates information about an AP operating on a disabled link, the AP may set the value of the Neighbor AP TBTT offset subfield of the TBTT Information field of the RNR element to 255. This is because a beacon frame is not allowed to be transmitted on the disabled link.

The AP multi-link device may not specify the duration of a time interval during which a link is disabled. In this case, when the AP multi-link device transmits a first frame on the disabled link, the link may be re-enabled. The type of the first frame may be predesignated. When the non-AP multi-link device receives the first frame on the disabled link, the non-AP multi-link device may determine that the link has been re-enabled. For example, the first frame may be a beacon frame or a probe response frame. Furthermore, the first frame may be transmitted at a basic rate, such as 6 Mbps or 24 Mbps. Furthermore, the first frame may be transmitted in a non-HT duplicated format. When these embodiments are applied, more stations may be able to decode the first frame.

The non-AP multi-link device may perform channel access based on information related to the time interval during which the link is disabled. In addition, the non-AP multi-link device may manage TID-to-Link mappings based on the information related to the time interval during which the link is disabled.

FIG. 46(a) illustrates the format of a Presence Bitmap subfield of a Basic Multi-Link element. The Presence Bitmap subfield of the Basic Multi-Link element may include a Link Unavailability Parameters Present subfield. When the Link Unavailability Parameters Present subfield has a value of 1, a Common Info field of the Basic Multi-Link element may include a Link Unavailability Parameters field.

FIG. 46(b) illustrates the format of the Common Info field of the Basic Multi-Link element that includes the Link Unavailability Parameters field. The Link Unavailability Parameters field may be a three-octet field.

FIG. 46(c) illustrates the format of the Link Unavailability Parameters field. The Link Unavailability Parameters field may include a Link Unavailability Count subfield that indicates a time point when a link corresponding to the Link Unavailability Parameters field is disabled. In this case, the Link Unavailability Count subfield may be a 1-octet field. The value of 0 in the Link Unavailability Count subfield may indicate that the link corresponding to the Link Unavailability Parameters field is disabled after a management frame including the Link Unavailability Count subfield is transmitted. In addition, the Link Unavailability Count subfield may be set to one of values of 0 to 255.

Furthermore, the ink Unavailability Parameters field may include a Link Unavailability Duration subfield that indicates the duration of a time interval during which the link corresponding to the Link Unavailability Parameters field is disabled. The Link Unavailability Duration subfield may be a 2-octet or 1-octet field. When the Link Unavailability Duration subfield is a 1-octet field, the value of the Link Unavailability Duration subfield may be set to one of 0 to 255. When the Link Unavailability Duration subfield is a 2-octet field, the value of the Link Unavailability Duration subfield may be set to one of 0 to 65535. The value of the Link Unavailability Duration subfield may indicate the duration of a time interval, during the link is disabled, in a unit of beacon interval. For example, when the beacon interval is 100 ms and when the Link Unavailability Duration subfield has a value of 2, the duration of the time interval during which the link is disabled may be 200 ms. In another specific embodiment, the value of the Link Unavailability Duration subfield may dictate the duration of the time interval, during which the link is disabled, in a unit of TU. When the value of the Link Unavailability Duration subfield is 100, the duration of the time interval during which the link is disabled may be 100 TUs. When the value of the Link Unavailability Duration subfield is set to a maximum value that the Link Unavailability Duration subfield may have, the Link Unavailability Duration subfield may indicate that the duration of the time interval during which the link is disabled is unspecified. In this case, it is possible to apply the above-described embodiment in which the AP multi-link device has not specified the duration of the time interval during which the link is disabled.

As described above, the AP multi-link device may signal information about the disabling of the second link on the first link by using a management frame.

FIG. 47 illustrates the format of information about disabling of a second link that is signaled on a first link by an AP multi-link device according to an embodiment of the present invention.

FIG. 47(a) illustrates the format of a BSS Parameters subfield transmitted by an AP multi-link device according to an embodiment of the present invention. The AP multi-link device may use a reduced neighbor report (RNR) element of a management frame to signal whether a link is disabled. The BSS Parameters subfield of the RNR element may include an Unavailable Link Indication subfield that indicates whether a link corresponding to the BSS Parameters subfield is disabled. When the value of the Unavailable Link Indication subfield is 1, the Unavailable Link Indication subfield may indicate that the link corresponding to the BSS Parameter subfield is disabled.

FIG. 47(b) shows a TBTT Information field including a BSS Parameters subfield according to an embodiment of the present invention. The link corresponding to the BSS Parameters subfield may be a link corresponding to an ID of a link indicated by the TBTT Information field including the BSS Parameters subfield.

FIG. 47(*c*) shows the format of an STA Control field according to an embodiment of the present invention, and FIG. 47(*d*) shows the format of an STA Info field. Specifically, a Multi-Link element of a management frame may include a Per-STA profile that indicates information about individual links and APs operating on the individual links. An AP multi-link device may use the Per-STA profile in the Multi-Link element transmitted on a first link to signal information about disabling of a second link. A non-AP multi-link device may acquire the information about the disabling of the second link from the Per-STA profile of the Multi-Link element transmitted on the first link. The Per-STA profile may include information about a link corresponding to the Per-STA profile, an AP operating on the link corresponding to the Per-STA profile, and a BSS operated by the AP operating on the link corresponding to the Per-STA profile. Specifically, the Per-STA profile may indicate the MAC address, non-STR link pairs, beacon period, and DTIM information of the AP operating on the link corresponding to the Per-STA profile. The Per-STA profile may be indicated by the STA Control field and the STA info field.

The STA Control field may include a Link Unavailability Parameters Present subfield that indicates whether the STA info field includes a Link Unavailability Parameters subfield. When the Link Unavailability Parameters Present subfield has a value of 1, the Link Unavailability Parameters Present subfield may indicate that the STA info field includes the Link Unavailability Parameters field. The Link Unavailability Parameters field indicates whether a link corresponding to the STA info field is disabled.

<Method for Indicating Change in Disabling of Another Link>

In the above-described embodiments where an AP multi-link device signals information about disabling of a second link on a first link by using a management frame, a non-AP station may not decode a Per-STA profile corresponding to another non-AP station which is not the non-AP station. In this case, the non-AP station may not know that whether a link on which the non-AP station does not operate is disabled has changed. To prevent this, when a Per-STA profile corresponding to a link that is different from a link on which the management is transmitted includes information about link disabling, the AP multi-link device may indicate that a critical update occurs in a TBTT Information field including the Per-STA profile. Specifically, the value of a BSS Parameters Change Count subfield of the TBTT Information field corresponding to the Per-STA profile including the information about link disabling may be increased by 1 from a previous value. A station of the non-AP multi-link device may determine that the value of the BSS Parameters Change Count subfield of the TBTT Information field received by the station of the non-AP multi-link device is different from the value of the BSS Parameters Change Count subfield of the TBTT Information field which has been previously received. In this case, the station of the non-AP multi-link device may decode the Per-STA profile of the TBTT Information field to acquire information corresponding to the critical update. Furthermore, the station of the non-AP multi-link device may acquire the information corresponding to the critical update by receiving a management frame, such as a beacon frame, on a link corresponding to the Per-STA profile.

In conventional wireless LAN, updates classified as critical updates are as follows.

(a) Inclusion of a Channel Switch Announcement element
(b) Inclusion of an Extended Channel Switch Announcement element
(c) Modification of the EDCA parameters element
(d) Inclusion of a Quiet element
(e) Modification of the DSSS Parameter Set
(f) Modification of the HT Operation element
(g) Inclusion of a Wide Bandwidth Channel Switch element
(h) Inclusion of a Channel Switch Wrapper element
(i) Inclusion of an Operating Mode Notification element
(j) Inclusion of a Quiet Channel element
(k) Modification of the VHT Operation element
(l) Modification of the HE Operation element
(m) Insertion of a Broadcast TWT element
(n) Inclusion of the BSS Color Change Announcement element
(o) Modification of the MU EDCA Parameter Set element
(p) Modification of the Spatial Reuse Parameter Set element
(q) Modification of the UORA Parameter Set element A change in a Link Unavailability Parameters subfield and a change in an Unavailable Link Indication subfield may be added, as described above, to the above critical update items. In the embodiment, when the value of the Link Unavailability Parameters subfield or the value of the Unavailable Link Indication subfield changes, the AP multi-link device may increase the value of a BSS Parameter Change Count subfield by 1 compared to the value of a BSS Parameter Change Count subfield that was transmitted immediately before.

When a link disabling time interval is not specified, the non-AP station may determine that the disabling time interval has ended, based on the Unavailable Link Indication subfield or the BSS Parameter Change Count subfield. Specifically, when the Unavailable Link Indication subfield indicates that a link corresponding to the Unavailable Link Indication subfield is not disabled, the non-AP station may determine that a disabling time interval of the link corresponding to the Unavailable Link Indication subfield has ended. In this case, when the value of the Unavailable Link Indication subfield is 0, the Unavailable Link Indication subfield may indicate that the link corresponding to the Unavailable Link Indication subfield is not disabled. In addition, when the value of the BSS Parameter Change Count subfield is different from the value of a BSS Parameter Change Count subfield received by the non-AP station immediately before, the non-AP station may determine that a disabling time interval of a link corresponding to the BSS Parameter Change Count subfield has ended.

<QoS Support in WLAN>

Despite the increasing transmission rate in WLAN, transmission delay is still a problem for some services. In particular, WLAN operating in an unlicensed band may be inadequate for operating services that require low-latency transmission because of the difficulty in predicting the time required for traffic transmission. EDCA was introduced to address these problems. A station that supports EDCA is referred to as a QoS station, an AP that supports EDCA is referred to as a QoS AP, and a BSS that supports EDCA is referred to as a QoS BSS. Hereinafter, for ease of description, a QoS AP is referred to as an AP, a QoS station is referred to as a station, and a QoS BSS is referred to as a BSS. In EDCA, traffic is divided into four access categories (ACs) based on characteristics. In this case, the four ACs are AC Voice (AC_VO), AC Video (AC_VI), AC Best effort (AC_BE), and (AC Background (AC_BK). In the backoff procedure described above, the value of a parameter regarding CW is determined based on the ACs. Furthermore, the maximum value of TXOP may be determined based on the ACs. Furthermore, the value of an AIFSN parameter may be determined based on the ACs. Through this, the priority of traffic transmission for each AC may be adjusted. Traffic may be mapped to the four ACs per traffic category (TC) or traffic stream (TS). The traffic mapped to the four ACs is managed in four queues operated for the ACs.

AC_VO is an AC for traffic, such as voice traffic, that does not have a large absolute volume but is vulnerable to transmission delay, and is mapped with relatively small CW and AIFSN parameter values. However, the maximum value of TXOP of AC_VO is relatively smaller than the maximum value of TXOP of each of other ACs. AC_VI is an AC for video traffic which is more resistant to transmission delay than voice traffic but in which low-latency transmission is required and a large volume of traffic has to be processed. AC_VI is mapped with CW parameter and AIFSN parameter values that are greater than those in AC_VO but smaller than CW parameters and AIFSN parameters of other ACs. The maximum value of TXOP of AC_VO is about twice as long as the maximum value of TXOP of AC_VI. AC_BE is an AC for a traffic resistant to transmission delay, and most common traffic except voice data and streaming video data may be classified as AC_BE. A CW parameter and an AIFSN parameter of AC_BE are mapped with values that are larger than those of the CW parameter and AIFSN parameter of AC_VO and the CW parameter and AIFSN parameter of AC_VI. Also, a separate TXOP maximum value is not mapped to AC_BE. In AC_BE, transmission using consecutive transmission sequences is not allowed. AC_BK, similar to AC_BE, is an AC for traffic that is resistant to transmission delay but has a lower priority than BE traffic. AC_BK is mapped with the same CW parameter value as AC_BE, and the AIFSN parameter value is mapped with a value greater than the AIFSN parameter of AC_BE. Also, AC_BK is not mapped with a separate TXOP maximum value. In AC_BK, transmission using a consecutive transmission sequence.

The four ACs described above are mapped to the user-priorities (UPs) of 802.1D, and the EDCA AC is determined based on a UP value of traffic received on a wire or a TID of MSDU indicated by an upper layer. In this case, when the TID of the MSDU indicates values of 0 to 7, the values indicated by the TID may be corresponded to UPs one-to-one.

FIG. 48 illustrates a mapping relationship between a UP and an AC according to an embodiment of the present invention.

The default CW parameter (CWmin, CWmax), AIFSN parameter, and TXOP maximum value of each of the four ACs are defined in the 802.11 standard. The CW parameters (CWmin, CWmax), AIFSN parameters, and TXOP maximum values of the ACs are changed by an AP, so different values may be used for BSSs. Under EDCA, traffic is stored in a queue, among four queues, which corresponds to an AC of the traffic. Channel access contention is performed among the four ACs, and traffic of an AC that wins the contention is transmitted. In channel access contention, AC-specific access parameters (CW[AC], AIFSN[AC]) are used. In this case, a channel access operation is the same as the channel access operation of DCF.

As described above, AC-specific channel access parameter values may different, so transmission priority may be applied on a per-AC basis.

In addition to EDCA, the 802.11 MAC protocol may apply HCF controlled channel access (HCCA) for QoS management. HCCA provides a centralized/hybrid coordinator function for ensuring Traffic Stream (TS) QoS (such as Voice or Video) of applications that need to be serviced periodically. In addition, a Service Period Channel Access (SPCA) function, a dynamic allocation of service period function, etc. may be used. However, only DMG stations can use these functions.

A QoS enhancement method for a multi-link device may be required. An independent transmission queue may be used for each link of the multi-link device. In this case, the queue may be logically independent. When traffic is mapped for each link, QoS of the traffic may be enhanced. This is illustrated with reference to FIG. 49.

FIG. 49 illustrates that a multi-link device transmits traffic mapped for each station of a multi-link device according to an embodiment of the present invention.

In FIG. 49, an AP multi-link device (AP MLD) includes (affiliates) a first AP (AP1) to a fourth AP (AP4). In addition, a non-AP multi-link device (Non-AP MLD) includes a first station (non-AP STA1) to a fourth station (non-AP STA4). The first station (non-AP STA1) to the fourth station (non-AP STA4) operates in a first link (Link1) to a fourth link (Link1), respectively. The first AP (AP1) to the fourth AP (AP4) operates in the first link (Link1) to the fourth link (Link1), respectively. In this case, traffic is mapped for each AC to each of the first AP (AP1) to the fourth AP (AP4). AC_BK is mapped to the first AP (AP1), AC_BE is mapped to the second AP (AP2), AC_VI is mapped to the third AP (AP3), and AC_VO is mapped to the fourth AP (AP4). Accordingly, in the AP multi-link device (AP MLD), traffic corresponding to AC_BK is transmitted through the first AP (AP1), traffic corresponding to AC_BE is transmitted through the second AP (AP2), and traffic corresponding to AC_VI is transmitted through the third AP (AP3), and traffic corresponding to AC_VO is transmitted through the fourth AP (AP4). Channel quality and load conditions of each link may be different. Also, the performance and operating bandwidth of each station may be different. Accordingly, the bandwidth and MCS of a PPDU including traffic may vary depending on which traffic is mapped to which link by the multi-link device.

For example, when the first AP (AP1) of the AP multi-link device (AP MLD) operates in a 2.4 GHz band, the first AP (AP1) may operate an operating channel of 40 MHz. When the fourth AP (AP4) operates in a 6 GHz band, the fourth AP (AP4) may operate an operating channel of up to 320 MHz. The AP multi-link device (AP MLD) may map traffic requiring high throughput and low-latency transmission to the fourth AP (AP4). A multi-link device may map traffic to each of multiple links in consideration of traffic characteristics. Through this, QoS of traffic transmission may be enhanced.

In order to subdivide the QoS enhancement, a TID is mapped to each link, and transmission of traffic corresponding to the TID mapped to the corresponding link in each link may be prioritized. This will be described with reference to FIG. 50.

Figure 50:
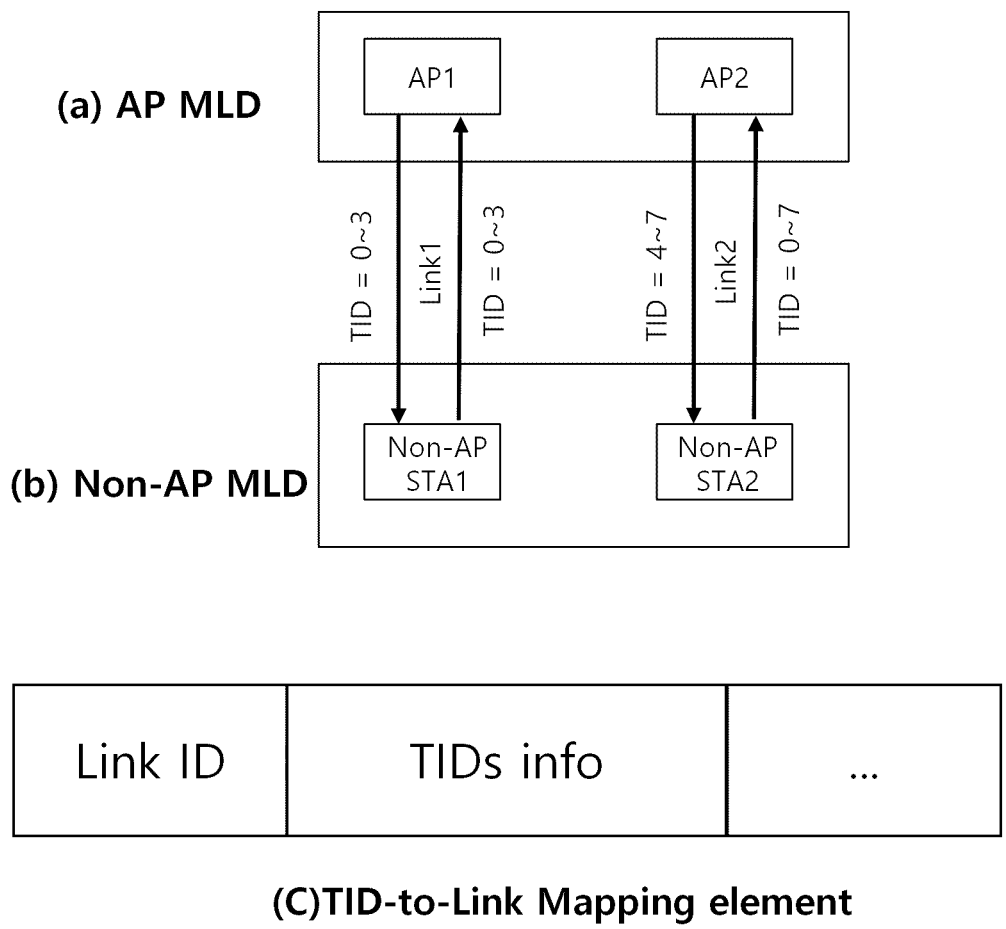
FIG. 50 illustrates that a multi-link device performs frame exchange based on TID link mapping according to an embodiment of the present invention.

FIG. 50 illustrates that a multi-link device performs frame exchange based on TID link mapping according to an embodiment of the present invention.

Traffic transmitted in WLAN is identified by a TID. A MAC frame, such as a data frame or a QoS data frame, signals the TID of traffic included in the MAC frame through a TID service field. In this case, a QoS control field may include the TID service field. The TID identifies traffic included in the MSDU or fragment or A-MSDU of the MAC frame. In addition, the TID corresponds to user priorities (UP) or a traffic stream identifier (TSID). In addition, the TID service field is a total 4-bit field and may represent values from 0 to 15. When the value of the TID subfield is any one of 0 to 7, the value of the TID subfield represents the UP of an MSDU included in a frame body of the MAC frame including the TID subfield. The MAC frame is processed by an MAC entity by using an AC parameter corresponding to the UP according to EDCA. When the value of the TID subfield is any one of 8 to 15, the value of the TID subfield indicates a TSID of the MSDU included in the frame body of the MAC frame including the TID subfield. The MAC frame is processed by the MAC entity by using a parameter corresponding to a UP of a TSID indicated in the User Priority service field of a TS Info field of TSPEC. The UP of the TSID may be indicated through a User Priority field of TCLAS. In addition, an Access Policy of TSID is indicated by an Access Policy field of the TS Info subfield. When seventh and eighth bits of the Access Policy subfield are 10, this represents EDCA, and when the bits are $11_b$, this represents HCCA. In another specific embodiment, TID-to-Link mapping may be applied only when the TID values are 0 to 7

When a multi-link device maps a TID of a TS to a link, the multi-link device may acquire information about a UP of the TS and an alternate queue to be used for TS transmission from an Intra-Access Priority field of an Intra-Access Category Priority element of an ADDTS Request frame used to generate the TS. The multi-link device may use the acquired information about the UP and the alternate queue when transmitting traffic corresponding to the TID of the TS.

A TID may be mapped to each of multiple links in which the multi-link device operates. In this case, the multi-link device may signal information about the TID mapped to each link to a multi-link device associated with the multi-link device. At this time, the multi-link device receiving the signaling may accept or reject the TID and link mapping. When an agreement on mapping between TIDs and links is not established, frame exchange may be performed without TID restriction in each link. In another specific embodiment, when an agreement on mapping between TIDs and links is not established, frame exchange may be performed according to default mapping between TIDs and links in each link.

When a multi-link device maps TIDs to links, the multi-link device may have to map all TIDs to one or more links. In a specific embodiment, a multi-link device transmits, in a link, a frame including traffic corresponding to a TID mapped to the link, and transmission of a frame including traffic corresponding to a TID not mapped to the link may not be allowed. Mapping between a TID and a link may be performed for each multi-link device. In addition, mapping between a TID and a link may be performed per transmission direction. For example, in one link, a TID mapped to an uplink may be different from a TID mapped to a downlink. Therefore, when a first multi-link device and a second link device are connected in a first link and a second link, the first multi-link device maps TID values 0 to 3 to the first link, and the second multi-link device maps TID values 4 to 7 to the first link.

Furthermore, TID-to-Link mapping may be applied per transmission direction. Specifically, in one link, TID-to-Link mapping that is applied to UL transmission and TID-to-Link mapping that is applied to DL transmission may be independently configured. For example, TID values 0 to 3 may be mapped to transmission from a multi-link device on the first link, and TID values 4 to 7 may be mapped to transmission from a non-AP multi-link device on the first link.

In the present specification, mapping between a TID and a link may be replaced with mapping between an AC and a link, mapping between a UP and a link, mapping between a TC and a link, or mapping between a TS and a link.

Furthermore, the remaining TID values not explicitly indicated in the mapping between a TID and a link may be mapped to the remaining links. For example, when it is signaled that TID values 0 to 3 are mapped to a first link, the remaining TID values excluding TID values 0 to 3 may be mapped to a second link. In another specific embodiment, transmission of traffic corresponding to all TIDs may be allowed in the second link.

Furthermore, mapping between a TID and a link may be changed during operation as well as when multi-link devices are initially associated. When a multi-link device disassociates a station of a specific link, the multi-link device may change mapping between a TID and a link. In this case, the multi-link device may disassociate the station when the station of the specific link enters a power saving mode. Also, the multi-link device may request a counterpart multi-link device to change the mapping between the TID and the link. For example, when TID values 0 to 3 are mapped to the first link, a non-AP multi-link device may request an AP multi-link device to map TID values 0 to 3 to the second link. Specifically, when it is difficult for a multi-link device to guarantee QoS of traffic mapped to a link, the multi-link device may request a counterpart multi-link device to change mapping between a TID and a link.

Furthermore, when a multi-link device rejects a request for mapping between a TID and a link, a multi-link device that has transmitted the request for mapping between the TID and the link may be restrained, for a predetermined time, from re-requesting the same mapping between the TID and the link as the previously requested mapping between the TID and the link. This is to prevent repeated requests for mapping between the TID and the link. In this case, the predetermined time may be a time indicated by an AP. Specifically, the AP multi-link device may signal the predetermined time through a BSS operating parameter.

A method for signaling mapping between a TID and a link will be described. A multi-link device may signal mapping between a TID and a link by using a TID-to-Link Mapping element. The TID-to-Link Mapping element may include a Link ID field. The Link ID field indicates a link for signaling a TID-to-Link Mapping element. In addition, a TIDs Info field represents information about a TID mapped to a link indicated by the Link ID field. The TIDs Info field may include a field indicating a value of the TID mapped to the link indicated by the Link ID field. In this case, the TIDs Info field may include a bitmap indicating the value of the TID mapped to the link indicated by the Link ID field. In this case, each bit of the bitmap is mapped to a specific TID, and when a bit is set to 1, this may indicate that a TID corresponding to the bit is mapped to the link indicated by the Link ID field.

In the embodiment of FIG. 50, an AP multi-link device (AP MLD) plans to transmit, on a first link (Link1), traffic having TIDs of 0 to 3 among traffic to be transmitted to a non-AP multi-link device (non-AP MLD). The AP multi-link device (AP MLD) signals the non-AP multi-link device (non-AP MLD) to map TID values 0 to 3 to the first link (Link1) and TID values 4 to 7 to a second link (Link2) by using a TID-to-Link Mapping element. The TID-to-Link Mapping element includes two Link ID fields, which indicate the first link and the second link, respectively, and two TIDs Info fields, which indicate information about a TID mapped to the first link and information mapped to the second link, respectively. In addition, the TIDs Info fields may include 7 bits indicating TIDs 0 to 7, respectively. For example, 8 bits of the TIDs info subfield may be set to 11110000b to indicate TIDs 0 to 3, and 8 bits of the TIDs info subfield may be set to 00001111b to indicate TIDs 4 to 7.

In another specific embodiment, the TIDs Info fields may include a Min TID field and a Max TID field. The Min TID field indicates a minimum value among TIDs mapped to a link corresponding to the TIDs Info field, and the Max TID field indicates a maximum value among TIDs mapped to a link corresponding to the TIDs Info field. Each of the Min TID field and the Max TID field may be a 3-bit or 4-bit field. For example, when each of the Min TID field and the Max TID field is 3 bits and when the TIDs Info field indicates 0 to 3, the Min TID field may be set to 000 and the Max TID field may be set to 011b. As described above, the TID-to-Link Mapping element may signal only the TID mapped to the first link, and the TID mapped to the second link may be implicitly signaled. Specifically, since the TID-to-Link Mapping element explicitly signals that TIDs from 0 to 7 are mapped to the first link, the TID-to-Link Mapping element may implicitly signal that the remaining TIDs are mapped to the second link.

The non-AP multi-link device accepts mapping between a link and a TID indicated by the TID-to-Link Mapping element.

When multiple TIDs are mapped to one link and when the multiple TIDs correspond to two or more ACs, a multi-link device may differentiate the ACs based on EDCA and transmit traffic. For example, when a TID corresponding to AC_VO and a TID corresponding to AC_BK are mapped to the first link, the multi-link device may preferentially transmit traffic corresponding to AC_VO over traffic corresponding to AC_BK according to EDCA. In addition, all TIDs must be mapped to at least one link, and when no TID is mapped to any link, a multi-link device may not be allowed to request mapping between the TID and a link.

No TID may be mapped to the disabled link described above. That is, the disabled link may be a link to which no TID is mapped. Furthermore, when links on which a multi-link device operates include a disabled link, it may not be enforced that all TIDs are mapped to at least one link. Specifically, there may be a TID value which is not mapped to an enabled link among the links on which the multi-link device operates.

Figure 51:
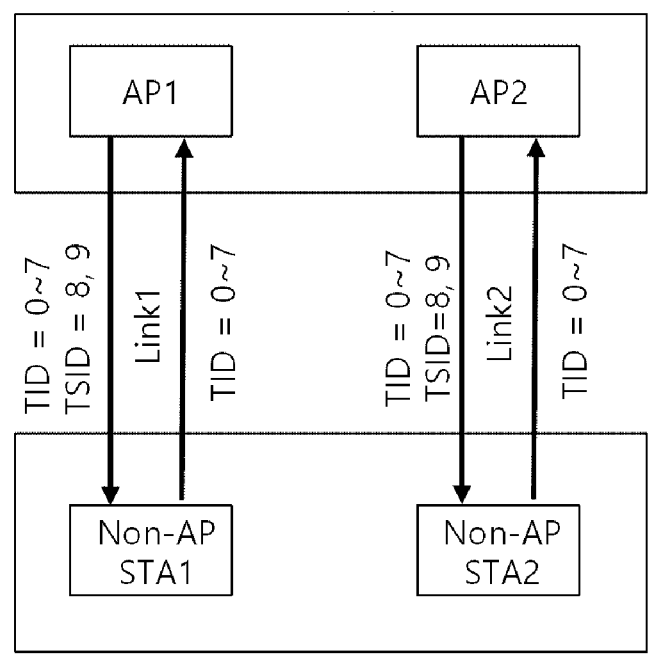
FIG. 51 illustrates that default mapping between a TID and a link is established in an AP multi-link device and a non-AP multi-link device according to an embodiment of the present invention.

FIG. 51 illustrates that default mapping between a TID and a link is established in an AP multi-link device and a non-AP multi-link device according to an embodiment of the present invention.

As described above, when separate mapping between a TID and a link is not set up, default mapping between TIDs and links is applied. In the embodiment of FIG. 51, all TIDs and TSIDs are mapped to links in the default mapping between TIDs and links.

When one of multiple links on which the multi-link device operates is disabled, it may be necessary to change TID-to-Link mapping. This is because it may be impossible to exchange a frame corresponding to a TID mapped to the disabled link. Therefore, when one of multiple links on which the multi-link device operates is disabled, it is necessary to adjust TID-to-Link mapping for links that are not disabled. This will be described with reference to FIGS. 52 to 54.

<Link Disabling and TID-to-Link Mapping Management>

When an AP multi-link device disables a first link, a non-AP multi-link device operating on the first link may map a TID mapped to the first link to a second link. The second link may be a link on which the AP multi-link device and the non-AP multi-link device operate. At a time point when the first link is disabled, the non-AP multi-link device may map the TIDs mapped to the first link to the second link. When the non-AP multi-link device maps the TIDs mapped to the first link to the second link, the TID mapping may be performed without a TID-to-Link mapping negotiation. Furthermore, in these embodiments, TID-to-link mapping for transmission from the AP multi-link device as well as TID-to-link mapping for transmission from non-AP multi-link device may be applied.

Furthermore, in a specific embodiment, the second link may be a predesignated link. Specifically, the second link may be a link that is designated by the negotiation between the non-AP multi-link device and the AP multi-link device before the first link is disabled.

Figure 52:
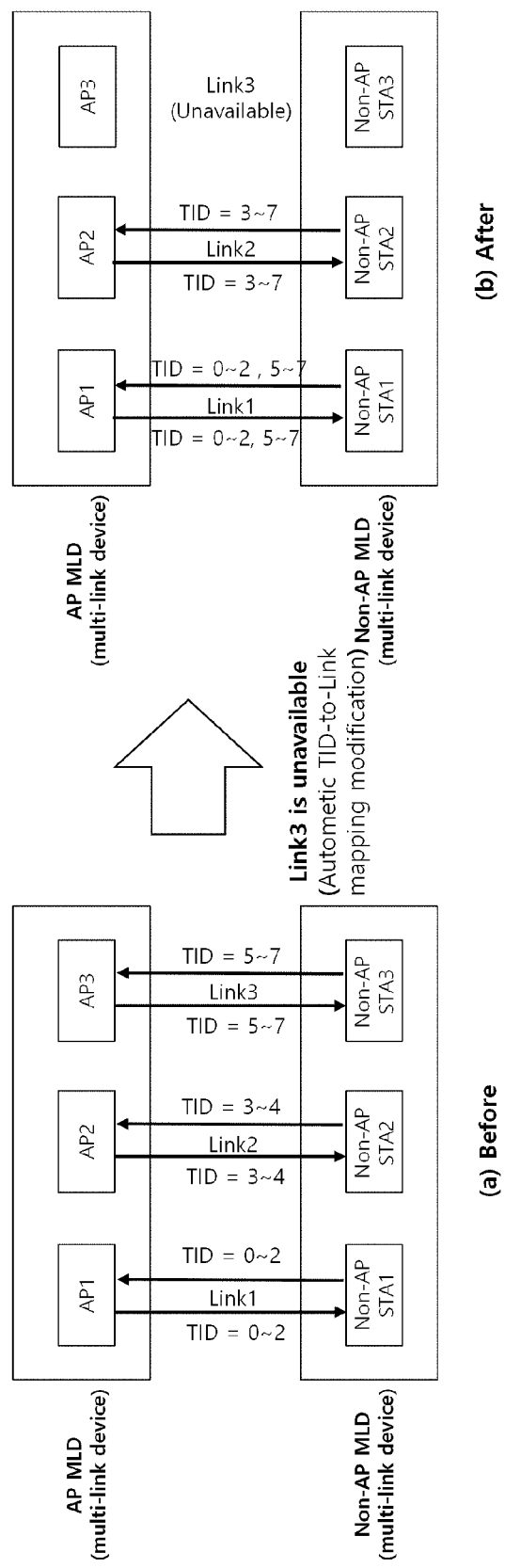
FIG. 52 illustrates that an AP multi-link device and a non-AP multi-link device change TID-to-Link mapping when any one link is disabled according to an embodiment of the present invention.

FIG. 52 illustrates that an AP multi-link device and a non-AP multi-link device change TID-to-Link mapping when any one link is disabled according to an embodiment of the present invention.

In FIG. 52(*a*), an AP multi-link device (AP MLD) including a first AP (AP1), a second AP (AP2), and a third AP (AP3) is associated with a non-AP multi-link device (Non-AP MLD) including a first station (Non-AP STA1), a second station (Non-AP STA2), and a third station (Non-AP STA3). The first AP (AP1) and the first station (Non-AP STA1) operate on a first link (Link1). In addition, the second AP (AP2) and the second station (Non-AP STA2) operate on a second link (Link2). In addition, the third AP (AP3) and the third station (Non-AP STA3) operate on a third link (Link3). TID values 0 to 2 are mapped to uplink transmission and downlink transmission on the first link (Link1). In addition, TID values 3 and 4 are mapped to uplink transmission and downlink transmission on the second link (Link2). In addition, TID values 5 to 7 are mapped to uplink transmission and downlink transmission on the third link (Link3).

In FIG. 52(*b*), the third link (Link3) is disabled. At this time, the AP multi-link device (AP MLD) and the non-AP multi-link device (Non-AP MLD) map the TID values 5 to 7 mapped to the third link (Link 3) to the first link (Link 1) and the second link (Link 2). This allows the AP multi-link device (AP MLD) and the non-AP multi-link device (Non-AP MLD) to exchange frames corresponding to the TID values 5 to 7 even when the third link (Link3) is disabled.

In another specific embodiment, when a first link among links on which an AP multi-link device and a non-AP multi-link device operate is disabled, default mapping may be applied to all the links on which the AP multi-link device and the non-AP multi-link device operate. In this case, the default mapping may be that all TIDs subject to TID-to-Link mapping are mapped to the links. In a specific embodiment, all TIDs that are subject to the TID-to-Link mapping may be TIDs with TID values of 0 to 7. In another specific embodiment, all TIDs that are subject to the TID-to-Link mapping may be TIDs with TID values of 0 to 15. Furthermore, when the first link is disabled, the TID-to-Link mapping that was applied to all links on which the AP multi-link device and non-AP multi-link device operate may be released and default mapping may be applied. In this case, the default mapping is not applied to TID-to-Link mapping of the first link because the first link is disabled.

Before the AP multi-link device disables any one link, the AP multi-link device may be required to perform TID-to-Link mapping such that no TIDs are mapped to the link. When the AP multi-link device transmits a management frame that includes information for disabling any one link, the AP multi-link device may be obligated to also transmit an element indicating TID-to-Link mapping. Specifically, when the AP multi-link device transmits a beacon frame or a probe response frame that includes information for disabling any one link, the AP multi-link device may be obligated to also transmit an element indicating TID-to-Link mapping. In addition, when the AP multi-link device transmits a management frame that includes information for disabling any one link, the non-AP multi-link device may not be allowed to reject TID-to-link mapping. Specifically, when the AP multi-link device transmits a beacon frame or probe response frame that includes information for disabling any one link, the non-AP multi-link device may not be allowed to reject the TID-to-link mapping. In addition, when the AP multi-link device transmits a management frame that includes information for disabling any one link, the management frame may indicate default mapping for links other than the disabled link. Specifically, when the AP multi-link device transmits a beacon frame or probe response frame that includes information for disabling any one link, the beacon frame or the probe response frame may indicate default mapping of TID-to-Link mapping for links other than the disabled link. In these embodiments, the beacon frame or the probe response frame may use a TID-to-Link Mapping element to indicate default mapping of TID-to-Link mapping for links other than a disabled link.

In another specific embodiment, before the AP multi-link device disables at least one link, the AP multi-link device may transmit a TID-to-Link mapping teardown frame. Specifically, before the AP multi-link device disables the at least one link, the AP multi-link device may transmit a TID-to-Link mapping teardown frame to all links on which the AP multi-link device operates. In the above-described embodiments, a station having received the TID-to-Link mapping teardown frame may apply, before any one link is disabled, default TID mapping to TID-to-Link mapping of a link on which the TID-to-Link mapping teardown frame has been received.

In another specific embodiment, a separate TID-to-Link mapping teardown frame may not be transmitted. In the embodiment, when any one link is disabled, the non-AP multi-link device that receives a management frame, such as a beacon frame or a probe response frame, that includes information for disabling the any one link may apply default mapping to TID-to-Link mapping of the remaining links other than the disabled link among links that have been set up in the non-AP multi-link device and the AP multi-link device. That is, when any one link is disabled, default mapping may be applied to uplink transmission TID-to-Link mapping of the remaining links other than the disabled link among links that have been set up in the non-AP multi-link device and the AP multi-link device. In addition, when any one link is disabled, the AP multi-link device that has transmitted a management frame, such as a beacon frame or a probe response frame, that includes information for disabling the any one link may apply default mapping to TID-to-Link mapping of the remaining links other than the disabled link among links that have been set up in the non-AP multi-link device and the AP multi-link device. That is, when any one link is disabled, default mapping may be applied to downlink transmission TID-to-Link mapping of the remaining links other than the disabled link among links that have been set up in the non-AP multi-link device and the AP multi-link device.

In the above-described embodiments, when default mapping is applied to a link on which TID-to-Link mapping has been established based on a TID-to-Link mapping negotiation, the TID-to-Link mapping established on the link based on the TID-to-Link mapping negotiation before the default mapping is applied may be discarded.

Figure 53:
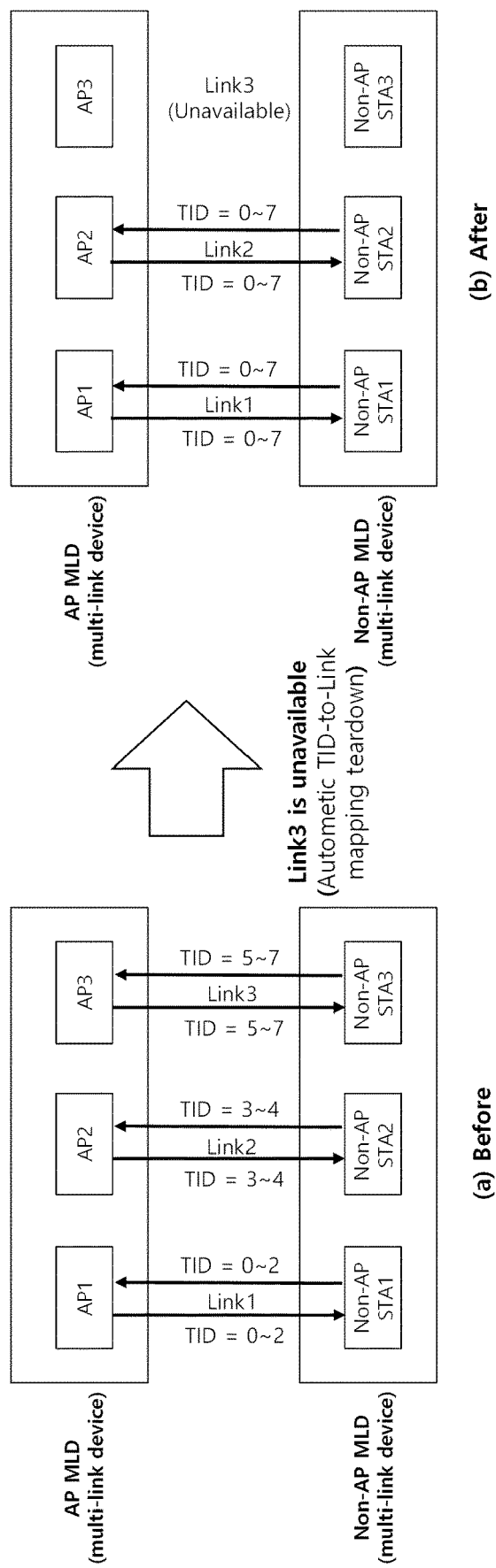
FIG. 53 illustrates that an AP multi-link device and a non-AP multi-link device change the application of default mapping to TID-to-Link mapping of a link that is not disabled when any one link is disabled according to an embodiment of the present invention.

FIG. 53 illustrates that an AP multi-link device and a non-AP multi-link device change the application of default mapping to TID-to-Link mapping of a link that is not disabled when any one link is disabled according to an embodiment of the present invention.

In FIG. 53(a), an AP multi-link device (AP MLD) including a first AP (AP1), a second AP (AP2), and a third AP (AP3) is associated with a non-AP multi-link device (Non-AP MLD) including a first station (Non-AP STA1), a second station (Non-AP STA2), and a third station (Non-AP STA3). The first AP (AP1) and the first station (Non-AP STA1) operate on a first link (Link1). In addition, the second AP (AP2) and the second station (Non-AP STA2) operate on a second link (Link2). In addition, the third AP (AP3) and the third station (Non-AP STA3) operate on a third link (Link3). TID values 0 to 2 are mapped to uplink transmission and downlink transmission on the first link (Link1). In addition, TID values 3 and 4 are mapped to uplink transmission and downlink transmission on the second link (Link2). In addition, TID values 5 to 7 are mapped to uplink transmission and downlink transmission on the third link (Link3).

In FIG. 53(b), the third link (Link3) is disabled. In this case, the AP multi-link device (AP MLD) and the non-AP multi-link device (non-AP MLD) apply default mapping to TID-to-Link mapping of the first link (Link1) and second link (Link2) that are not disabled.

In the above-described embodiments, a management frame, such as a beacon frame or a probe response frame, including information for disabling any one link may be a frame in which a recipient address is configured as a group address, for example, a broadcast address.

Furthermore, the embodiments where default mapping is applied when any one link is disabled may be applied only when there is a mapped TID only on the disabled link. Thus, when any one link is disabled but when traffic corresponding to a TIDs mapped to the link may be exchanged through another link, the above-described embodiments may not apply. Furthermore, the embodiments in which default mapping is applied when any one link is disabled may apply to only uplink transmission. In another specific embodiment, the embodiments may apply to only downlink transmission.

These embodiments may prevent the AP multi-link device and the non-AP multi-link device from being unable to exchange a frame corresponding to a specific TID when any one of the links is disabled. Furthermore, these embodiments may reduce the complexity of frame exchange and link management between the AP multi-link device and the non-AP multi-link device.

Furthermore, when a disabled link is re-enabled, the TID-to-Link mapping applied before the link was disabled may be applied again. In this case, the TID-to-Link mapping applied before the link was disabled may have been established through a TID-to-Link mapping negotiation. Before the first link is disable, a TID value 2 may be mapped to the first link, and as the second link is disabled, a TID value 2 may be mapped to the second link. In this case, when the first link is re-disabled, the TID value 2 may be mapped to the first link. Furthermore, when the first link is re-enabled, the TID value 2 may not be mapped to the second link. In the above-described embodiments, the time when the disabled link is re-enabled may be the time when a disabling time interval ends.

In another specific embodiment, when a disabled link is re-enabled, default mapping may be applied to TID-to-Link mapping of the link. Specifically, when a disabled link is re-enabled, default mapping may be applied to TID-to-Link mapping of the link, regardless of the TID-to-Link mapping applied to the link before the link was disabled. Furthermore, when a disabled link is re-enabled, TID-to-Link mapping of the link to which default mapping was applied due to the disabling of the link may be restored. Specifically, when the disabling interval of a disabled link ends, TID-to-Link mapping of the link to which default mapping was applied due to the disabling of the link may be restored.

In another specific embodiment, even when any one link is disabled, a separate TID-to-Link mapping change may not be performed. In the embodiment, even when frames corresponding to any one TID cannot be exchanged due to disabling of any one link, a separate TID-to-Link mapping change may not be performed. In this case, the separate TID-to-Link mapping change may be for the purpose of mapping a TID mapped only to the disabled link to another link. The embodiment may be applied when the AP multi-link device determines that it is acceptable to disallow the exchange of traffic corresponding to the TID mapped only to the disabled link. Specifically, in the embodiment, when the duration of the disabling time interval is shorter than a predetermined duration, the TID-to-Link mapping change by which the TID mapped only to the disabled link is mapped to the other link may not be performed. Furthermore, when the duration of the disabling time interval is designated as being unknown, the TID-to-Link mapping change by which the TID mapped only to the disabled link is mapped to the other link may be performed.

Furthermore, information about a block ACK session managed by a station operating on the disabled link may also be transferred to another station in a multi-link device that includes the station. The information about the block ACK session may include a score board for block ACK transmission. Furthermore, the other station may be a station on a multi-link device that operates on a link to which the TID mapped only to the disabled link is newly mapped. Thus, it is possible to prevent unnecessary retransmission due to the lack of management regarding whether the transmission of a frame corresponding to a specific TID is successful.

Figure 54:
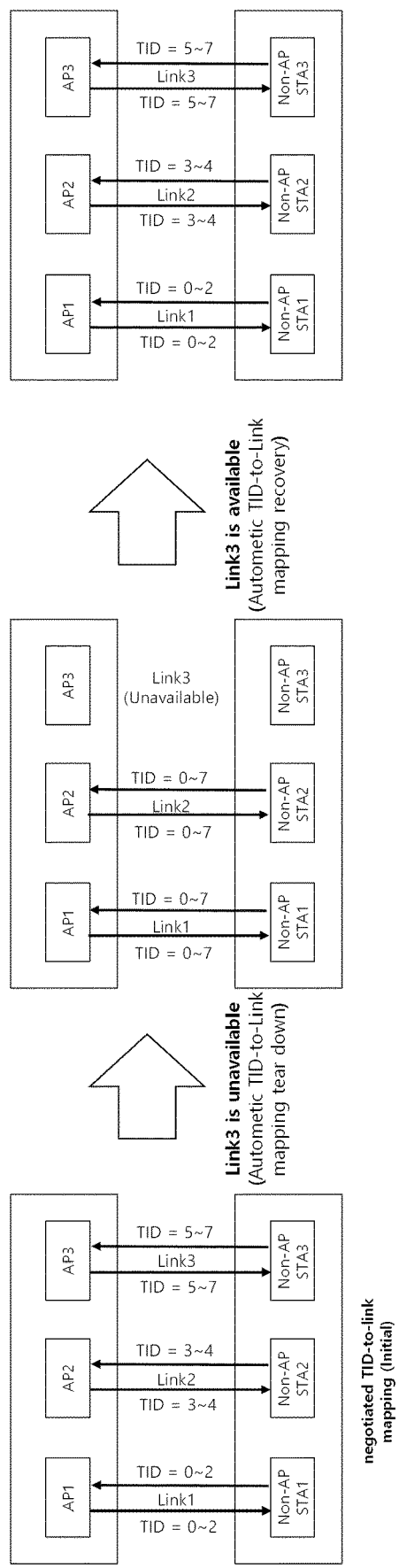
FIG. 54 illustrates that when any one link is disabled, an AP multi-link device and a non-AP multi-link device applies TID-to-Link mapping to the link that is disabled and then re-enabled according to an embodiment of the present invention.

FIG. 54 illustrates that when any one link is disabled, an AP multi-link device and a non-AP multi-link device applies TID-to-Link mapping to the link that is disabled and then re-enabled according to an embodiment of the present invention.

In FIG. 54, an AP multi-link device (AP MLD) including a first AP (AP1), a second AP (AP2), and a third AP (AP3) is associated with a non-AP multi-link device (Non-AP MLD) including a first station (Non-AP STA1), a second station (Non-AP STA2), and a third station (Non-AP STA3). The first AP (AP1) and the first station (Non-AP STA1) operate on a first link (Link1). In addition, the second AP (AP2) and the second station (Non-AP STA2) operate on a second link (Link2). In addition, the third AP (AP3) and the third station (Non-AP STA3) operate on a third link (Link3). TID values 0 to 2 are mapped to uplink transmission and downlink transmission on the first link (Link1). In addition, TID values 3 and 4 are mapped to uplink transmission and downlink transmission on the second link (Link2). In addition, TID values 5 to 7 are mapped to uplink transmission and downlink transmission on the third link (Link3).

The third link (Link3) is disabled. In this case, the AP multi-link device (AP MLD) and the non-AP multi-link device (Non-AP MLD) apply default mapping to TID-to-Link mapping of the first link (Link1) and second link (Link2) that are not disabled.

When the third link (Link3) is enabled, TID-to-Link mapping applied before the third link (Link3) was disabled is applied to TID-to-Link mapping of the first link (Link1) to the third link (Link3).

As described above, when any one link is disabled, default mapping may be applied to TID-to-Link mapping of a link, which is not disabled, among links established between an AP multi-link device and a non-AP multi-link device. In this case, the TID-to-Link mapping of the link that is not disabled may not be allowed to be changed until the disabled link is enabled. For example, a first link, which is one of the links established between the AP multi-link device and the non-AP multi-link device, may be disabled. In this case, TID-to-Link mapping of the remaining links other than the first link among the established links may not be allowed to be changed until the first link is re-enabled.

In another specific embodiment, TID-to-Link mapping of a disabled link may not be allowed to be changed until the disabled link is enabled. For example, a first link, which is one of links established between an AP multi-link device and a non-AP multi-link device, may be disabled. In this case, TID-to-Link mapping of the first link may not be allowed to be changed until the first link is re-enabled. Therefore, until the disabled link is enabled, a TID to be mapped in TID-to-Link mapping must be mapped to at least one of the remaining links other than the disabled link. Furthermore, the transmission of a TID-to-link mapping request frame for mapping a TID to only the disabled link may not be allowed. Furthermore, the AP multi-link device may not be allowed to accept a TID-to-link mapping request for mapping a TID to the disabled link. Furthermore, the AP multi-link device may not be allowed to accept a TID-to-Link mapping request for mapping a TID only to the disabled link.

In the above-escribed embodiments, changing TID-to-Link mapping may include changing the TID-to-Link mapping through a TID-to-Link mapping negotiation.

Furthermore, the limitations according to the above-described embodiments may be commonly applied to the non-AP multi-link device and the AP multi-link device.

<Management of Disabled Link>

Frame exchange is restricted on a disabled link, and thus the operation between an AP and a non-AP station that are associated with each other on the disabled link may be deferred or canceled. For example, an individual target wake time (TWT) agreement may have been established between the AP and the non-AP station that are associated with each other on the disabled link. In this case, the AP should attempt frame exchange with the non-AP station at an agreed time point. Furthermore, when a periodic TWT has been established between the AP and the non-AP station, the AP should periodically attempt frame exchange with the non-AP station.

However, when a link on which the AP is associated with the non-AP station is disabled, the AP may not attempt frame exchange frame with the non-AP station even if there is a TWT agreement between the AP and the non-AP station. Furthermore, even when there is a TWT agreement between the AP and the non-AP station, the non-AP station may determine that no frame will be transmitted from the AP. In this case, the AP and non-AP station may determine that the TWT agreement is suspended. In a specific embodiment, if the disabled link is re-enabled, the AP and the non-AP station may resume the suspended TWT agreement.

A station that before any one link is disabled, has received a radio measurement request frame and has failed to transmit a measurement report frame may not transmit the measurement report frame during a time interval during which the link is disabled. In another specific embodiment, a station that before any one link is disabled, has received a radio measurement request frame and has failed to transmit a measurement report frame may cancel a radio measurement operation. Specifically, the station that before the link is disabled, has received a radio measurement request frame and has failed to transmit a measurement report frame may ignore all previously received measurement requests. A station that before a link is disabled, has transmitted a radio measurement request frame and has failed to receive a measurement report frame may determine that the radio measurement report frame will not be transmitted while the link is disabled. In these embodiments, radio measurement may include at least one among a beacon report, a frame report, a channel load report, and a noise histogram report.

<Managing Legacy Non-AP Station Associated on Disabled Link>

Even when an AP multi-link device disables any one link, a non-AP station operating on the disabled operation link may attempt frame exchange with the AP multi-link device. Therefore, when the AP multi-link device disables any one link, the AP multi-link device needs to prepare a non-AP station operating on the disabled link for the disabling.

Before the AP multi-link device disables any one link, the AP multi-link device may indicate that a time interval during which the disabled link is disabled is a quiet interval. Specifically, the AP multi-link device may transmit a Quiet element indicating that the time interval during which the disabled link is disabled is a quiet interval. In this case, the AP multi-link device may transmit a management frame, such as a beacon frame, that includes the Quiet element. A non-AP station having received the Quiet element keeps the value of NAV nonzero during the quiet interval and does not perform channel access. Specifically, the non-AP station having received the Quiet element may set the value of NAV based on the duration of the quiet interval indicated by the Quiet element. Thus, a legacy non-AP station may determine that a channel is virtually busy during the duration of the quiet interval.

Furthermore, a non-legacy non-AP station that receives a Quiet element transmitted for the disabled link may, unlike the legacy non-AP station, attempt P2P transmission by performing channel access during a quiet interval on the disabled link. Specifically, when the Quiet element indicates that a disabling interval of the disabled link is a quiet interval, the non-legacy non-AP station may not configure NAV corresponding to the quiet interval based on the Quiet element. Furthermore, the Quiet element transmitted for the disabled link may be a Quiet element transmitted on the disabled link. In this case, the legacy non-AP station may not ignore the Quiet element transmitted on a link that is not the disabled link.

Before the AP multi-link device disables any one link, the AP multi-link device may transmit a management frame recommending a legacy non-AP station, which is a member of a BSS of a link that is disabled, to move to another BSS. Specifically, before the AP multi-link device disables any one link, the AP multi-link device may transmit a BSS transition management request frame to a legacy non-AP station which is a member of a BSS of a link that is disabled. In this case, the legacy non-AP station having received the BSS transition management request frame may disassociate from an AP of the AP multi-link device that are operating on the link being disabled. The BSS transition management request frame may include a Request Mode field. The Request Mode field may include a BSS Termination Included bit. The BSS Termination Included bit may be the fourth bit of the Request Mode field. When the value of the BSS Termination Included bit is 1, the Request Mode field may include a BSS Termination Duration field. In this case, the BSS Termination Duration field may be a 12-octet field. The BSS Termination Duration field may include a Subelement ID field (1-octet), a Length field (1-octet), a BSS Termination TSF field (8-octets), and a Duration field (2-octets). The Subelement ID field may be a 1-octet field. Furthermore, the Length field may be a one-octet field. Furthermore, the BSS Termination TSF field may be an 8-octet field. Furthermore, the Duration field may be a 2-octet field. The BSS Termination TSF field indicates the time at which a BSS is terminated by using the TSF timer. The Duration field indicates the duration of the BBS termination time interval in minutes. The AP multi-link device may configure TSF corresponding to a disabling time point, which is the time point at which the link to be disabled begins to be disabled, as the value of the BSS Termination TSF field. The TSF corresponding to the disabling time point may be TSF at the disabling time point or a TSF value with the smallest error from the disabling time point. The AP multi-link device may configure the duration, expressed in minutes, of the link-disabled time interval as the value of the Duration field.

In addition, a non-legacy non-AP station having received a BSS transition management frame transmitted for a disabled link may, unlike the legacy non-AP station, ignore the BSS transition management frame. Specifically, when the BSS transition management frame indicates that a BSS will be terminated during a link-disabled time interval, the non-legacy non-AP station may ignore the BSS transition management frame. In a specific embodiment, when the difference between the BSS termination time interval and the link-disabled time interval, which are indicated by the BSS transition management frame, is within a predetermined time, the non-legacy non-AP station may ignore the BSS transition management frame. The difference between the BSS termination time interval and the link-disabled time interval being within the predetermined time may indicate that at least one of the difference between the start time of the BSS termination time interval and the start time of the link-disabled time interval and the difference between the end time of the BSS termination time interval and the end time of the link-disabled time interval is within the predetermined time. In these embodiments, when the difference between the BSS termination time interval and the link-disabled time interval, which are indicated by the BSS transition management frame, is within the predetermined time, the non-legacy non-AP station may determine that a frame indicated by the BSS transition management frame indicates that the link is disabled. However, a non-legacy non-AP station having received a BSS transition management frame, which does not correspond to the BSS termination time interval, on a disabled link may not ignore the BSS transition management frame. Furthermore, the BSS transition management frame transmitted for the disabled link may be a BSS transition management frame transmitted on the link that is disabled. In this case, a legacy non-AP station may not ignore a BSS transition management frame transmitted on a link which is not the link being disabled.

Before the AP multi-link device disables any one link, the AP multi-link device may transmit a management frame to induce channel switching to a legacy non-AP station that is a member of a BSS of the link to be disabled. Specifically, before the AP multi-link device disables any one link, the AP multi-link device may transmit a management frame that includes at least one of a Channel Switch Announcement element and an Extended Channel Switch Announcement element to a legacy non-AP station that is a member of a BSS of the link being disabled. The Channel Switch Announcement element and the Extended Channel Switch Announcement element may indicate at least one among a new operating class to be applied, a new operating channel to be applied, and a time point at which a change is made. A station having received the Channel Switch Announcement element and the Extended Channel Switch Announcement element may apply the new operating class to be applied at the time point at which the change is made, or may change an operating channel to the new operating class at the time point at which the change is made. In this embodiment, the new operating channel to be applied, which is indicated by the Channel Switch Announcement element and the Extended Channel Switch Announcement element, may be an operating channel for a link, which is not disabled, among the links on which the AP multi-link device operates. In this case, after the non-AP station changes the operating channel, the non-AP station may exchange frames with the AP multi-link device without any separate association process. In this case, the association process may include at least one of exchanging a probe request frame and a probe response frame, and exchanging an association request frame and an association response frame.

Furthermore, a non-legacy non-AP station having received a Channel Switch Announcement element or an Extended Channel Switch Announcement element transmitted for a disabled link may, unlike a legacy non-AP station, ignore the received Channel Switch Announcement element or the received Extended Channel Switch Announcement element. Specifically, the non-legacy non-AP station may ignore the received Channel Switch Announcement element or the received Extended Channel Switch Announcement element when the Channel Switch Announcement element or Extended Channel Switch Announcement element indicates a change of an operating channel before a link-disabled time interval. In a specific embodiment, the non-legacy non-AP station may ignore the received Channel Switch Announcement element or the received Extended Channel Switch Announcement element when a time point of the change indicated by the received Channel Switch Announcement element or the received Extended Channel Switch Announcement element is the same as the start time point of the link-disabled time interval. Furthermore, the Channel Switch Announcement element or the Extended Channel Switch Announcement element sent for the disabled link may be a Channel Switch Announcement element or an Extended Channel Switch Announcement element transmitted on the link being disabled. In this case, the legacy non-AP station may not ignore a Channel Switch Announcement element or an Extended Channel Switch Announcement element transmitted on a link that is not the link being disabled.

Furthermore, when information about link disabling and information about an operating channel change are signaled through one management frame, the AP multi-link device may set the value of a count field, which indicates a change in the signaling information about the link disabling, and the value of a Channel Switch Count field, which indicates a change in the information about the operating channel change, to be equal to each other. When the value of the count field that indicates the change in the signaling information of disabling is equal to the value of the Channel Switch Count field that indicates the change in the information about the operating channel change, the non-legacy non-AP station may ignore the received Channel Switch Announcement element or the received Extended Channel Switch Announcement element.

These embodiments may prevent a non-AP station from attempting frame exchange on a disabled link.

<Method for Managing Channel Access of AP on Disabled Link>

As described above, an AP on a disabled link may enter a doze state. In the doze state, the AP may not perform CCA and PD. Therefore, the AP may lose medium synchronization. When the disabled link is re-enabled, the AP may perform a medium synchronization recovery procedure. Specifically, when the disabled link is re-enabled and when the AP wakes up from the doze state, the AP may perform the medium synchronization recovery procedure. The medium synchronization recovery procedure may be to apply NAVSyncDelay defined in the conventional WLAN. Specifically, in the medium synchronization recovery procedure, the AP may perform an operation of configuring NAV during NAVSyncDelay. In the medium synchronization recovery procedure, during the NAVSyncDelay, the AP is not allowed to perform a channel access procedure, and the AP may configure the NAV based on information acquired through the Duration field of a received frame or the TXOP field of a received PPDU. When the value of NAV is 0 after the NAVSyncDelay has elapsed, the AP may perform channel access on the re-enabled link.

In another specific embodiment, the medium synchronization recovery procedure may be a recovery procedure using MediumSyncDelay described above. Specifically, the AP may transmit a start frame while the value of the MediumSyncDelay timer is non-zero, and may exchange the start frame and frames other than the start frame only when receiving a response to the start frame.

Furthermore, the start frame may be a trigger frame. The trigger frame may include at least one among a basic trigger frame, a Beamforming Report Poll (BFRP) frame, a MU-BlockAck Request (MU-BAR) frame, a MU-RTS frame, a Buffer Status Report Poll (BSRP) frame, a Bandwidth Query Report Poll (BQRP) frame, and an NDP Feedback Report Poll (NFP) frame. In another specific embodiment, the start frame may be an RTS frame, as described above. When the MediumSyncDelay timer is applied to an AP, several exceptions, which are differ from when the MediumSyncDelay timer is applied to a non-AP station, may be applied.

First, even when the value of the MediumSyncDelay timer is not 0, a CCA threshold applied by the AP may be the same as when the value of the MediumSyncDelay timer is 0. In this case, the CCA threshold may be −62 dBM.

Furthermore, the AP may be allowed to transmit a beacon frame during the medium synchronization recovery procedure. Specifically, even when the value of the MediumSyncDelay timer is greater than 0, the AP may be exceptionally allowed to transmit a beacon frame.

Furthermore, the number of times the AP may attempt channel access during the medium synchronization recovery procedure may not be limited. In this case, attempting channel access may represent transmitting a start frame.

Furthermore, during the medium synchronization recovery procedure, restriction on a PPDU format that the AP can use to transmit the start frame may not be applied.

Applying the medium synchronization recovery procedure from a time point at which a disabled link is re-enabled may interfere with smooth frame exchange. Therefore, the AP may wake up from the doze state before the maximum time required for the medium synchronization recovery procedure from the time point at which the disabled link is re-enabled. After wake-up, the AP may perform the medium synchronization recovery procedure. In this case, the maximum time required for the medium synchronization recovery procedure may be NAVSyncDelay. Furthermore, the maximum time for the medium synchronization recovery procedure can be MediumSyncDelay.

<Restricting Channel Access of Non-AP Multi-Link Device Related to Disabled Link>

Description will be made of a method for restricting channel access to prevent a non-AP station from performing transmission through a disabled link. In a conventional WLAN, a station performs EDCA. In this case, the station transmits traffic stored in a queue of EDCAF, in which backoff has been completed at a slot boundary, at the next slot boundary following the slot boundary at which the backoff has been completed. When the non-AP station does not stop an EDCAF operation while the link is disabled, the station may have no choice but to initiate transmission. Therefore, there is a need for an embodiment which prevents the station operating on the disabled link from performing a channel access procedure or prevents the station from initiating transmission.

The non-AP station may not be allowed to reduce the backoff counter of EDCAF during a disabling time interval. Specifically, the non-AP station may consider a channel of the disabled link not to be idle during the disabling time interval. Specifically, the non-AP station may consider a channel on the disabled link to be virtually busy during the disabling time interval. Specifically, the non-AP station's NAV may be set from the time point at which a link is disabled by the duration of a link-disabled time interval time. When the duration of the link-disabled time interval is indicated to be unknown, the non-AP station may release the NAV when determining that the disabled link is re-enabled. When the non-AP station receives a frame from an AP on a disabled link as described earlier, the non-AP station may determine that the disabled link is re-enabled. Furthermore, the non-AP station may determine whether the disabled link is re-enabled, based on an RNR element of a beacon frame received on a link other than the disabled link. Specifically, when the RNR element of a beacon frame received by the non-AP station on the link other than the disabled link indicates that the disabling time interval of the disabled link has ended, the non-AP station may determine that the disabled link is re-enabled.

When the backoff counter value of the non-AP station's EDCAF reaches 0 while a link is disabled, the non-AP station may restart the EDCAF backoff procedure. Specifically, when the backoff counter value of the non-AP station's EDCAF reaches 0 while a link is disabled, the non-AP station may initialize the value of the backoff counter of the EDCAF that reached 0. In this case, the initial value of the backoff counter is set to a random natural number within a previously used contention window (CW). In addition, a retransmission counter may not be increased.

In another specific embodiment, when the value of the backoff counter of the non-AP station's EDCAF reaches 0 while a link is disabled, the non-AP station may maintain the value of the backoff counter of the EDCAF at 0. In this case, when the disabled link is re-enabled, the non-AP station may initialize the backoff counter of the EDCAF of which the backoff counter value reached 0 while the link was disabled. The initial value of the backoff counter is set to a random natural number within the previously used contention window (CW). Furthermore, the retransmission counter may not be increased. This embodiment allows the application of an exception operation to the EDCA rule that a station shall transmit traffic stored in a queue of EDCAF, in which backoff has been completed at a slot boundary, at the next slot boundary of the slot boundary at the time point when the backoff has been completed.

In the above-described embodiments, a non-AP stations may be allowed to transmit a P2P PPDU while a link is disabled. When an EDCAF backoff procedure for P2P traffic is completed, the non-AP station may transmit the P2P PPDU even while the link is disabled.

Furthermore, the non-AP station may enter a doze state while a link over which the non-AP station operates is disabled. Specifically, the non-AP station may remain in the doze state during a disabling time interval of the link on which the non-AP station operates or during a time interval that includes the disabling time interval of the link on which the non-AP station operates.

<Non-STR Mobile AP Multi-Link Device>

When a mobile device for providing tethering operates as a multi-link device and operates on a non-SRT link pair, the mobile device is referred to as a non-SRT mobile AP multi-link device. A non-STR mobile AP multi-link device is limited in exchanging frames on multiple links. Thus, a non-AP station associated with the non-STR mobile AP multi-link device must perform frame exchanges in consideration of the operation of the non-STR mobile AP multi-link device. Therefore, the operation of the non-AP station associated with the non-STR mobile AP multi-link device may be restricted, and may become complicated. Therefore, the non-AP station needs to determine whether an AP is a non-SRT mobile AP multi-link device.

The non-STR mobile AP multi-link device may include, in a beacon frame, information indicating that an AP transmitting the beacon frame is a non-STR mobile AP multi-link device. A non-AP multi-link device may determine, based on the beacon frame, that the AP having transmitted the beacon frame is a non-STR mobile AP multi-link device. The non-AP multi-link device may determine whether to perform a multi-link setup based on whether the AP having transmitted the beacon frame is a non-STR mobile AP multi-link device. Furthermore, the non-AP multi-link device may determine a method for performing the multi-link setup based on whether the AP having transmitted the beacon frame is a non-STR mobile AP multi-link device. Specifically, the non-AP multi-link device that performs a multi-link setup with a non-STR mobile AP multi-link device and may perform the multi-link setup on a link on which the non-AP multi-link device has received the beacon frame from the non-STR mobile AP multi-link device. In specific embodiments, the non-STR mobile AP multi-link device may transmit a beacon frame and a probe response frame only on a primary link. Furthermore, the non-STR mobile AP multi-link device may perform a multi-link setup only through the primary link. In the case of the non-AP multi-link device associated with the non-STR mobile AP multi-link device, when the non-STR mobile AP multi-link device exchanges frames on the primary link, the non-AP multi-link device may not allow to attempt transmission to the non-STR mobile AP multi-link device on a link other the primary link.

<Operation of Disabled Link by Non-STR Mobile AP Multi-Link Device>

Even when a non-STR mobile AP multi-link device disables any one link, the non-STR mobile AP multi-link device may signal information about the disabled link as described above. The information about the disabled link may include at least one among the link being disabled, a disabling time point, and the duration of a disabling time interval.

When the non-STR mobile AP multi-link device disables a non-primary link, the non-STR mobile AP multi-link device may not transmit information about the disabled link on the non-primary link. Specifically, when the non-STR mobile AP multi-link device disables a non-primary link, the non-STR mobile AP multi-link device may transmit information about the disabled link on the primary link. This is because the non-STR mobile AP multi-link device transmits a beacon frame and a probe response frame only on a primary link. Furthermore, the non-STR mobile AP multi-link device may indicate, based on the TBTT of the primary link, a time point at which the non-primary link is disabled. Specifically, the non-STR mobile AP multi-link device may indicate, based on the TBTT of the primary link, a time point at which the non-primary link is disabled and the duration of a link-disabled time interval.

A non-AP multi-link device associated with the non-STR mobile AP multi-link device may receive information about the disabling of the non-primary link on the primary link. Furthermore, the non-AP multi-link device may determine, based on the TBTT of the primary link, a time point when the non-primary link is disabled. Furthermore, the non-AP multi-link device may determine the duration of the disabling time interval of the non-primary link based on the TBTT of the primary link.

In addition, restrictions that have been applied to the operation of the non-STR mobile AP multi-link device and the non-AP multi-link devices associated with the non-STR mobile AP multi-link device while a primary link of the non-STR mobile AP multi-link device is disabled may be released. Specifically, one of non-primary links may be considered to be a primary link while the primary link of the non-STR mobile AP multi-link device is disabled. In another specific embodiment, specifically, a non-primary link may be considered to be a normal link while the primary link of the non-STR mobile AP multi-link device is disabled.

In accordance with these embodiments, the non-STR mobile AP multi-link device may transmit a beacon frame on the non-primary link while the primary link of the non-STR mobile AP multi-link device is disabled. While the primary link of the non-STR mobile AP multi-link device is disabled, the non-STR mobile AP multi-link device and the non-AP multi-link device associated with the non-STR mobile AP multi-link device may perform non-primary link channel access without occupying the primary link. While the primary link of the non-STR mobile AP multi-link device is disabled, the non-STR mobile AP multi-link device and the non-AP multi-link device associated with the non-STR mobile AP multi-link device may transmit PPDUs on the non-primary link without transmitting the PPDUs on the primary link. In this case, the non-STR mobile AP multi-link device and the non-AP multi-link device associated with the non-STR mobile AP multi-link device may terminate the transmission of the PPDUs before the primary link is re-enabled. The transmission of the last PPDU transmitted on the non-primary link while the primary link of the non-STR mobile AP multi-link device is disabled may, as an exception, terminate after the primary link is re-enabled.

Furthermore, after the primary link of the non-STR mobile AP multi-link device is re-enabled, the restrictions that were applied to the operation of the non-STR mobile AP multi-link device and to the non-AP multi-link devices associated with the non-STR mobile AP multi-link device may be reapplied.

These embodiments are provided because frame exchange on the non-STR mobile AP multi-link device may be unduly restrictive when the restrictions applied to the non-primary link are continuously applied while the primary link of the non-STR mobile AP multi-link device is disabled, and also because frame exchange on the non-primary link does not interfere with frame exchange on the primary link while the primary link of the non-STR mobile AP multi-link device is disabled.

While the primary link of the non-STR mobile AP multi-link device is disabled, one of non-primary links may be configured as a primary link. For example, the primary link of the non-STR mobile AP multi-link device is a first link, and when the first link is disabled, the non-STR mobile AP multi-link device may configure a second link as a primary link. In this case, when the first link is re-enabled, the second link may remain as a primary link. In another specific embodiment, when the first link is re-enabled, the non-STR mobile AP multi-link device may indicate whether the second link remains as a primary link. In another specific embodiment, when the first link is re-enabled, the first link may be implicitly re-enabled.

In another specific embodiment, the non-STR mobile AP multi-link device may not be allowed to disable a primary link. This is because disabling the primary link of a non-STR mobile AP multi-link device may limit the operation of the non-STR mobile AP multi-link device and may complicate the operation of the non-AP multi-link device associated with the non-STR mobile AP multi-link device.

When the primary link of a non-STR mobile AP multi-link device is disabled, the non-STR mobile AP multi-link device may operate as a mobile AP. In this case, the mobile AP may be disassociated from a non-AP multi-link device to which the mobile AP has been associated when operating as the non-STR mobile AP multi-link device. Furthermore, the mobile AP may signal the non-AP multi-link device, to which the mobile AP has been associated when operating as the non-STR mobile AP multi-link device, that the mobile AP will operation as a mobile AP. The mobile AP may use a reason code of a disassociation frame to signal to the non-AP multi-link device that the mobile AP will operate as a mobile AP.

Figure 55:
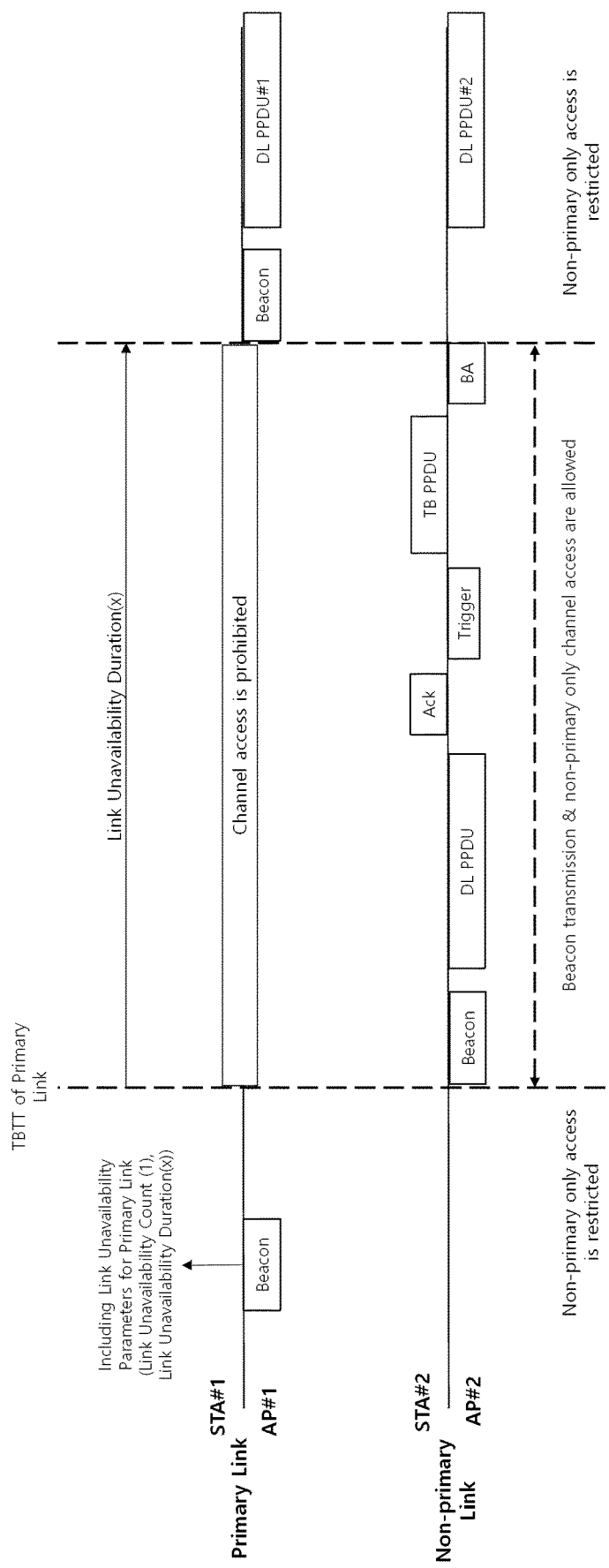
FIG. 55 illustrates the operation of a non-STR mobile AP multi-link device according to an embodiment of the present invention when the non-STR mobile AP multi-link device disables a primary link.

FIG. 55 illustrates the operation of a non-STR mobile AP multi-link device according to an embodiment of the present invention when the non-STR mobile AP multi-link device disables a primary link.

In FIG. 55, a non-STR mobile AP multi-link device includes a first AP (AP #1) operating on a primary link and a second AP (AP #2) operating on a non-primary link. The non-STR mobile AP multi-link device is associated with a non-AP multi-link device. The non-AP multi-link device includes a first station (STA #1) operating on the primary link and a second station (STA #2) operating on the non-primary link. The first AP (AP #1) transmits a beacon frame on the primary link. The beacon frame includes information about disabling of the primary link. As described above, the information regarding the disabling of the primary link may be configured according to the above-described embodiments. Specifically, in FIG. 55, the beacon frame includes a Link Unavailability Parameters field. The value of a Link Unavailability Count subfield of the Link Unavailability Parameters field is set to 1, and the value of a Link Unavailability Duration subfield of the Link Unavailability Parameters field is set to x. The first station (STA #1) acquires the information about the disabling of the primary link from the beacon. The first station (STA #1) determines that the primary link is disabled during x (x−1 TUs) from the next TBTT. The first station (STA #1) and the first AP (AP #1) may not perform channel access to the primary link while the primary link is disabled.

While the primary link is disabled, the second station (STA #2) and the second AP (AP #2) may perform EDCA and exchange frames on the non-primary link without separate restrictions. Furthermore, the second AP (AP #2) may transmit a beacon frame on the non-primary link.

When the primary link is re-enabled, the first station (STA #1) and the first AP (AP #1) may perform EDCA and exchange frames on the primary link. Furthermore, the first AP (AP #1) may transmit a beacon frame on the primary link. In this case, the second AP (AP #2) is not allowed to transmit a beacon frame on the non-primary link. In addition, the second station (STA #2) and the second AP (AP #2) may transmit PPDUs on the non-primary link only when the primary link is occupied.

Although the present invention has been described using WLAN communication as an example as described above, the present invention is not limited thereto and may be equally applied to other communication systems such as cellular communication. In addition, although the methods, devices, and systems of the present invention have been described in connection with certain embodiments, some or all of the components, operations of the present invention may be implemented using a computer system having a general-purpose hardware architecture.

The features, structures, effects, etc. described in the above embodiments are included in at least one embodiment of the present invention and are not necessarily limited to one embodiment. Further, the features, structures, effects, etc. illustrated in each embodiment may be combined or modified for other embodiments by one of ordinary skill in the art to which the embodiments belong. Accordingly, the contents relating to these combinations and modifications should be construed as falling within the scope of the present invention.

Although described above with a focus on the embodiment, this is only an example and is not limited to the present invention, and those of ordinary skill in the art to which the present invention pertains will appreciate that various modifications and applications not exemplified above are possible without departing from the essential characteristics of the present embodiment. For example, each component specifically illustrated in the embodiment is one that may be modified and implemented. In addition, the differences relating to these modifications and applications should be construed as falling within the scope of the present invention as defined in the appended claims.

The invention claimed is:

1. A non-access point (AP) multi-link device communicating with an AP multi-link device on a plurality of links, the non-AP multi-link device comprising:
    a transceiver; and
    a processor,
    wherein the processor is configured to:
    receive a beacon frame or a probe response frame from the AP multi-link device;
    when the beacon frame or the probe response frame sets a traffic identifier (TID)-to-Link mapping between the non-AP multi-link device and the AP multi-link device, determine a TID mapped to the plurality of links according to the TID-to-Link mapping set by the beacon frame or the probe response frame; and
    perform transmission on at least one of the plurality of links according to a TID mapped to the at least one of the plurality of links,
    wherein when the beacon frame or the probe response frame sets the TID-to-Link mapping between the non-AP multi-link device and the AP multi-link device, the non-AP multi-link device is not allowed to reject the TID-to-Link mapping set by the beacon frame or the probe response frame.

2. The non-AP multi-link device of claim 1, wherein the TID-to-Link mapping set by the beacon frame or the probe response frame comprises disabling at least one of the plurality of links.

3. The non-AP multi-link device of claim 2, wherein the beacon frame or the probe response frame indicates that all TIDs which are targets of the TID-to-Link mapping are mapped to a link other than the disabled at least one of the plurality of links among the plurality of links.

4. The non-AP multi-link device of claim 2, wherein when the at least one of the plurality of links is disabled and then re-enabled, the all TIDs which are targets of the TID-to-Link mapping are mapped to the re-enabled at least one of the plurality of links.

5. The non-AP multi-link device of claim 1, wherein a value of a Neighbor AP TBTT Offset subfield corresponding to a disabled link in a target beacon transmission time (TBTT) Information field included in the beacon frame or the probe response frame is 255.

6. The non-AP multi-link device of claim 2, wherein when the AP multi-link device is a mobile AP and a nonsimultaneous transmit and receive (non-STR) multi-link device which transmission in one of the plurality of links is restricted for protecting transmission or reception of the non-AP multi-link device in the other of the plurality of links, the beacon frame or the probe response frame-does not disable a primary link of the AP multi-link device,
    wherein the primary link is a link on which the AP multi-link device transmit the beacon frame.

7. The non-AP multi-link device of claim 2, wherein after receiving the beacon frame or the probe response frame, the processor is configured to ignore a BSS transition management frame which is received on a link which is to be disabled by the beacon frame or the probe response frame,
    wherein the BSS transition management frame indicates that a BSS operating on the link which is to be disabled by the beacon frame or the probe response frame is going to be terminated.

8. The non-AP multi-link device of claim 2, wherein after at least one link is disabled by the beacon frame or the probe response frame, the processor is configured not to request to change a TID-to-Link mapping of the at least one link.

9. The non-AP multi-link device of claim 8, wherein after receiving the beacon frame or the probe response frame, the processor is configured to request a change of a TID-to-Link mapping of at least one of links other than the link which is disabled by the beacon frame or the probe response frame.

10. The non-AP multi-link device of claim 1, wherein when the TID-to-Link mapping between the non-AP multi-link device and the AP multi-link device is applied according to the beacon frame or the probe response frame, the processor is configured to discard TID-to-Link mapping established through a TID-to-Link mapping negotiation on the plurality of links before receiving the beacon frame or the probe response frame.

11. An access point (AP) multi-link device communicating with a non-AP multi-link device on a plurality of links, the AP multi-link device comprising:
    a transceiver; and
    a processor,
    wherein the processor is configured to:
    transmit, to the non-AP multi-link device, a beacon frame or a probe response frame setting a traffic identifier (TID)-to-link mapping between the AP multi-link device and the non-AP multi-link device; and perform transmission on at least one of the plurality of links according to a TID mapped to the at least one of the plurality of links, wherein when the beacon frame or the probe response frame sets the TID-to-Link mapping between the non-AP multi-link device and the AP multi-link device, the non-AP multi-link device is not allowed to reject the TID-to-Link mapping indicated by the beacon frame or the probe response frame.

12. The AP multi-link device of claim 11, wherein the TID-to-Link mapping set by the beacon frame or the probe response frame comprises disabling at least one link of the plurality of links.

13. The AP multi-link device of claim 12, wherein the beacon frame or the probe response frame indicates that all TIDs which are targets of the TID-to-Link mapping are mapped to a link other than the disabled at least one of the plurality of links among the plurality of links.

14. The AP multi-link device of claim 12, wherein when the at least one of the plurality of links is disabled and then re-enabled, the all TIDs which are targets of the TID-to-Link mapping are mapped to the re-enabled at least one of the plurality of links.

15. The AP multi-link device of claim 12, wherein when the at least one of the plurality of links is disabled and the disabled at least one of the plurality of links is re-enabled, a NAVSyncDelay-based channel access restriction is applied to the AP of the AP multi-link device.

16. The AP multi-link device of claim 11, wherein the processor is configured to set a value of a Neighbor AP TBTT Offset subfield corresponding to a disabled link in a target beacon transmission time (TBTT) Information field included in the beacon frame or the probe response frame to 255.

17. A method for operating a non-access point (AP) multi-link device communicating with a AP multi-link device on a plurality of links, the method comprising:

receiving a beacon frame or a probe response frame from the AP multi-link device;

when the beacon frame or the probe response frame sets a traffic identifier (TID)-to-Link mapping between the non-AP multi-link device and the AP multi-link device, determining a TID mapped to the plurality of links according to the TID-to-Link mapping set by the beacon frame or the probe response frame; and performing transmission on at least one of the plurality of links according to a TID mapped to the at least one of the plurality of links, wherein when the beacon frame or the probe response frame sets the TID-to-Link mapping between the non-AP multi-link device and the AP multi-link device, the non-AP multi-link device is not allowed to reject the TID-to-Link mapping set by the beacon frame or the probe response frame.

18. A method for operating an access point (AP) multi-link device communicating with a non-AP multi-link device on a plurality of links, the method comprising:

transmitting, to the non-AP multi-link device, a beacon frame or a probe response frame setting a traffic identifier (TID)-to-link mapping between the AP multi-link device and the non-AP multi-link device; and performing transmission on at least one of the plurality of links according to a TID mapped to the at least one of the plurality of links, when the beacon frame or the probe response frame sets the TID-to-Link mapping between the non-AP multi-link device and the AP multi-link device, the non-AP multi-link device is not allowed to reject the TID-to-Link mapping indicated by the beacon frame or the probe response frame.

19. The non-AP multi-link device of claim 3, when the beacon frame or the probe response frame indicates that any one link to which any one TID is mapped to be disabled, the TID-to-Link mapping between the non-AP multi-link device and the AP multi-link device is applied according to the beacon frame or the probe response frame.

20. The non-AP multi-link device of claim 1, when at least one link is disabled, the processor configured to determine a target wake time (TWT) agreement in the at least one disabled link is suspended.

* * * * *